United States Patent [19]

Beebe et al.

[11] 4,276,451

[45] Jun. 30, 1981

[54] CONTROL SYSTEM FOR TELEPHONE SWITCHING SYSTEM

[75] Inventors: Otto W. Beebe, Maitland; Ernest O. Lee, Longwood; Richard I. Subrin, Alta Monte Springs; Barrie Brightman, Fern Park, all of Fla.; George C. Hanson, San Antonio, Tex.

[73] Assignee: Stromberg-Carlson Corporation, Tampa, Fla.

[21] Appl. No.: 10,910

[22] Filed: Feb. 9, 1979

[51] Int. Cl.³ .......................... H04M 3/22; H04Q 3/54
[52] U.S. Cl. .......................... 179/175.2 C; 179/18 ES; 340/147 SC
[58] Field of Search ....... 179/18 ES, 18 FF, 175.2 R, 179/175.2 C; 340/147 SC

[56] References Cited

U.S. PATENT DOCUMENTS

| | | | |
|---|---|---|---|
| 3,409,877 | 11/1968 | Alterman et al. | 179/18 ES |
| 3,812,297 | 5/1974 | Borbas | 179/18 ES |
| 3,898,386 | 8/1975 | Gaon | 179/18 FF |
| 3,908,099 | 9/1975 | Borbas et al. | 179/175.2 R |
| 3,920,977 | 11/1975 | Karsas | 179/18 ES |
| 4,028,676 | 6/1977 | Wolfer | 340/147 SC |
| 4,146,749 | 3/1979 | Pepping et al. | 179/18 ES |

OTHER PUBLICATIONS

Bell System Tech. Jour. for Sep. 1977, pp. 1040-1049 inclusive.

Primary Examiner—Thomas A. Robinson
Attorney, Agent, or Firm—Cesari & McKenna

[57] ABSTRACT

A fault monitoring and diagnostic system for a telephony switching system. Two call processing systems connect through a programmable switch to port group units that receive individual telephone lines. All signals from the port group units are conveyed to both call processing systems, and the call processing systems operate in synchronism. However, the programmable switch conveys signals back to the port group units from only one of the call processing systems. Fault monitoring and diagnostic circuitry monitors various conditions within the telephony switching system. A test call generator automatically performs test calls thereby to diagnose system problems. If a fault is detected, the fault monitoring and diagnostic system controls the programmable switch and, in appropriate circumstances, couples the output signals from the other call processing system to the port group units. Information concerning the nature of the fault is also provided.

24 Claims, 48 Drawing Figures

STATE DIAGRAM WITH DIAGNOSTIC ACTIONS

STATE DIAGRAM WITH DIAGNOSTIC ACTIONS

CALL PROCESSING SYSTEM
DETECTORS

MAINTENANCE BUS INTERFACE, FUNCTIONAL RELATIONSHIPS

MAINTENANCE BUS INTERFACE, BASIC BLOCK DIAGRAM

| REGISTER | ADDRESS | BIT | | | | | | | | | | | | | | | |
|---|---|---|---|---|---|---|---|---|---|---|---|---|---|---|---|---|---|
| | | 15 | 14 | 13 | 12 | 11 | 10 | 9 | 8 | 7 | 6 | 5 | 4 | 3 | 2 | 1 | 0 |
| CMD/MASK | 164372 | CLEAR PEMP | FORCE PEMP | SET MASK | MB RESET | SP | AMA | PLD | SYN | TAR | TCG | | BMP | PCD | MSD | SGD | SOC |
| FIRST FAULT | 164374 | X | X | X | X | SP | AMA | PLD | SYN | TAR | TCG | | BMP | PCD | MSD | SGD | SOC |
| STATUS | 164376 | X | X | X | X | SP | AMA | PLD | SYN | TAR | TCG | | BMP | PCD | MSD | SGD | SOC |

X = NOT USED

FIG. 8

MBI REGISTER ADDRESSES
AND BIT ASSIGNMENT

SWITCHOVER CONTROL

FIG.10 SWITCHOVER CONTROL

SWITCHOVER CONTROL

COMMAND REGISTER ADDRESS AND BIT DEFINITIONS

| REGISTER | | A | B | C | D |
|---|---|---|---|---|---|
| ADDRESS | | 164000 | 164002 | 164004 | 164006 |
| BIT | 0 | RESET A | MASK INTERRUPT A | MASK MISMATCH A | MASK PARITY ERROR A |
| | 1 | RESET B | MASK INTERRUPT B | MASK MISMATCH B | MASK PARITY ERROR B |
| | 2 | START SANITY ERROR CHECK A | DISABLE WATCHDOG TIMER A | REPLY OVERRIDE | FORCE UPPER-BYTE PARITY ERROR, CPU B |
| | 3 | START SANITY ERROR CHECK B | DISABLE WATCHDOG TIMER B | RESET PARITY ERRORS | FORCE UPPER-BYTE PARITY ERROR, CPU B |
| | 4 | SWITCH TO SIDE A ✻ | FORCE LOWER-BYTE PARITY ERROR, CPU A | RESTART A | MATRIX SWITCH TIMEOUT RESET A |
| | 5 | SWITCH TO SIDE B ✻ | FORCE LOWER-BYTE PARITY ERROR, CPU B | RESTART B | MATRIX SWITCH TIMEOUT RESET B |
| | 6 | LOCKOUT ✻ (INHIBIT AUTO. SWITCHOVER) | (NOT USED) | (NOT USED) | (NOT USED) |
| | 7 | (NOT USED) | (NOT USED) | (NOT USED) | (NOT USED) |

✻ THE LOCKOUT BIT MUST BE SET WHENEVER THE SWITCH TO SIDE A OR SWITCH TO SIDE B BIT IS SET TO PREVENT SUBSEQUENT AUTOMATIC SWITCHOVERS.

FIG. 12

COMMAND REGISTER ADDRESS AND BIT DEFINITIONS

STATUS REGISTER ADDRESS AND BIT DEFINITIONS

| REGISTER | | A | B | C | D |
|---|---|---|---|---|---|
| ADDRESS | | 164010 | 164012 | 164014 | 164016 |
| BIT | 0 | REFRESH TIMEOUT A | REFRESH TIMEOUT B | MATRIX SW. TIMEOUT A | MATRIX SW. TIMEOUT B |
| | 1 | DMA TIMEOUT A | DMA TIMEOUT B | POWER/CLOCK FAIL A | POWER/CLOCK FAIL B |
| | 2 | INTERRUPT TIMEOUT A | INTERRUPT TIMEOUT B | PCS PARITY ERROR A | PCS PARITY ERROR B |
| | 3 | REPLY TIMEOUT A | REPLY TIMEOUT B | STUCK BIT A | STUCK BIT B |
| | 4 | CPU PARITY ERROR A | CPU PARITY ERROR B | BUS CONV. PARITY ERROR A | BUS CONV. PARITY ERROR B |
| | 5 | SANITY ERROR A | SANITY ERROR B | BUS DEVICE PARITY ERROR A | BUS DEVICE PARITY ERROR B |
| | 6 | WATCHDOG TIMEOUT A | WATCHDOG TIMEOUT B | MASK INTERRUPT A | PLD MISMATCH A |
| | 7 | A ON LINE | B ON LINE | MASK INTERRUPT B | PLD MISMATCH B |

FIG. 13

STATUS REGISTER ADDRESS AND BIT DEFINITIONS

MATRIX SWITCH DIAGNOSTIC

WRITE ENABLE STROBE AND MEMORY
ADDRESS COUNTER CONTROL TIMER

PROGRAMMABLE LOGIC DIAGNOSTIC
BLOCK DIAGRAM

COMMAND REGISTERS (4)

| | 7 | 6 | 5 | 4 | 3 | 2 | 1 | 0 |
|---|---|---|---|---|---|---|---|---|
| CR-0 | ME 3 EN FE PLD | ME 2 EN FE TNC | ME 1 ENPE | ME 0 ASBE | CLEAR ERROR | FEEN | F.E. 1 | F.E. 0 |

| | 7 | 6 | 5 | 4 | 3 | 2 | 1 | 0 |
|---|---|---|---|---|---|---|---|---|
| CR-1 | LCX-1 FPE | LCX-0 FPE | 0 | 0 | 0 | MASK ALL | FRE | MPE |

| | 7 | 6 | 5 | 4 | 3 | 2 | 1 | 0 |
|---|---|---|---|---|---|---|---|---|
| CR-2 | | | | | | | | |

| | 7 | 6 | 5 | 4 | 3 | 2 | 1 | 0 |
|---|---|---|---|---|---|---|---|---|
| CR-3 | | | | | | | | |

STATUS REGISTERS

| | 7 | 6 | 5 | 4 | 3 | 2 | 1 | 0 |
|---|---|---|---|---|---|---|---|---|
| SR-0 | ENFE PLD | ENFE TNC | ENPE | ASBE | CPU PE | PCS PE | 0 | 0 |

| | 7 | 6 | 5 | 4 | 3 | 2 | 1 | 0 |
|---|---|---|---|---|---|---|---|---|
| SR-1 | 0 | EN 1 | EN 0 | EN 2 | PE 3 | PE 2 | PE 1 | PE 0 |

| | 7 | 6 | 5 | 4 | 3 | 2 | 1 | 0 |
|---|---|---|---|---|---|---|---|---|
| SR-2 | EN 5 | EN 4 | EN 3 | EN 10 | EN 9 | EN 8 | EN 7 | EN 6 |

| | 7 | 6 | 5 | 4 | 3 | 2 | 1 | 0 |
|---|---|---|---|---|---|---|---|---|
| SR-3 | | | | | | | | |

GENERAL BLOCK DIAGRAM
SERVICE GROUP DIAGNOSTIC SECONDARY CIRCUITS

DETAILED BLOCK DIAGRAM
SERVICE GROUP DIAGNOSTIC SECONDARY CIRCUIT

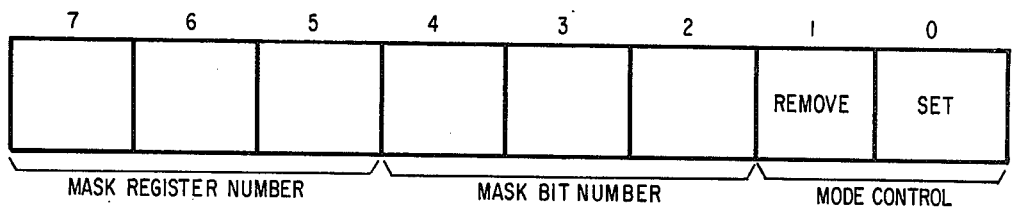
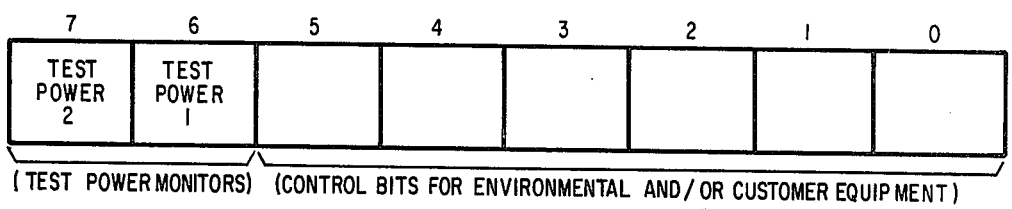
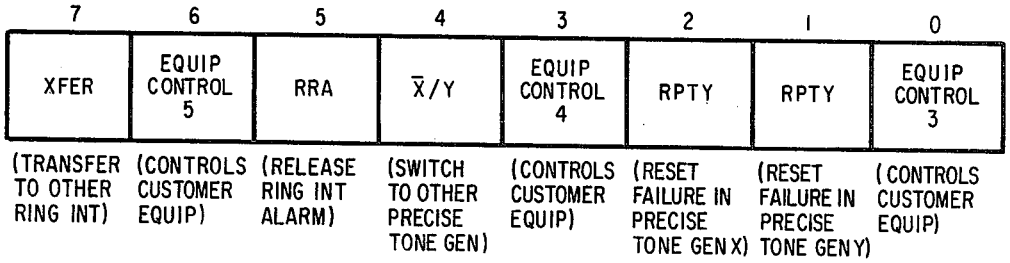
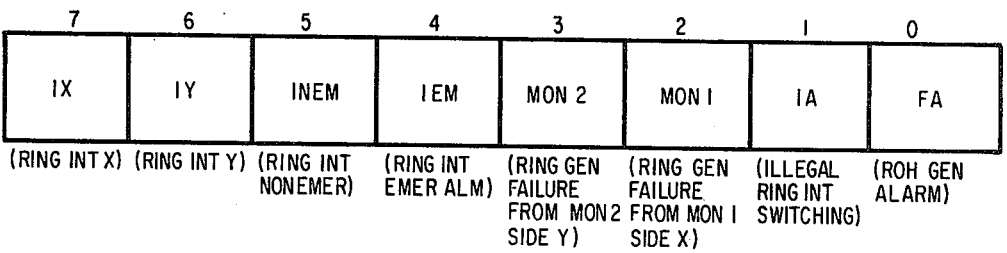
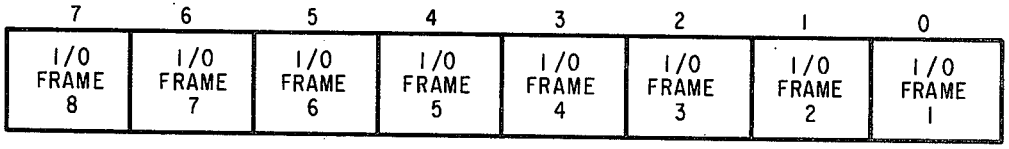
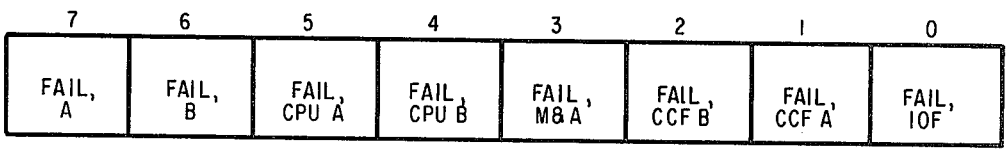

FIG. 22g
ENVIRONMENTAL STATUS REGISTER BIT FORMAT

| 7 | 6 | 5 | 4 | 3 | 2 | 1 | 0 |
|---|---|---|---|---|---|---|---|
|   |   |   |   |   |   |   |   |

(ENVIRONMENTAL STATUS BIT)

FIG. 22h
MISCELLANEOUS STATUS REGISTER BIT FORMAT

| 7 | 6 | 5 | 4 | 3 | 2 | 1 | 0 |
|---|---|---|---|---|---|---|---|
|   |   |   |   |   |   |   |   |

(MISCELLANEOUS STATUS BIT)

FIG. 22j
SPARE I/O FRAME REGISTER BIT FORMAT

| 7 | 6 | 5 | 4 | 3 | 2 | 1 | 0 |
|---|---|---|---|---|---|---|---|
| FUSE/ BRKR, MDP | FUSE/ BRKR, 48V DP |   |   |   |   |   |   |
| (FUSE BLOWN, BRKR TRIPPED ON MAIN DISCH PNL) | (FUSE BLOWN, BRKR TRIPPED ON 48V DISTR PNL) | | | | | | |

FIG. 22k
LINE EXPANDER CONTROL AND MISCELLANEOUS REGISTER BIT FORMAT

| 7 | 6 | 5 | 4 | 3 | 2 | 1 | 0 |
|---|---|---|---|---|---|---|---|
| POWER FRAME A | POWER FRAME B | POWER FAIL A | POWER FAIL B | CHG FAIL | I/O FRAME FUSE | LINE CONT X | LINE CONT Y |
| (POWER FAILURE IN PWR FR A) | (POWER FAILURE IN PWR FR B) | (SPARE BIT FOR SIDE A POWER FAILURE) | (SPARE BIT FOR SIDE B POWER FAILURE) | (CHARGER FAILURE MONITORED BY SGD I ONLY) | (BLOWN FUSE IN I/O FR RING BUS OR +48V COIN CONT) | (POWER FAILURE IN LINE EXPANDER CONT FR X) | (POWER FAILURE IN LINE EXPANDER CONT FR Y) |

FIG. 22L
SGD STATUS REGISTER BIT FORMAT

| 7 | 6 | 5 | 4 | 3 | 2 | 1 | 0 |
|---|---|---|---|---|---|---|---|
| T (TONE) (M) | R (RING) (M) | P (POWER) (M) | C (CLOCK) (M) | E (ENVIR) | M (MISC) | SIDE X ALARM | SIDE Y ALARM |

NOTE: (M) DENOTES THAT ANY CONDITION THAT CAN CAUSE THE BIT TO BE SET CAN BE MASKED BY THE MAINTENANCE PROCESSOR.

SERVICE GROUP DIAGNOSTIC PRIMARY CIRCUIT

FIG. 24a
CLOCK STATUS REGISTER BIT FORMAT

| 7 | 6 | 5 | 4 | 3 | 2 | 1 | 0 |
|---|---|---|---|---|---|---|---|
| EA | EB | IA | EM&A | XON | YON | XA | YA |
| (CLOCK ERROR IN A) | (CLOCK ERROR IN B) | (ILLEGAL SWITCH ACTION) | (M&A CLOCK ERROR) | (MASTER CLOCK X ON-LINE) | (MASTER CLOCK Y ON-LINE) | (ALARM, MASTER CLOCK X) | (ALARM, MASTER CLOCK Y) |

FIG. 24b
CLOCK B STATUS REGISTER BIT FORMAT

| 7 | 6 | 5 | 4 | 3 | 2 | 1 | 0 |
|---|---|---|---|---|---|---|---|
| NCD | FCD | EB0 | SPARE | EB2 | EB3 | EB4 | EB5 |

(CLOCK B STATUS REGISTER CONTAINS SAME INFORMATION FOR B-SIDE CLOCK DISTRIBUTION THAT CLOCK A STATUS REGISTER, ABOVE, CONTAINS FOR A-SIDE CLOCK DISTRIBUTION.)

FIG. 24c
CLOCK A STATUS REGISTER BIT FORMAT

| 7 | 6 | 5 | 4 | 3 | 2 | 1 | 0 |
|---|---|---|---|---|---|---|---|
| NCD | FCD | EB0 | SPARE | EB2 | EB3 | EB4 | EB5 |
| (ON-LINE ALM, MA CLOCK DISTR) | (OFF-LINE ALM, MA CLK DISTR) | (CLOCK ERROR, MA CLOCK DISTR) | | (CLOCK ERROR AN I LOC CLK DISTR, CCS0) | (CLOCK ERROR AN I LOC CLK DISTR, CCS1) | (CLOCK ERROR AN I LOC CLK DISTR, CCS2) | (CLOCK ERROR AN I LOC CL DISTR, CCS3) |

FIG. 24d
TONE STATUS REGISTER BIT FORMAT

| 7 | 6 | 5 | 4 | 3 | 2 | 1 | 0 |
|---|---|---|---|---|---|---|---|
| SX | FX | SY | FY | IA | SPARE ALARM 3 | SPARE ALARM 2 | SPARE ALARM 1 |
| (STATUS OF PRECISE TONE GEN X) | (FAILURE IN PRECISE TONE GEN X) | (STATUS OF PRECISE TONE GEN Y) | (FAILURE IN PRECISE TONE GEN Y) | (ILLEGAL SWITCH) | (NOT CONNECTED) | (NOT CONNECTED) | (NOT CONNECTED) |

FIG. 24e
RING STATUS REGISTER BIT FORMAT

| 7 | 6 | 5 | 4 | 3 | 2 | 1 | 0 |
|---|---|---|---|---|---|---|---|
| IX | IY | INEM | IEM | MON 2 | MON 1 | IA | FA |
| (RING INT X) | (RING INT Y) | (RING INT NEM) | (RING INT EMER ALM) | (RING GEN FAILURE FROM MON -2 SIDE Y) | (RING GEN FAILURE FROM MON -1 SIDE X) | (ILLEGAL RING INT SWITCHING) | (ROH GEN GEN ALM) |

FIG. 24f
FLAG INTERRUPT REGISTER BIT FORMAT

| 7 | 6 | 5 | 4 | 3 | 2 | 1 | 0 |
|---|---|---|---|---|---|---|---|
| SGD 1 (CCS 0) | SGD 2 (CCS 1) | SGD 3 (CCS 2) | SGD 4 (CCS 3) | SPARE | SPARE | SPARE | SPARE |

FIG. 24g
SGD STATUS REGISTER BIT FORMAT

| 7 | 6 | 5 | 4 | 3 | 2 | 1 | 0 |
|---|---|---|---|---|---|---|---|
| T (TONE) (M) | R (RING) (M) | P (POWER) (M) | C (CLOCK) (M) | E (ENVIR) | M (MISC) | SIDE X ALARM X ALM | SIDE Y ALARM Y ALM |

NOTE: (M) DENOTES THAT ANY CONDITION THAT CAN CAUSE THE BIT TO BE SET CAN BE MASKED BY THE MAINTENANCE PROCESSOR.

FIG. 25a
MASK CONTROL REGISTER I BIT FORMAT

| 7 | 6 | 5 | 4 | 3 | 2 | 1 | 0 |
|---|---|---|---|---|---|---|---|
|   |   |   |   |   |   | REMOVE | SET |
| MASK REGISTER NO. | | | | MASK BIT NO. | | MODE CONTROL | |

FIG. 25b
CONTROL REGISTER 2 BIT FORMAT

| 7 | 6 | 5 | 4 | 3 | 2 | 1 | 0 |
|---|---|---|---|---|---|---|---|
| MASTER CLOCK | SIDE | TEST CLOCK DISTR | TEST MASTER CK DISTR |   |   | EQUIP CONT 2 | EQUIP CONT 1 |
| (1=X, 0=Y) | (1=A, 0=B) | | | CLOCK TEST MODE | | (CONTROLS CUST EQUIP) | (CONTROLS CUST EQUIP) |

FIG. 25c
CONTROL REGISTER BIT FORMAT

| 7 | 6 | 5 | 4 | 3 | 2 | 1 | 0 |
|---|---|---|---|---|---|---|---|
| XFER | EQUIP CONT 5 | RPA | X̄/Y | EQUIP CONT 4 | RPTX | RPTY | EQUIP CONT 3 |
| (TRANSFER TO OTHER RING INT) | (CONTROLS CUST EQUIP) | (RELEASE RING INT ALARM) | (SWITCH TO OTHER PRECISE TONE GEN) | (CONTROLS CUST EQUIP) | (RESET FAILURE IN PRECISE TONE GEN X) | (RESET FAILURE IN PRECISE TONE GEN Y) | (CONTROLS CUST EQUIP) |

BASIC BLOCK DIAGRAM
PORT CONTROL DIAGNOSTIC CKT

PCD CARD UTILIZATION

FIG. 29  FUNCTIONAL BLOCK DIAGRAM
TEST CALL GENERATOR I

TEST CALL GENERATOR III BLOCK DIAGRAM

TEST CALL GENERATOR CKT II

FIG. 32a

REGISTER 0 — EXTERNAL SEIZURE STEP-BY-STEP TEST MONITOR

| 7 | 6 | 5 | 4 | 3 | 2 | 1 | 0 |
|---|---|---|---|---|---|---|---|
| CALLED PORT | | | | CALLING PORT | | | |
| MONITORS EXT. SEIZURE OF LOOP OR E&M TRUNK | MONITORS EXT. GROUND-START SEIZURE | SPARE | SPARE | MONITORS EXT. SEIZURE OF LOOP OR E&M TRUNK | MONITORS EXT. GROUND-START SEIZURE | MONITORS INT. S-LEAD GND & HS-OR CE-LEAD ANS SUPERVISION | SPARE |

REGISTER 1 — CALLING PORT PARAMETERS

| 7 | 6 | 5 | 4 | 3 | 2 | 1 | 0 |
|---|---|---|---|---|---|---|---|
| SIGNALING EQUIP | | PARTY IDENTIFICATION | | | SIGNALING MODE | | |
| LOOP | E&M LEADS | PARTY NO. 4* | PARTY NO. 3* | SPARE | DTMF | TOLL MF | DP |

*BOTH SET SELECTS PARTY NO. 2, NEITHER SET SELECTS PARTY NO. 1

REGISTER 2 — CALLED PORT PARAMETERS

| 7 | 6 | 5 | 4 | 3 | 2 | 1 | 0 |
|---|---|---|---|---|---|---|---|
| SIGNALING EQUIP | | DETECT RINGING ON RING LEAD WHEN THIS BIT SET | SPARE | CONVERT TO 4-WIRE E&M TRUNK | SPARE | SIGNALING MODE | |
| LOOP | E&M LEADS | | | | | TOLL MF | DP |

REGISTER 3 — CALLING PORT ACTION

| 7 | 6 | 5 | 4 | 3 | 2 | 1 | 0 |
|---|---|---|---|---|---|---|---|
| SPARE | SPARE | SPARE | DIAL DIGIT | GROUND INSIDE RING LEAD | APPLY TEST TONE | OFF HOOK | ON HOOK |

REGISTER 4 — CALLING PORT DIGIT & CALLED PORT ACTION

| 7 | 6 | 5 | 4 | 3 | 2 | 1 | 0 |
|---|---|---|---|---|---|---|---|
| VALUE OF DIGIT TO BE DIALED | | | | CALLED PORT ACTION | | | |
| | | | | SPARE | APPLY TEST TONE | OFF HOOK | ON HOOK |

REGISTER 5
EXPECTED RESPONSE

| 7 | 6 | 5 | 4 | 3 | 2 | 1 | 0 |
|---|---|---|---|---|---|---|---|
| SPARE | RINGING DETECTED | BROADBAND (MF) TONE DETECTED | OUTPULSING COMPLETED | GROUND ON TIP LEAD DETECTED | TEST TONE DETECTED | OFF HOOK DETECTED | ON HOOK DETECTED |

REGISTER 6
RESPONSE PARAMETERS

| 7 | 6 | 5 | 4 | 3 | 2 | 1 | 0 |
|---|---|---|---|---|---|---|---|
| SIDE TO RESPOND | DETECT RINGING ONLY DURING SPECIFIED PHASE | SPECIFIED RINGING PHASE | | NUMBER OF DIGITS TO BE OUTPULSED | | | |

0 = CALLING SIDE
1 = CALLED SIDE

REGISTER 7
TIMING

| 7 | 6 | 5 | 4 | 3 | 2 | 1 | 0 |
|---|---|---|---|---|---|---|---|
| TIMER APPLICATION | | | TIME ARGUMENT | | | | |

00 = DELAY BEFORE ACTION
01 = DURATION OF ACTION
10 = DURATION OF RESPONSE INDICATION
11 = NOT ASSIGNED

REGISTER 8
REPLY
(READ BY MAINTENANCE PROCESSOR)

| 7 | 6 | 5 | 4 | 3 | 2 | 1 | 0 |
|---|---|---|---|---|---|---|---|
| SPARE | SPARE | SPARE | SPARE | RELAY FAIL | DONE | SEIZURE FROM OUTSIDE | |
| | | | | | | CALLED PORT | CALLING PORT |

FIG. 32b

TEST ACCESS CIRCUITRY

SYNCHRONIZER INTERFACE BLOCK DIAGRAM

SYNCHRONIZER LOGIC CKT.

DATA BUS COMPARISON CIRCUIT

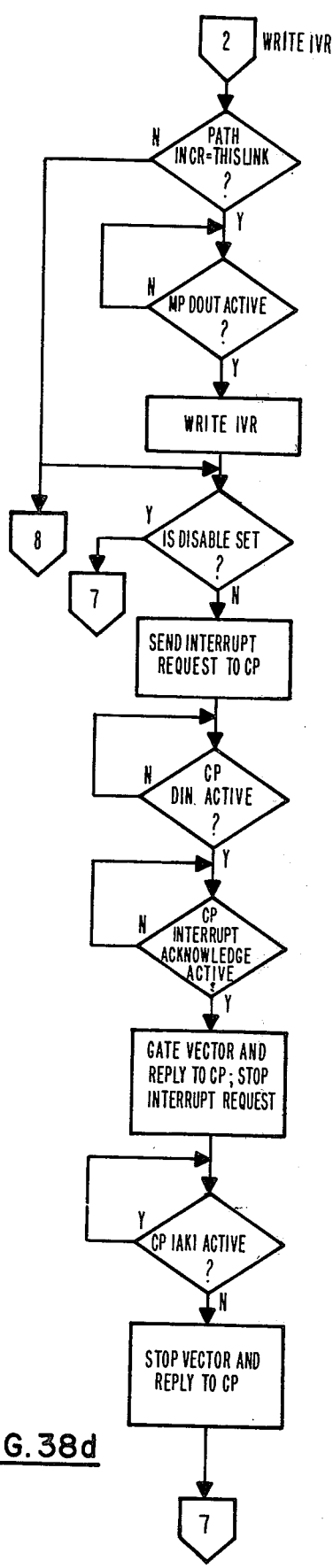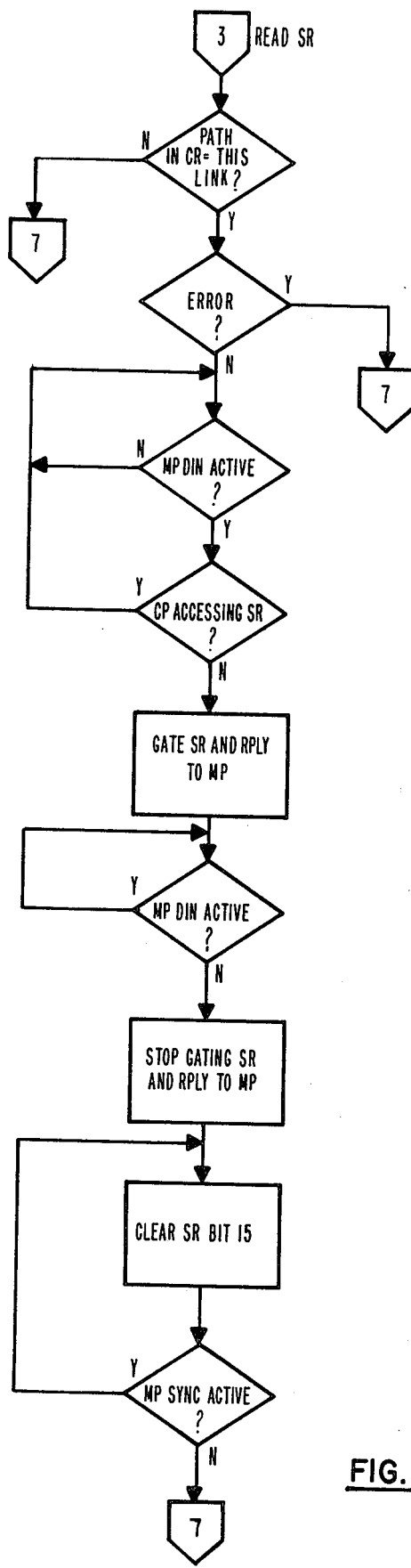
FIG.38d
FIG.38e

FIG. 39a — DATA LINK COMMAND REGISTER

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| ACCESS LINK A | ACCESS LINK B | | RESET LINK | DISABLE LINK | DMA REQUEST | LINK TEST MODE | | | EXTENDED DMA ADDRESS | EXTENDED DMA ADDRESS | EXTENDED DMA ADDRESS | DISABLE MP INTERRUPTS | | | |

FIG. 39b — DATA LINK STATUS REGISTER

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| CP MESSAGE READY | SYNC FLAG | SP | SP | ON LINE | ILLEGAL COMMAND ERROR | SP | SP | PATH SELECT | PATH SELECT | SP | SP | SP | SP | SP | SP |

FIG. 39c — DATA LINK INTERRUPT VECTOR REGISTER

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| | | | | | | | | | | | | | | | |

FIG. 39d — DATA LINK ADDRESS REGISTER (STORES MP ADDRESS ON MP/CP BUS CYCLE)

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| | | | | | | | | | | | | | | | |

REGISTER ACCESS LOGIC CKT.

REGISTER ACCESS LOGIC CKT.

REGISTER ACCESS LOGIC CKT.

NOTE: THE SEQUENCE DOES NOT COMPLETE UNTIL NEXT TIME DIN IS ASSERTED.

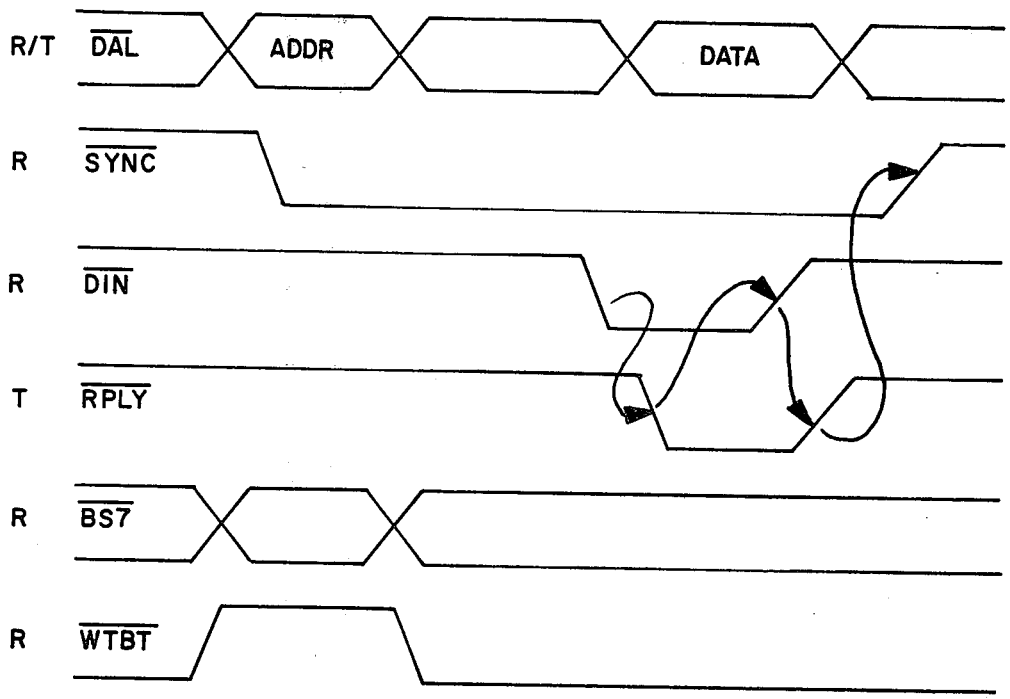
FIG. 40f
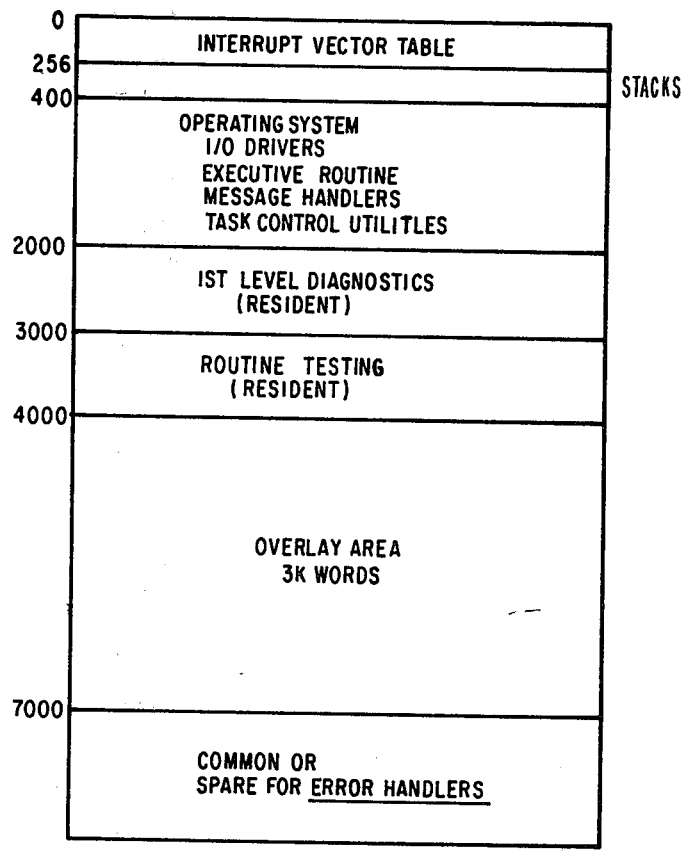
FIG. 41   MAINTENANCE PROCESSOR MEMORY MAP FOR CCF SYSTEM

|  | CONTROL WORD | ENTRY POINT | TIME WORD | |
|---|---|---|---|---|
| HIGHEST PRIORITY |  |  |  | ⎫ |
|  |  |  |  | ⎪ RESIDENT DIAGNOSTIC |
|  |  |  |  | ⎬ TASKS |
|  |  |  |  | ⎪ (SINGLE PROGRAM) |
|  |  |  |  | ⎭ |
|  |  |  |  | ⎫ OVERLAY TASK ⎫ DUAL PROGRAM |
|  |  |  |  | ⎬ ROUTINE ⎬ MODE |
| LOWEST PRIORITY |  |  |  | ⎭ TESTING ⎭ POSSIBLE |

CONTROL WORD: ACTIVE / INACTIVE (1 BIT)
  I/O LOCKOUT (1 BIT)
  STACK INDICATOR (1 BIT)
  INITIAL ENTRY (1 BIT)
  MODE - SINGLE / DUAL (1 BIT)
  TIMEOUT FLAGS (2 BITS)
  HIGH PRIORITY (1 BIT)

ENTRY POINT: INITIAL PROGRAM ENTRY POINT; USED WHEN ROUTINE OR TASK IS STARTED AS OPPOSED TO REACTIVATED AFTER INTERRUPT.

TIME WORD: TIME OFFSET PARAMETER USED IN TIMEOUT OR HIGH PRIORITY OPERATIONS. THE PARAMETER IS DECREMENTED ON OCCURENCE OF EACH TIME CLOCK INTERRUPT.

FIG. 42
TASK SCHEDULE TABLE

FLDSUP FLOWCHART

SECOND LEVEL DIAGNOSTICS INITIALIZATION MODULE
SLDI

COMMON CONTROL DIAGNOSTIC INITIALIZATION MODULE

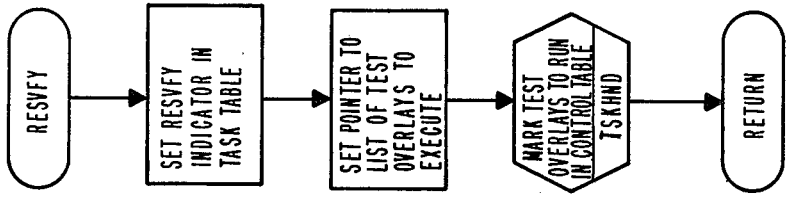

FIG. 44f

RESTORE VERIFICATION INITIALIZATION MODULE

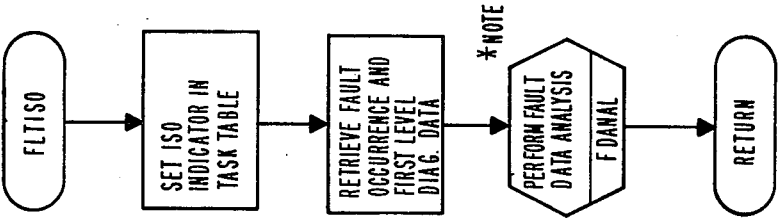

FIG. 44e

FAULT ISOLATION INITIALIZATION MODULE

*NOTE: ANALYZES FAULT DATA AND SELECTS SECOND LEVEL DIAGNOSTIC TESTS TO EXECUTE TO ISOLATE THE FAULT.

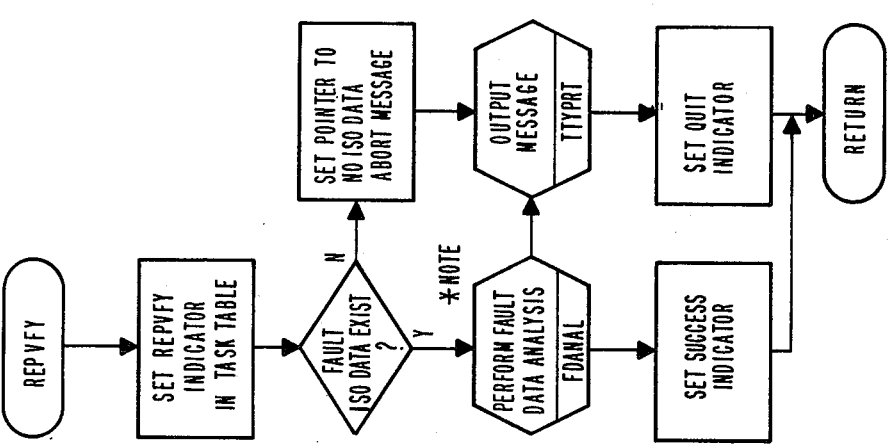

FIG. 44d

REPAIR VERIFICATION INITIALIZATION MODULE

*NOTE: ANALYZES FAULT DATA AND SELECTS SECOND LEVEL DIAGNOSTIC TESTS TO EXECUTE TO REPRODUCE THOSE TESTS RUN DURING FAULT ISOLATION.

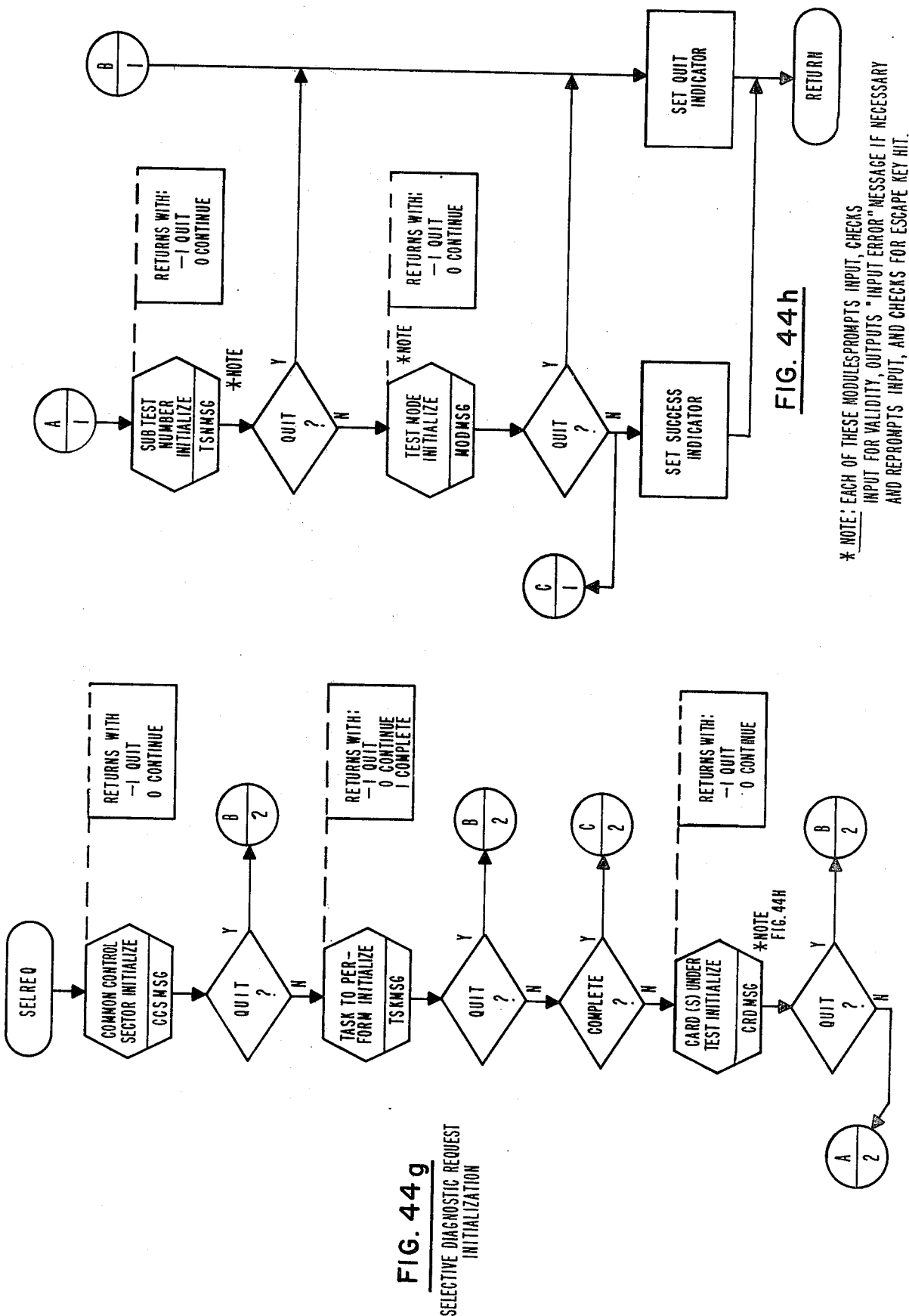

SECOND LEVEL COMMON CONTROL DIAGNOSTIC CONTROL MODULE

*NOTE: REPEAT TEST STOPPED INDICATOR SET AS THE RESULT OF A $ STOP COMMAND BEING INPUTTED BY THE CRAFTSPERSON.

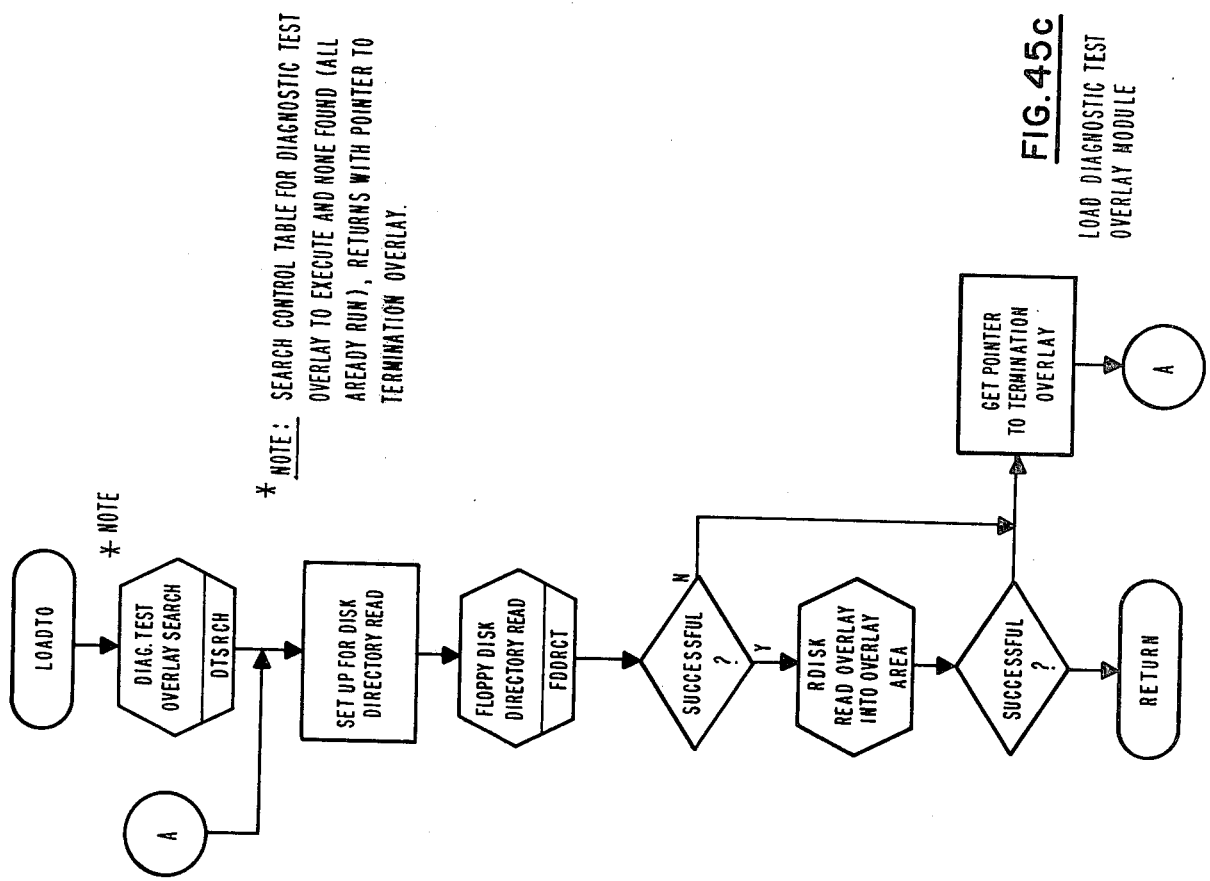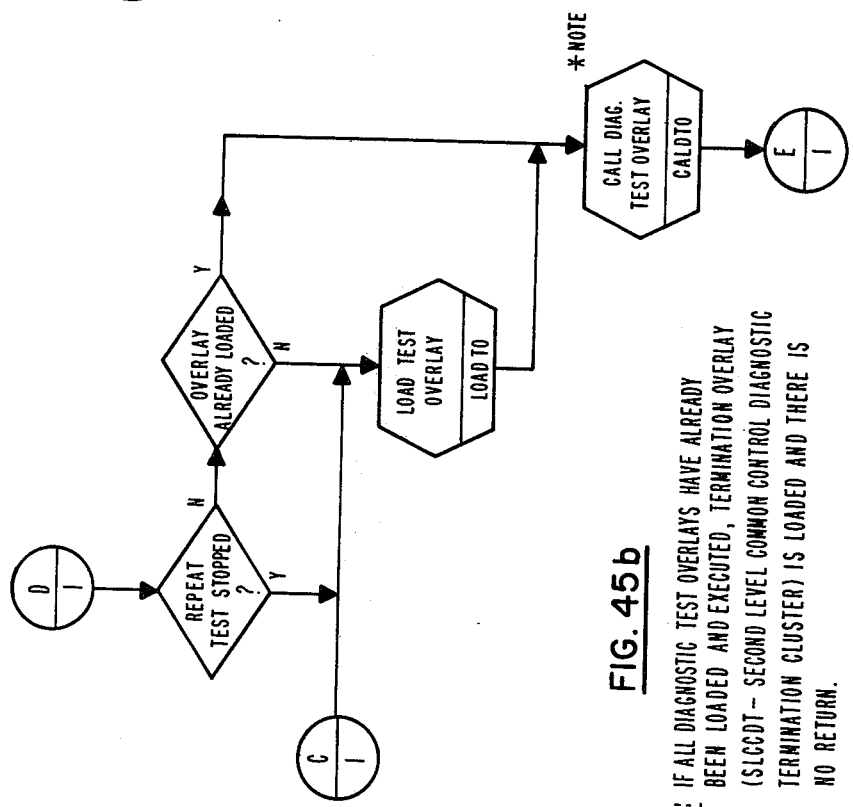

SECOND LEVEL COMMON CONTROL DIAGNOSTIC TERMINATION
CLUSTER STRUCTURE CHART

SYSTEM STATUS WORD - SSWI

ALARM LEVEL - ALARML

PSTAT:

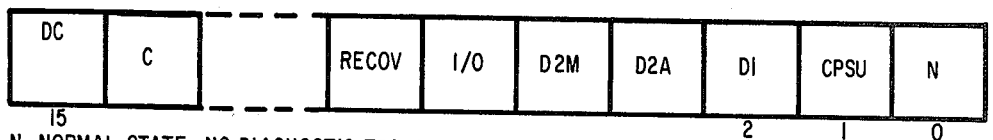

N - NORMAL STATE, NO DIAGNOSTIC TASKS IN OPERATION
CPSU - CALL PROCESSOR STARTUP IN PROGRESS
DI - FIRST LEVEL DIAGNOSTICS IN PROGRESS
D2A - SECOND LEVEL DIAGNOSTICS IN PROGRESS (AUTOMATIC)
D2M - SECOND LEVEL DIAGNOSTICS IN PROGRESS (MANUAL)
I/O - 0 - D2 TESTING COMMON CONTROL
      1 - D2 TESTING I/O AREA
RECOV - RECOVERY IN PROGRESS

SECOND LEVEL EXIT RESULTS - SEXR
        USED BY SECOND LEVEL DIAGNOSTIC PROGRAM TO PASS DATA TO DIAGC

FIRST LEVEL EXIT RESULTS - FEXR
        USED BY FIRST LEVEL DIAGNOSTIC PROGRAM TO PASS DATA TO DIAGC

SYSTEM STATE - STATE
        1 - ONLY MP RUNNING
        2 - MP AND 1 CP RUNNING (CALL PROCESSING ON)
        3 -
        4 - ALL OK

FIG. 48c
DIAGNOSTIC PROCESSING STATUS - PSTAT

ONCOND:

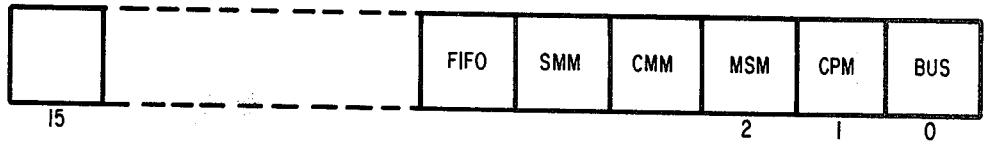

BUS - MP BUS TIMEOUT
CPM - CP BUS MISMATCH                FIFO - PCD FIFO NOT EMPTY          1 = YES
MSM - MATRIX SWITCH MISMATCH                                            0 = NO
CMM - CONTROLLER MISMATCH
SMM - SUPY BIT MISMATCH              · · TO BE DEFINED (FLAGS AND ALGORITHMS ARE TRIGGERED BY ON MACRO:

ON MPBUST, # LABEL
        ON CPBUST, # LABEL
        ETC.

WHERE LABEL SPECIFIES THE ENTRY POINT OF A PROGRAM SEQUENCE (PART OF A
DIAGNOSTIC PROGRAM) TO BE ENTERED UPON DETECTION OF THE INDICATED ERROR.

THE ON CONDITION IS CANCELLED BY ON CONDITION, #0

FIG. 48d
ON CONDITIONS FLAGS - ONCOND

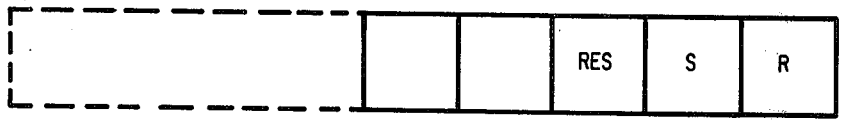

```
REPAL:: (RECOV)      8 7            210
        (SW)     | LIMIT  |  COUNT  |
        (REST)   |        |         |
        (RESET)  |        |         |
```

REPETITION ALARM - REPAL

REPALS:

```
|----|----|----|----|----|----|----| RES | S | R |
```

1 = YES
0 = NO

R - TOO MANY RECOVERIES         RES - TOO MANY RESETS
S - TOO MANY SWITCHOVER         REST - TOO MANY RESTARTS

FIG.48e

ALARM STATUS - REPALS

```
 15  14  13  12  11   10   9    8   7   6    5    4    3   2   1   0
|   |   |   |   |SB |PCS |PWR |MS |   |WTO|SANIT|CPU |REPL|ITO|DTO|RTO|
|   |   |   |   |   |PAR |CLK |TO |0  |   |     |PAR | TO |   |   |   |
SIDE A
 15  14  13  12  11   10   9    8   7   6    5    4    3   2   1   0
|   |   |   |   |SB |PCS |PWR |MS |   |WTO|SANIT|CPU |REPL|ITO|DTO|RTO|
|   |   |   |   |   |PAR |CLK |TO |0  |   |     |PAR | TO |   |   |   |
SIDE B
```

RTO  - START TIMEOUT (SYNCHRONIZER)          WTO - WATCHDOG TIMEOUT
DTO* - DMA TIMEOUT (SYNCHRONIZER)            MSTO - MATRIX SWITCH TIMEOUT
ITO* - INTERRUPT TIMEOUT (SYNCHRONIZER)      PWR/CLK - POWER/CLOCK FAILURE
REPL*- REPLY TIMEOUT (SYNCHRONIZER)          SB - STUCK BIT
CPU PAR - CPU PARITY                         PCS PAR - PCS PARITY
SANIT - SANITY ERROR (SYNCHRONIZER)

* DO NOT SWITCHOVER AUTOMATICALLY

FIG.48f

SIDE DEPENDENT ERRORS (SWITCHOVER CONTROL)

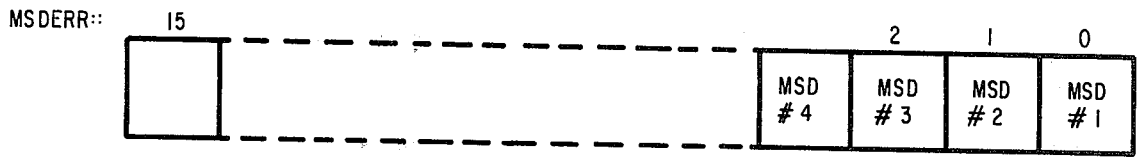
FIG.48g
MSD ERROR STATUS
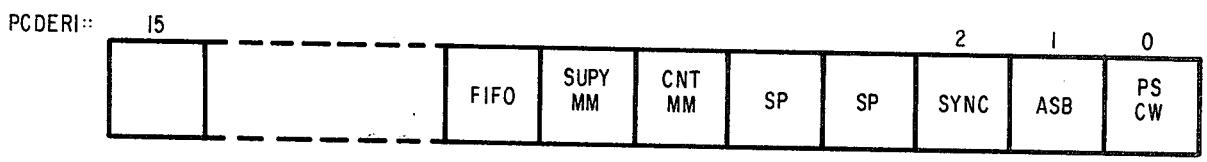
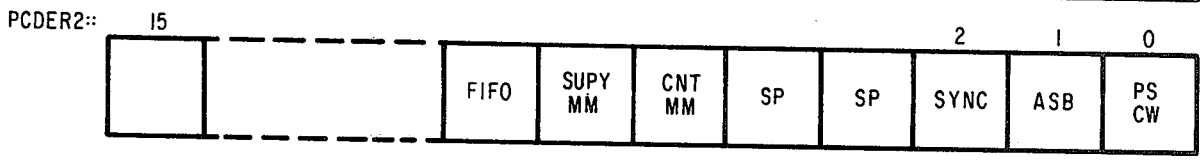
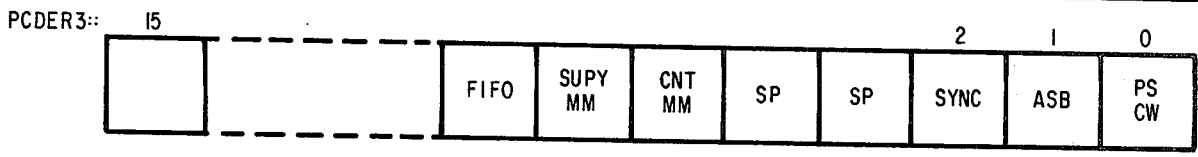
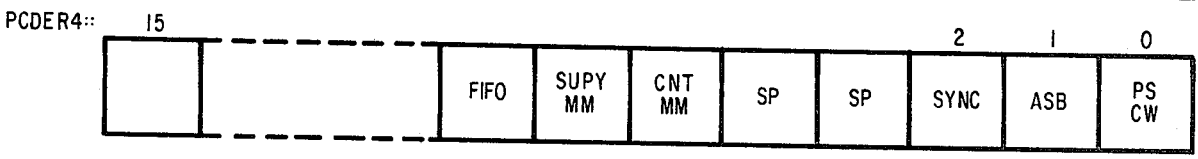
PSCW - PORT STORE CROSS WRITE ERROR
ASB - ALTERNATING SUPY BIT ERROR
SYNC - T & C SYNCH ERROR
SP - SPARE
CNT MM - CONTROLLER / MS MISMATCH
SUPY MM - SUPY DATA MISMATCH
FIFO - FIFO NOT EMPTY
FIG.48h
PCD ERROR STATUS

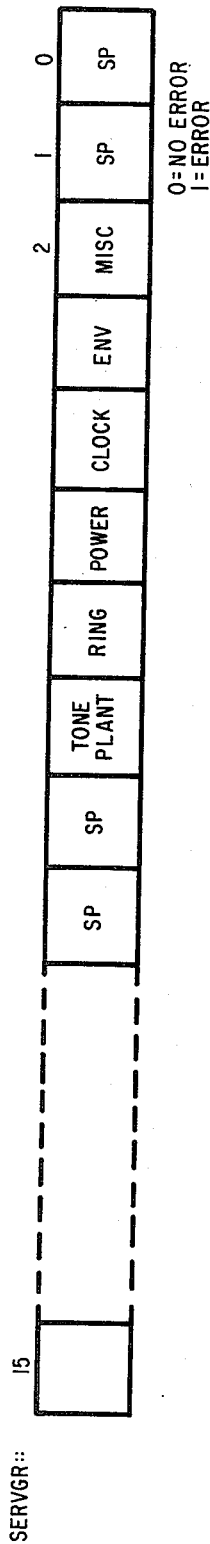

FIG. 48i

SERVICE GROUP ERROR FLAGS

INDICATES THE SYSTEM AREA ON WHICH SECOND LEVEL DIAGNOSTICS IS RUNNING

CC - SECOND LEVEL COMMON CONTROL DIAGNOSTICS
I/O - SECOND LEVEL I/O DIAGNOSTICS
TCS - SECOND LEVEL TAPE CONTROL SYSTEM DIAGNOSTICS
M&A - SECOND LEVEL MAINTENANCE & ADMINISTRATIVE SYSTEM DIAGNOSTICS
LXC - SECOND LEVEL LINE EXPANDER CONTROL DIAGNOSTICS

FIG. 48j

SECOND LEVEL DIAGNOSTIC PROCESSING STATUS - PSTAT2

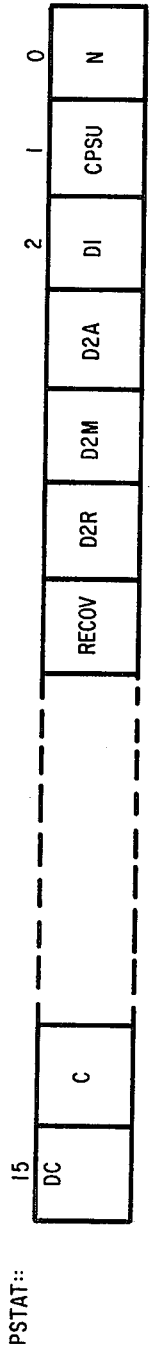

PSTAT:

| 15 | | | | | | 2 | 1 | 0 |
|---|---|---|---|---|---|---|---|---|
| DC | | RECOV | D2R | D2M | D2A | DI | CPSU | N |
| C | | | | | | | | |

N - NORMAL STATE, NO DIAGNOSTIC TASKS IN OPERATION
CPSU - CALL PROCESSOR STARTUP IN PROGRESS
DI - FIRST LEVEL DIAGNOSTICS IN PROGRESS
D2A - SECOND LEVEL DIAGNOSTICS IN PROGRESS (AUTOMATIC)
D2M - SECOND LEVEL DIAGNOSTICS IN PROGRESS (NORMAL)
D2R - SECOND LEVEL DIAGNOSTICS IN PROGRESS (ROUTINE TEST)
RECOV - RECOVERY IN PROGRESS

SECOND LEVEL EXIT RESULTS - SEXR
  USED BY SECOND LEVEL DIAGNOSTIC PROGRAM TO PASS DATE TO DIAGC.

FIRST LEVEL EXIT RESULTS - FEXR
  USED BY FIRST LEVEL DIAGNOSTIC PROGRAM TO PASS DATA TO DIAGC.

SYSTEM STATE - STATE
  1 - ONLY MP RUNNING
  2 - MP AND 1 CP RUNNING (CALL PROCESSING ON)
  3 -
  4 - ALL OK.

FIG. 48k

DIAGNOSTIC PROCESSING STATUS - PSTAT

CONTROL SYSTEM FOR TELEPHONE SWITCHING SYSTEM

BACKGROUND OF THE INVENTION

This invention generally relates to telephone switching systems and more specifically to a fault monitoring and diagnostic control for such a telephone system.

Early mechanical telephone switching systems incorporated essentially no fault monitoring and diagnostic controls. Faults were generally detected when a telephone line faulted. Then maintenance personnel set out to locate the fault and repair it.

More recently, however, telephone switching systems have become more sophisticated. They incorporate digital data processing equipment as control elements. The analog signals now are converted into binary form for switching purposes, and the binary signals then are converted back to analog form.

At least some of these systems include some form of automatic fault monitoring and diagnostic control circuitry. More specifically, in one such system two independent telephone switching circuits are cross coupled. One circuit performs the actual telephone switching while the second circuit monitors operations in the one circuit. If a fault is detected, the second circuit provides the actual switching while the first assumes the role of the fault monitor. Telephone switching systems of this type are characterized by using large, expensive specially designated data processing equipment.

It is an object of this invention to provide an automatic fault monitoring and diagnostic control system for a telephone switching system.

Another object of this invention is to provide an automatic fault monitoring and diagnostic control circuit for a telephone switching system that utilizes commercially available data processing equipment.

SUMMARY

In accordance with this invention a fault monitoring and diagnostic control system connects to redundant telephony switching, or call processor, systems. The control system selects one call processor system to perform actual call processing while the other system is held in a standby status. Although one call processor system is not actively involved in telephony switching, it performs all operations in synchronism with the active call processor system in response to synchronization circuitry in the control system.

A switchover controller in the control system receives inputs from several fault monitoring circuits disposed at critical locations within both of the redundant call processor systems. If a fault occurs and the fault is immediately diagnosed as occurring in the active call processor system (i.e., a side-determinant fault), the switchover controller automatically transfers active call processing to the standby call processor system.

During operations a maintenance process or in the control system detects faults that are not side determinant (1) by comparing or matching signals representing various operations in each of the call processor systems, (2) by detecting error flags associated with non-side determinant circuitry of each call processing system, and (3) by generating and performing test calls on an automatic basis. If the maintenance processor, during its repetitive evaluation of the call processor systems for fault, detects a fault in the active call processor system, it causes the switchover controller to transfer active call processing to the standby call processor system.

This invention is pointed out with particularity in the appended claims. The above and further objects and advantages of this invention may be better understood by referring to the following description of an illustrative embodiment of the invention taken in conjunction with the accompanying drawings.

BRIEF DESCRIPTION OF THE DRAWINGS

FIG. 8 depicts the organization of registers in the maintenance bus interface shown in FIG. 6;

FIG. 12 depicts the organization of command registers in the switchover control shown in FIG. 9;

FIG. 13 depicts the organization of status registers in the switchover control shown in FIG. 9;

FIGS. 22a through 22h and 22j through 22e depict status and control registers in the circuitry of FIG. 21;

FIGS. 24(a) through 24(g) depict the status registers in the circuitry of FIG. 23;

FIGS. 25(a) through 25(c) depict the control registers in the circuitry of FIG. 23;

FIGS. 32a and 32b depict the bit designations for status registers of the test call generator circuitry shown in FIG. 29;

FIGS. 39a through 39d depict the control and status registers in the data link of FIG. 37;

FIGS. 40a through 40f depict register access logic circuitry and respective timing diagrams for the data link shown in FIG. 37;

FIGS. 41 and 42 are memory maps for the maintainance processor memory shown in FIG. 4;

FIGS. 44a through 44h comprise a flow diagram of the second level diagnostic routines performed in accordance with this invention;

FIGS. 45a through 45c comprise a flow diagram of the second level diagnostic routines performed in accordance with this invention;

FIGS. 47a through 4c constitute a flow diagram of the respective states of FIG. 1; and FIGS. 48a through 48k depict system status registers associated with the data base for the first and second level diagnostics.

DESCRIPTION OF AN ILLUSTRATIVE EMBODIMENT

Figure 1:
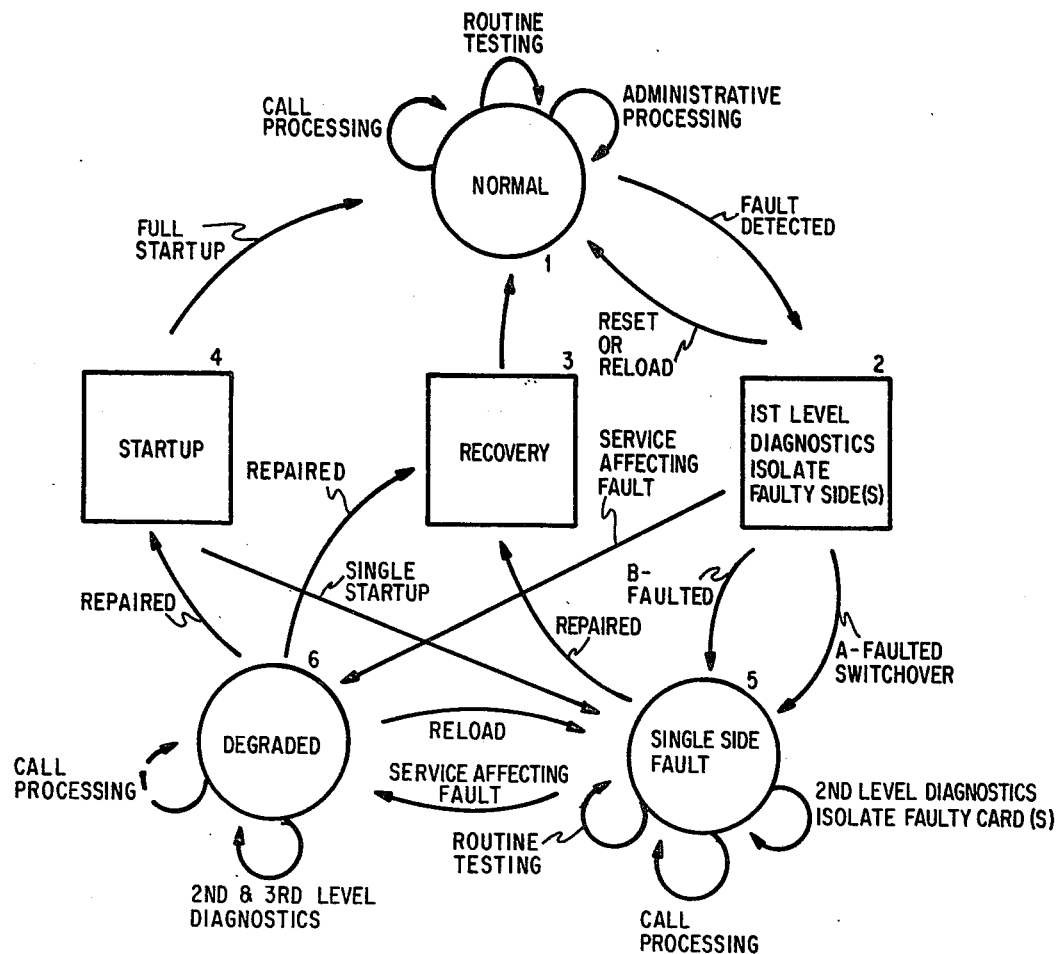
FIG. 1 is a state diagram that depicts the operation of a telephony system constructed in accordance with this invention.

The general underlying operation of a telephony switching system constructed in accordance with this invention is shown by the state diagram of FIG. 1. State 1 represents the normal operating condition in which call processing, routine testing and administrative processing are performed. A controllable switchover controller determines which of two call processor systems are linked with the telephone lines, or port groups, to transfer signals to those lines. This call processor system is called the "on-line" system while the other is called a "standby" system.

Upon detection of a fault by a maintenance processor or error monitoring circuitry, the system moves into transitory state 2. In that state first level diagnostics are performed to isolate the faulty side of the system. If the fault is in the standby system, no switching action occurs. If the on-line system is faulty, all port group connections are switched to the stand-by system for operation in state 5 whereupon call processing and routine testing continue with only one system operational. In either case, the maintenance processor then performs second level diagnostics through controllable diagnostic circuits to isolate faults in the standby, or off-line, call processor system. From state 5, the system may be brought back to normal state 1 through transitory recovery action 3 after repair, or the entire system may remain at state 5 if repair cannot be effected. Once a repair is made, the system is returned to the normal state 1 through a recovery action 3. A more detailed explanation of these states actions and the transfers between states and actions is set forth later.

Figure 4:
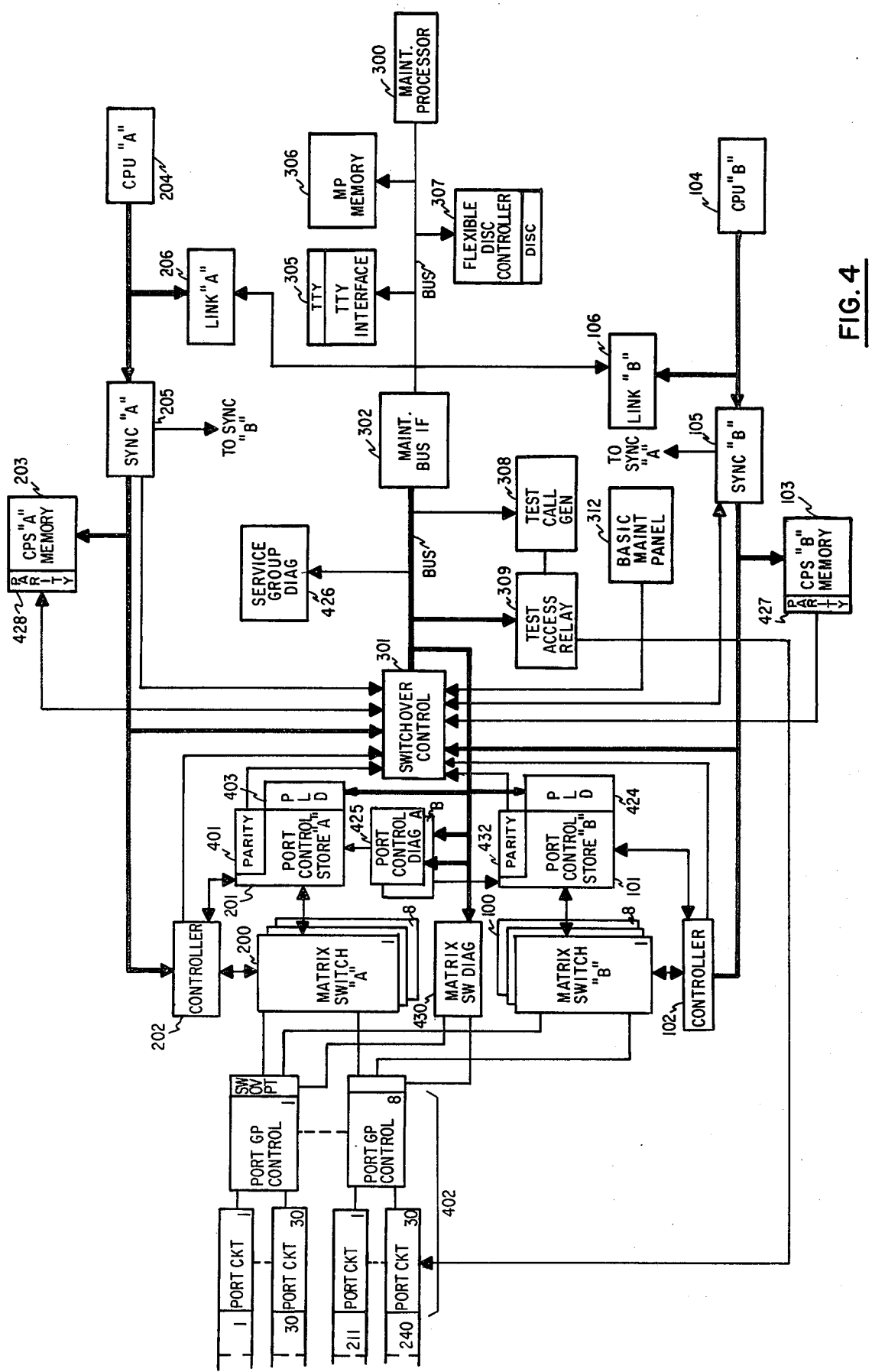
FIG. 4 is a block diagram of a telephony system constructed in accordance with this invention.

FIG. 4 discloses a complete telephone switching system. One call processor system (designated as a "B" system) includes a matrix switch 100 as part of a time slot interchange (TSI) network 403-B, port control store 101 as part of network 405-B, a matrix switch controller 102 as part of network 403-B, a central processing unit (CPU) 104 and a call processor system memory 103 as part of network 408-B, and a synchronizer 105. An independently operating redundant system (designated as an "A" system) is also shown as comprising redundant elements 200, 201, 202, 203, 204, and 205 in corresponding networks identified by the suffix "A". During normal operations a maintenance processor 300 and various fault monitoring circuits control a switchover control 301 that determines which of the two call processor systems operate as the on-line system. Such a determination is based upon information supplied by the monitoring circuits. These circuits include controllable matrix switch diagnostic monitor circuitry 420, parity error monitor circuits 421, 422, 427 and 428, program logic diagnostic monitor circuits 423 and 424, port control diagnostic monitor circuitry 425, and service group diagnostic monitor circuitry 426.

Whenever a switchover from one call processor system to another is made during normal state 1, due to a system fault or otherwise, no transfer of information between the call processor systems is necessary because the systems contain identical information at the time of the switchover. However, during a transition from state 5 to normal state 1 interconnection and housekeeping data from the on-line system are automatically transferred to the stand-by system to insure that the data bases are identical.

A test call generator 308 generates test calls automatically and periodically to test, on a routine basis, the entire telephony system. The test calls are routed through a controllable test accesss relay network 309 for direct connection to the telephone line circuits 310, as described later.

The system is also supplemented by a basic maintenance panel 312 for displaying information and for controlling the system manually. There also may be associated with the maintenance processor a disc controller and drive 307, an input/output device such as a teletypewriter 305 and a memory 306.

As previously indicated, the call processor units 104 and 204 operate independently with their associated memories 103 and 203, but are synchronized by circuits 105 and 205. Each of the units 104 and 204 is capable of handling interconnect and call progression duties of port circuits 310 through their respective switch matrices 100 and 200, depending upon which call processor system is on line. Links 106 or 206 facilitate the transfer of supervisory and communications data between maintenance processor 300 and either or both of the call processor systems. The maintenance bus interface 302 interfaces the maintenance processor 300 with the various fault monitoring circuits and switchover controller 301 through status and command registers permitting a large number of maintenance and diagnostic devices to be accommodated by the maintenance processor bus. It also provides the maintenance processor 300 with flexibility in handling interrupts from error flags generated by devices on the maintenance bus. In addition, the interface 302 contains bus drivers and receivers, time buffering and/or latching circuits, 8-bit to 16-bit data translation circuits, expanded addressing circuits and interrupt signal concentration circuits.

Description of Redundant Call Processing System

A. MAJOR SYSTEM SUBDIVISIONS

The call processor systems as independent entities are described in U.S. Application Ser. No. 864,401, filed Dec. 27, 1977 and U.S. Application Ser. No. 924,767, filed July 14, 1978. However, the following discussion is provided as background for an understanding of the invention.

Figure 2A:
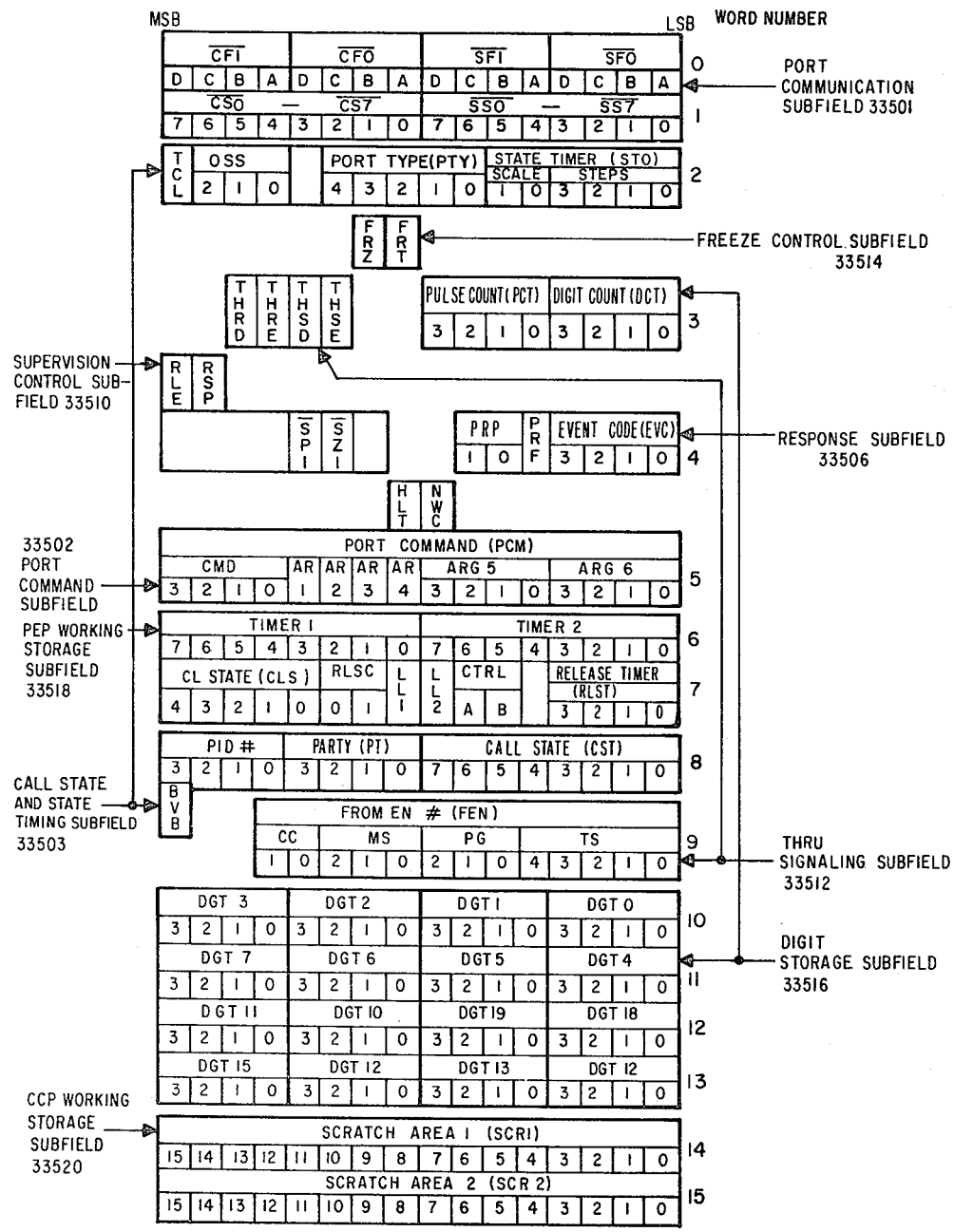
FIG. 2 comprises FIGS. 2-1 and 2-2 and is a block diagram of a call processor system adapted to utilize this invention and FIG. 2A depicts a port data field.
Figures 1, 2:
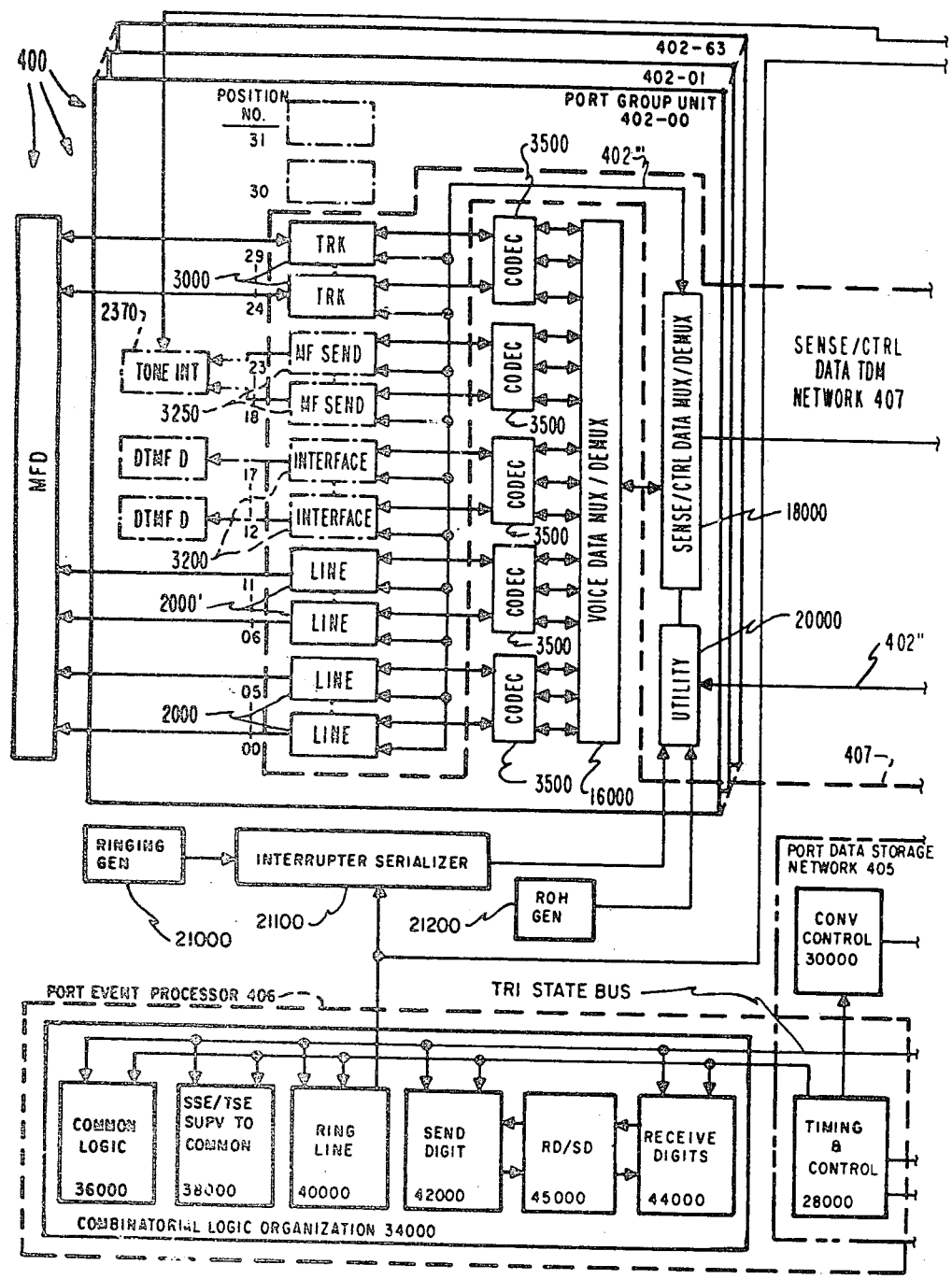
Figure 2:
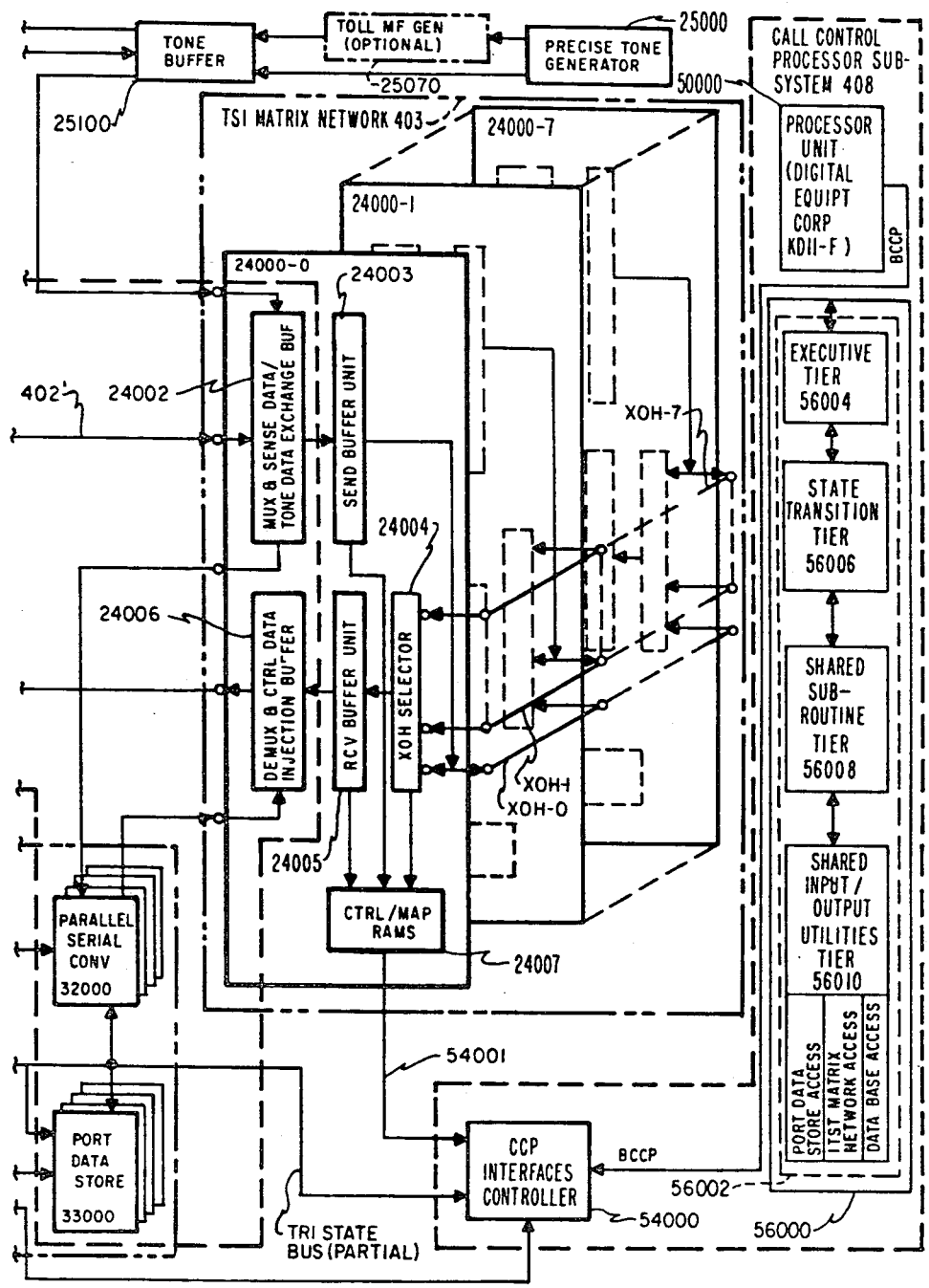

Referring now to FIG. 2, the major subdivisions of one of the independently operating end office switching systems, or call processor systems, 400 to which fault monitoring circuits are connected comprises a plurality of port group units 402; a timeslot interchange (TSI) matrix switch network 403; a port data storage network 405; a port event (PEP) processor 406; sense/control time division multiplex (TDM) network 407, and a call control processor (CCP) subsystem 408. TSI matrix network 403 establishes the line-to-line connections, the trunk-line connections, and other equipment to line/-trunk connections which constitute the basic function of end system 400. As is apparent from the block diagram of FIG. 2, overlap exists between these subdivisions. This is because many of the units represented by individual blocks are circuit assemblies of circuits that perform a number of functions. The aforementioned major subdivisions are defined along functional lines, and therefore the overlap exists due to the basic block diagram units performing functions associated with more than one of the functionally defined subdivisions.

B. PORT GROUP UNITS (402)

Figure 3:
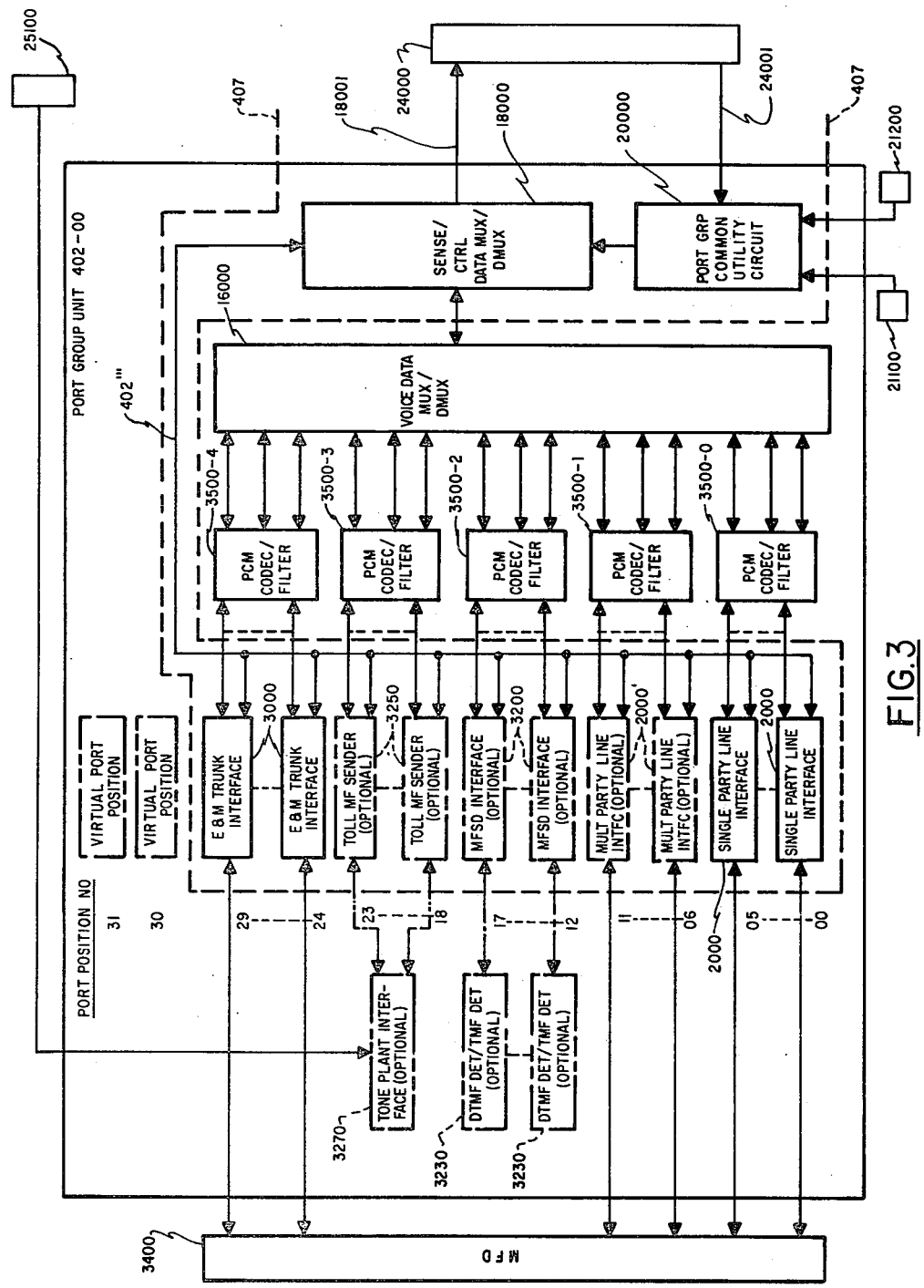
FIG. 3 is a block diagram of a port group unit in the call processor system of FIG. 2.

Referring now to FIG. 3, each port group unit 402 contains the various circuitry which provides the analog-digital transformation and the multiplexing-demultiplexing operation to the conversion between the analog signals of thirty ports and a single serial TDM stream of binary data which connects unit 402 and TSI network 403. The grouping of the signals of all the ports into a single stream of bits facilitates: (i) the communication of voice data between the ports and network 403; and (ii) the communication of sense/control data between the ports and other subdivisions of system 400.

The sense data which is communicated in the direction from the port positions to other subdivisions of system 400 includes data representing the status of incoming line or trunk supervision signals, or data representing incoming dialing signals, or signals representing the state of relays in circuits installed in the port equipment positions. Data of this type is collectively referred to as "sense" data.

The control data which is communicated in the direction toward the ports from various subdivisions of system 400 includes low level signal intelligence for generating outgoing supervision signals on trunks, low level signal intelligence for generating outgoing dialing signals along trunks, and signals for controlling relays in the circuits installed in the port positions. Data of this type is collectively referred to as "control" data.

A monitoring circuit is provided in the port group unit to monitor the operation of the multiplexer-demultiplexer, and upon detection of a fault, an error signal is transmitted to the switchover controller and/or the maintenance bus interface for action by the maintenance processor.

C. PORT EQUIPMENT POSITIONS

Still referring to FIG. 3, each port group unit 402 has thirty (30) port equipment positions and two (2) virtual port positions. The port equipment positions are designated 00 through 29, and there are five groups of six (6) port positions each; namely, 00 through 05, 06 through 11, 12 through 17, 18 through 23 and 24 through 29. (The reason that the port positions have been illustrated in such groupings of six (6) is that each group feeds a common PCM CODEC/filter 3500.) The 30th and 31st port equipment positions are virtual port positions. They do not exist as physical equipment positions into which circuits may be installed. Instead they are virtual positions that permit TDM streams of binary data which have timeslot designations other than voice data timeslots. These extra timeslots are used for the transmission of sense and control data from and to port group unit common circuitry.

Each port circuit has an associated fault monitoring circuit for monitoring the power supplied to the port circuit and whether the circuit is physically connected to the main frame. An alarm is sent to the maintenance processor should the circuit become disconnected or the power supply fall below a certain level.

The thirty port equipment positions 00 . . . 29 are universal. That is to say, any of the various types of port equipment used with system 400 may be installed in each port equipment position. To illustrate this universality, FIG. 3 shows five different types of circuits installed in the various groups of positions. Positions 00 . . . 05 contain a single party line interface circuit 2000. Positions 06 . . . 11 contain a multi-party line interface circuit 2000'. Circuit 2000' is shown as a broken line box indicating that it is optional. Circuits 2000 and 2000' are connected with the outside telephone facilities through a conventional main distribution frame 3400.

Positions 12 . . . 17 contain multifrequency signal detector interfaces 3200, also optional. Interfaces 3200 serve to either interface a dual tone multiple frequency (DTMF) detector through TSI matrix switch network 403, or interface a toll multifrequency (TMF) detector with a toll port via the TSI matrix switch network 403. This is shown by the connection of interfaces 3200 to blocks 3230 which diagramatically represent either a DTMF detector or a TMF detector.

Positions 18 . . . 23 contain toll multifrequency senders 3250, also optional. Senders 3250 receive tones from a tone plant interface 3270, which in turn receives the tones from a tone buffer 25100 (introduced later in subdivision I). Tone buffer 25100 is the output of the tone plant for system 400.

Positions 24 . . . 29 contain E&M trunk interface circuits 3000, which connect to the inteoffice trunk facility through main distribution frame 3400.

D. INTERFACE CIRCUITS/SERVICE CIRCUITS

Each line interface circuit 2000 in FIG. 3 is a controlled interface for conversion between the two-way analog signal on the subscriber side of the circuit and the 2 one-way (4-wire) signal paths on the side connected to TSI matrix switch 403. It also provides controlled conversions between metallic path circuit conditions (high level signal conditions in the subscriber line) and the low level binary signal system of sense/control data TDM network 407. The signals of the latter are strobed onto and off of sense and control buses 402''' via latches within circuit 2000.

Each multiple party line interface circuit 2000' is substantially the same as a single party line interface, except that a multiple frequency ringing bus having the various parties ringing frequencies thereon at particular time phases provides the ringing signal. The ringing relay is then selectively controlled to operate during the phase which corresponds to a party's ringing frequency.

E&M trunk interface circuit provides a controlled interface between system 400 and an interoffice trunk. It provides the analog 2-to-4 wire conversion circuitry and the necessary signalling interfaces for conversions between metallic path circuit conditions (high level signal conditions in the lines of the trunk facility) and the low level binary signal system of sense/control data TDM network 407.

Each MFSD interface circuit 3200 is an interface circuit to a service circuit. This circuit is itself universal in that it operates with either a toll multifrequency (TMF) detector or a dual tone multifrequency (DTMF) detector which provides the digital outputs for two-out-of-six and two-out-of-seven, respectively, tone signal detections. The incoming MF tones are switched through TSI matrix network 403 to MFSD interface circuit 3200 where they appear as an analog tone. One detector is connected to each circuit 3200. The TMF or DTMF tones present at the input to a detector enable the corresponding decoded outputs to be active. MFSD interface circuit 3000 interfaces the outputs of the detector with sense/control data DTM network 407.

Toll multifrequency sender 3250 is a service circuit which gates tone pulses to the PCM CODEC circuitry for transfer through TSI matrix network 403 to a toll MF port. Binary control signals from sense/control data TDM network 403 select two tones out of six coming from tone plant interface 3270 and gate these two tones through a summing network to the PCM CODEC/filter circuit 3500-3.

Tone plant interface 3270 serves as a receiver and buffer between circuit 25100 and TMF sender 3250.

E. SENSE/CONTROL DATA MUX/DMUX

A sense/control data multiplexer/demultiplexer circuit 18000 provides the other portion of the MUX/DMUX operation by which grouping of the individual port circuits signals to a port group highway is effected. The partial MUX/DMUX performed by circuit 18000 involves the mergence and separation of sense and control data into and from the voice data. Binary sense data is strobed from the thirty ports via the sense buses and control buses 402''' and separated into two fast sense channels SFI and SFO which are carried by timeslot 30 of the PGH frame, and into slow sense bits SS0–SS7 which are carried by the 31st timeslot of the PGH frame. The fast control channels CF0 and CF1 (carried by TS 30) and the slow control channels CS0–CS7 (via TS 31) are converted into signals on the four control buses of sense and control buses 402'''. TS 30 and 31 and the sense and control buses are time shared in obtaining these ten binary sense channels and ten binary control channels. Circuit 18000 generates the port strobes that read the supervisory sense data from the port circuits, or clock the supervisory control data into the port circuits.

F. PORT GROUP COMMON UTILITY CIRCUIT

Port group common utility circuit 20000 comprises a circuit assembly which provides the following functions which are common to the port group. It provides interconnections of the line interface circuits to the single and multifrequency ringing buses. Also, the interconnections between line and trunk interface circuits and test access circuits are provided. Included is an arrangement of relays for selectively interconnecting one of several test access buses to the test access connections to the interface circuit. This relay arrangement also connects a receiver off-hook (ROH) signal generator to the circuits using the same connection to the port interface circuits as used for the test access buses. A transfer path (including receivers and drivers) for the binary serial voice data and control data in the port group highway (PGH) format is provided from the associated TSI circuit 24000 to sense/control data multiplexer/demultiplexer circuit 16000.

G. RINGING GENERATORS AND THE LIKE

A small group of circuits is associated with the port group units 402 in order to provide the high level ringing signals and the like. These consist of a ringing generator 21000, and interrupter-serializer 21100, and a receiver off-hook (ROH) generator 21200.

A conventional ringing generator 21000 provides a normal 4-frequency series of ringing signals.

Ringing monitor and serializer 2100 provides the appropriate interrupted ringing for single frequency, called-party ringing and phasing for 4-frequency called-party ringing.

Receiver off-hook (ROH) tone generator 21200 produces a distinctive tone signal, designed to get the attention of a subscriber who has left a receiver off-hook.

Monitoring circuits for testing the operation of the generators are also provided.

H. TSI MATRIX SWITCH NETWORK (403)

1. Structure and Operation of Buffer 24002 and Buffer Unit 24003

Timeslot interchange (TSI) matrix switch network 403 is a TDM network which provides for the switching of PCM voice or tone data between selected pairs of port equipment positions. It comprises eight TSI circuits 24000-0 . . . 7. (Only three of these are shown in the 3-dimensional drawing of network 403 in FIG. 2.) Each TSI circuit 24000 receives bit streams from eight port group units 402 via their respective transmit port group highways (PGHs) 402' and transmits a stream of binary data signals back to the eight TSI circuits via their respective receive PGH's 402''. The PGHs have a 2.048 MHz bit rate so that each timeslot is 0.488 microseconds in duration. Each 32-bit frame has a duration of 15.62 microseconds. The frame rate is 64 KHz. Each port group unit 402 contains 30 ports, thus a TSI circuit can service 240 port equipment positions, and the eight TSI circuits of network 403 can service 1920 ports.

Each TSI circuit 24000 has a transmit cross-office highway (XOH) that is used to make a connection to any of the port equipment positions associated with any of the TSI circuits. The XOH has a serial TDM frame containing 128 timeslots with an 8.192 MHz bit rate so that each timeslot is 122 nanoseconds in duration. Each 128 bit frame has a duration of 15.62 microseconds. The frame rate is 64 KHz.

The binary data streams from eight port group units 402 enter a single TSI circuit (e.g., the data streams of PGHs 402-00′ . . . 402-07″ enter TSI circuit 24000-0). These data streams are received by a multiplexer and a sense data/tone data exchange buffer unit 24003 which are connected serially together. Multiplexer and exchange buffer 24002 and buffer unit 24003 together operate to multiplex select frames of the eight data streams onto a single line.

Call progression (CCP) subsystem 408 determines what TSI circuit 24000 and what port equipment position of that circuit is the calling terminus of a duplex connection through the matrix switch port and what TSI circuit 24000 and port equipment position thereof is the call terminus of the duplex connection. Subsystem 408 then assigns one timeslot on the XOH emanating from the TSI circuit 24000 of the calling terminus and one timeslot of the XOH of the TSI circuit 24000 of the called terminus to provide a path to carry the voice data in each direction.

Within TSI circuit 24000 the binary data streams from the eight port group units first pass through multiplexer and buffer 24002. The multiplexer and buffer 24002 strip out sense binary data and insert PCM tone data as described in the following Section 2. The data streams then enter send unit 24003. The data bits of the selected PGH frames are buffered until the correct timeslot on the associated transmit XOH is being transmitted. Stated another way, send buffer unit 24003 stores sense binary data bits during the interval of time conversion between PGH timeslots and the selected XOH timeslot.

The timeslot which is the one into which the stored binary data bit is gated is the timeslot which CCP subsystem 408 has set up to transmit the voice or tone data to the particular TSI circuit and port equipment position thereof associated with the other terminus of the duplex paths. It will appreciated that there is a 50% blockage that can occur in this process. A 15.62 microsecond frame interval of the eight PGH's contains 8×32=256 bit. The same 15.62 microsecond frame interval of the XOH frame contains only 128 bits.

2. Insertion of Control Data By Demultiplexer And Buffer 24006

Supervisory control bits from port data storage network 405 (and more particularly from the parallel-serial converter 32000 therein, to be later described) are inserted into timeslots 30 and 31 of the serial data stream going back to the port group unit 402. This is done within demultiplexer and control data injection buffer 24010.

A comparator is provided in the fault monitoring system to compare the supervisory bits of each system on every transaction between the port storage area and the TSI matrix switch. Upon detection of a mismatch, an error flag is sent to the maintenance processor and may invoke first level diagnostics.

3. Description of Operation

The operation of TSI matrix switch network 403 is as follows. The eight port group highways 402′ coming into a given TSI circuit 24000 carry serially multiplexed voice and sense data from up to 240 ports. Multiplexer and data exchange 24002 and send buffer unit 24003 selectively convert this data to a further multiplexed (sometimes called "super-multiplexed") form of serially multiplexed data in predetermined timeslots on the transmit cross-office highway XOH originating from the TSI circuit. The selection of the data and of the predetermined timeslots is performed under control of CCP subsystem 408 via control/map RAMs 24007. Within the TSI circuit 24000 for the port equipment position which is to receive the data, the XOH selector 24004 gates the data in the predetermined timeslot into the receive buffer unit 24004. XOH selector 24004 also operates under control of CCP subsystem 408. (Note that the TSI circuit to receive the data may be the same as the TSI circuit in which the data originates.) This is done by means of space-divided switching performed by the XOH. Receive buffer unit 24005 and demultiplexer and injection buffer 24006 performed the time-divided selection of the data (also under control of CCP subsystem 408) and switch the data to the appropriate receive port group highway 402″ and timeslot therein for the port equipment position which is to receive the data.

At the same time that the foregoing operations of switching voice data takes place, the binary data corresponding to the sense channels of other-than-voice TDM network 407 are stripped off from the incoming serial data streams within multiplexer and data exchange buffer 24002. In some instances PCM tone data is introduced in the timeslots vacated by the sense channel data. Within demultiplexer and injection buffer 24005, binary control data from port data storage network 405 is inserted into the serial data stream going back to port group unit 402.

4. Functional Summary

It will be appreciated that TSI matrix switch network 403 is a TDM matrix switch for establishing voice data paths between various port equipment positions of system 400 via the transmit XOHs of the various TSI circuits. The paths between port equipment positions which are established by network 403 are selected by CCP subsystem 408 acting through controller 54000 and control/map RAMs 407. TSI network 24000 also serves as a buffer for binary sense data and binary control data between port group units 402 and parallel-serial converter 32000.

I. TONE PLANT

A group of circuits are associated with the input port positions and TSI matrix switch network 403 to introduce low level tone signals. This group consists of a precise tone generator 25000, a toll multifrequency generator 25070 (optional) and a tone buffer circuit 25100. Precise tone generator 25000 and toll MF generator 25070 are an operatively associated pair in which the tone signals are generated digitally.

Precise tone generator 25000 produces the following precise tone frequencies: 1004 Hz, 620 Hz, 480 Hz and 350 Hz. These are used for dial tone, high tone, low tone, busy tone and ringback tone. In addition, generator 25000 produces the following non-precise tones which are forwarded to TMF generator 25070; 11.2 Hz, 230.4 Hz, 281.6 KHz, 332.8 KHz, 435.2 KHz and 1.024 MHz.

TMF generator 25070 provides six frequencies for use in MF pulsing. These comprise 700 Hz, 900 Hz, 1100 Hz, 1500 Hz and 1700 Hz frequencies. They are generated in pulse-rate-modulated square wave form for subsequent conversion to a sign-wave form in toll MF sender circuit 3250.

Tone buffer 25100 is a formating and distributing circuit for precise tones and toll MF tones. The broadcast tones are inserted directly into TSI network 403, and are distributed therein by a "broadcast" technique which negates the need of use of input ports for a tone plant source.

J. PORT DATA STORAGE NETWORK 405

The primary funcition of port data storage network 405 is to provide an individual data memory field for each port. These data fields are the only paths of communication between the two interactive processors of system 400. They also constitute a buffer store between the processors and sense/control data TDM network 407, which in turn is the communication path for binary supervisory data to the port circuits. Thus, a port data field is an essential link in the communication between the processors and the port circuits. FIG. 2A depicts the organization of a port data field.

The circuits included in network 405 are: a timing and control circuit 28000 (which is also a part of PEP processor 406), a converter control circuit 30000, a set of parallel-serial binary signal converters 32000 (which is also a part of internal supervisory data TDM network 407), and a set of port data store circuits 33000.

The port data store circuits 33000 comprise the storage medium for the individual port data fields for the individual ports. A circuit 33000 stores a 256 bit word for each of the 1920 ports of system 400.

K. PORT EVENT PROCESSOR (406)

Port event processor (PEP) 406 is one of the two interactive processors of system 400 in each system. It comprises a combinatorial logic organization 34000 and timing and control circuit 28000 (which also provides certain functions within port data storage network (405). PEP 406 scans the port circuits for status change by way of scanning certain subfields of the port data field 33500 for that port. More particularly, PEP scans the indicators of port supervision conditions and/or other indicators of the detection of port conditions in accordance with a logic sequence which is defined by a command generated by its respective call control processor (CCP) subsystem 408. (This command is recorded in a port command subfield 33502, FIG. 2A.) Based upon the information which is the subject of the interrogation, PEP 406 may generate changes to outgoing supervision or other control signals at the port interface or service circuit and/or may communicate with the other interactive processor; namely, CCP subsystem 408.

This interaction between PEP 406 and CCP subsystem 408 may be characterized as a command and response type mode. CCP subsystem 408 generates a command code which is communicated to PEP 406 via subfield 33502, which presets the sequence of logical operations performed by PEP 406 to provide impulse analysis or other processing for detection of specific port conditions. The command code also presets the processing to be performed upon a detection of a specific event. The normal mode of processing which PEP 406 performs upon the detection of a port condition anticipated by the command, includes communicating a coded response representing the port condition (i.e., an event code, EVC) to CCP subsystem 408. Subsystem 408 is constantly scanning for the coded responses representing a port condition, and in response thereof performs processing which results in the generation of the next coded command for PEP 406. Several such stimulus and response type cycles take place during the progression of a call.

PEP 406 performs the scanning of each port over a repetitive 4 millisecond scan cycle in which PEP 406 has a 1.953 nanosecond scan interval for each port. During this scan interval, PEP 406 has access to the port data field 33500 associated with the port. In this manner, PEP 406 performs processing upon each of the 2048 port positions in system 400.

Combinatorial logic organization 34000 comprises basically five different combinatorial functional units. One of them provides logical functions which are common to each type of operation performed by the processor. The other four are for specific types of operation which the processor may be commanded to perform by the coding in port command subfiled 33502.

The functions common to each type of processor operation is performed by a common logic unit 36000. This unit is enabled during all scan intervals, in contrast to the other functional logic units which are only enabled when the appropriate port command (given by CCP subsystem 408) is recorded in subfield 33502.

Description of the functional logic units which are enabled only during presence of certain port commands follow.

Sense supervisory event (SSE)/transmit supervisory event (TSE)/supplement to common logic unit 38000 provides impulse analysis to detect such supervisory events as seizure/release, wink/hookflash, stop dial, and delay dial. It also generates outgoing supervision signals such as wink, hookflash, wink off and delay dial.

A ring line (RGL) functional logic unit 40000 applies ringing to lines and senses occurrence of a ring trip.

A send digits (SD) functional logic unit 42000 sends dialing digits to the port equipment interface circuit for outpulsing in dial pulse or multifrequency tone pulse form. A receive digits (RD) functional logic unit 44000 collects and stores the digits in the sequence they are introduced at a port equipment interface circuit. SD unit 42000 and RD unit 44000 have an associated circuits assembly unit, called the receive digits (RD)/send digits (SD) unit 45000. It performs processing as though it were a part of either SD unit 42000 or RD unit 44000 when either of the latter are enabled. Fault monitors within the port event processor detect parity errors on processor-port store read and write cycles, lost bits in port event codes, and mismatches between contents of port store information.

L. SENSE/CONTROL DATA TDM NETWORK 407

Sense/control data TDM network 407 comprises: (i) sense/control data multiplexer/demultiplexer (18000); supervisory buffer 32000; (ii) those certain portions interface circuits and service circuits 2000, 2000', 3000, 3200, and 3250 which form input/output connections to sense and control buses 402'''; (iii) portions of port group common utility circuit 20000 and TSI circuit 24000; and (iv) portions of port data store 33000.

The function of network 407 is to provide paths for the communication of binary data between PEP 406 and the interface and service circuits in the port equipment positions. Control data from PEP 406, consisting of the outputs from the functional logic units in the CF0, CF1, and CS0–CS7 leads of the tri-state bus are communicated to an equipment interface circuit or service circuit and to subfield 33502 in FIG. 2A. Sense data from the interface circuits or service circuits, which represents the status of relay contacts or of electronic latches therein, is in general communicated to and recorded to an assigned bit location of port communication subfield 33501. Once sense data is recorded in subfield 33501, PEP 406 has access to it during the scan interval for the port position. (There is arbitration circuitry which sometime operates to communicate the data directly to PEP 406.) Ten different binary sense functions from each interface circuit or service circuit may be sampled in a 4 millisecond period. Similarly, PEP 406 can transmit 10 control functions to each port position in a 4 millisecond period.

Referring now to FIG. 2A, in subfield 33501 bit areas CF0 and CF1, and bit locations CS0–CS7 serve to record the 10 binary control data outputs from PEP 406; and bit areas SF0 and SF1 and bit locations SS0–SS7 serve to record the 10 binary sense functions from the interface or service circuit.

Network 407 provides the 10 binary channels in each direction between the interface/service circuits and PEP 406. It does this in a way which takes advantage of the port group time divided highways between port group units 402 and TSI matrix switch 403. Briefly, the time division highways have a frame which multiplexes PCM voice data for 30 ports using 30 timeslots of the frame. The circuitry for formating the PGH frame provides 2 timeslots in addition to those needed for the 30 ports. The presence of these 2 timeslots in each PGH frame is time divided over a period of 4 milliseconds to provide 2 fast channels (with strobe or sampling rates at 1 millisecond intervals) and 8 slow channels (with strobe or sampling rates at 4 millisecond rates).

Throughout this specification, the channels of TDM network 407 are designated by a scheme which assigns the channels the same alphanumeric designation as the bit areas or bit locations of port subfield 33501 with which the channel communicates. However, the designation of the channel further bearing a "prime symbol" (') as a suffix. For example, the fast control data channel communicating with bit area CF0 is designated CF0'.

M. CCP SUBSYSTEM 408

1. Major Components of CCP Subsystem 408

CCP subsystem 408, which is a microprocessor-based, stored program system, comprises a processor unit 50000, the processor bus BCCP, a call control processor interfaces controller circuit 54000, and a 32K memory 56000 for holding a call control stored program 56002. All communications between CCP subsystem 408 and either port data store 33000 or TSI matrix switch network 403 must go through controller 54000.

N. BRIEF DESCRIPTION OF OPERATION

Following is a brief description of the operation of system 400 which illustrates the nature of interaction of PEP 406 and CCP subsystem 408. The status of various functions of port interface/service circuits (e.g., status of incoming supervision of lines and trunks) are communicated to subfield 33501 of store 33000 via binary sense channels SF0', SF1' and SS0'–SS7'. This information is then processed by the time shared combinatorial logic organization 34000 of port event processor (PEP) 406, during the 1.953 microsecond scan interval (out of the total 4 millisecond scan cycle) for the particular port equipment positions involved. The processing of this by PEP 406 is performed in accordance with a logic sequence defined by a coded command recorded in port command subfield 33502. When the logical sequence detects a condition to which it is to respond at the port, it may generate binary output control signals to control various binary functions associated with the interface circuit in the port equipment position (e.g., the outgoing supervisory control signal for along a trunk). It may communicate (via response subfield 33506) to CCP subsystem 408 and indicate that a port event has occurred. The control function for the line circuit, trunk circuit, or other interface/service circuit is communicated to the same binary control channels CF0', CF1', and CS0'–CS7'. The current control data is recorded in the corresponding bit areas and bit locations in port communication subfield 33501. The communication of an indicia of occurrence of event to CCP subsystem 408 is accompanied by placing the equipment (EN#) of the port equipment position in a queue of a set of priority related queues registers. These queues are accessible to CCP subsystem 408. CCP subsystem 408 scans the queues and is responsive to the indicated event to effect a transition to a different call state by invoking a particular state transition routine. Once the transition routine has completed the transition, CCP subsystem 408 changes the coded command in port command subfield 33502, thereby defining the new logical sequence with which PEP 406 will interrogate the status of the port circuit. CCP subsystem 408 also records in subfield 33502 the fact that a transition to a new call state has been made.

SUMMARY OF FAULT MONITORS

Figure 5:
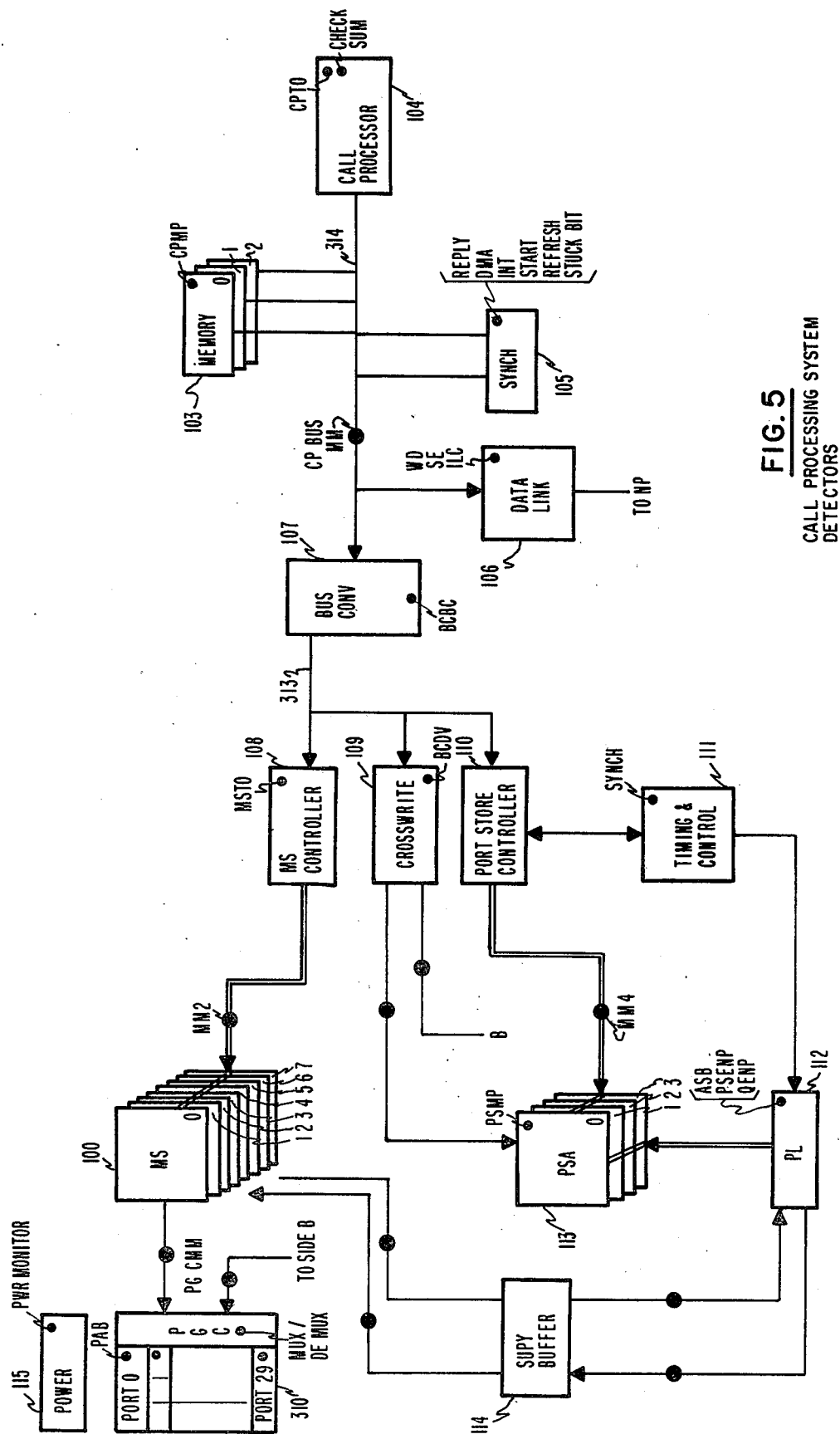
FIG. 5 is a block diagram of a portion of the telephony system shown in FIG. 4.

Referring to FIG. 5, there is disclosed a block diagram of one redundant call processing system that depicts the locations within the system where error monitoring circuitry is located. Identical monitoring circuitry is also located in the other call processing system in the analogous locations.

Central processor unit 104 in FIG. 5 has a time out monitor (CPTO) which monitors program activity within the call processor. Particularly, an instruction timer is provided to raise an alarm should an instruction not be completed within a given time period, and a watchdog timer is provided to monitor program execution timing. Additionally, a "check sum" monitor senses changes in the memory resident data and instructions to raise an alarm should a check sum error occur during a loading operation.

The associated memory unit 103 contains a monitor which raises an error flag should a parity error occur.

Synchronization unit 105 contains a number of error monitoring devices. Alarms are raised if a direct memory access request is asserted on one side without a corresponding request on the other side for longer than a given time period. Synchronizer 105 also has incorporated therewith a monitor to raise an error flag should the call processor bus not return to an inactive state after a given time period. A reply monitor is also provided in the synchronizer circuitry to raise an alarm should any device fail to generate a reply signal during a bus transaction. The synchronizer also raises error flags when dissimilar data appears on the two call processor buses, when there has been no activity on a call processor bus in a given time period, or in the event of a power failure or a clock failure.

Data link 106 provides a communications path between the maintenance processor and each of the call processing systems. It contains an error monitor that raises an alarm should an illegal command be given to the data link.

Differential bus converter 107 contains an error monitor for monitoring parity errors in the matrix switch controller during bus reading cycles.

With respect to the port control system, a matrix switch controller 108 contains a time out monitor for monitoring timing functions of the controller, a parity error monitor for matrix switch controller bus writing cycles and a error monitor for a timing and control counter 111 of the port control system. Program logic circuitry 112 monitors failures of communication between the port control system and a port group control, parity errors on requests from the port store area, and lost bits occurring in an event code. The propriety of addresses accessed within the port store area is also monitored.

Mismatch detectors in the port control system monitor information as it is transferred between between supervisory buffers, program logic, matrix switches, and port control store/controller interfaces. If the information on both sides is not identical, a mismatch error is signalled.

An error monitor in each port circuit raises an error flag should a circuit failure occur. A multiplexer/demultiplexer monitor in the port circuits monitors address failures within the multiplex circuitry.

As previously stated, a test call generator 308 in FIG. 4 performs certain test functions within the redundant and non-redundant system elements. The test call generator contains error monitoring circuitry for indicating the failure (1) of a port circuit to receive a dial tone, (2) of a line to establish connection to a "called" port, (3) to ring a "called" port, (4) to receive a ring back tone on a "calling" port, (5) of a line to receive appropriate answer supervision, (6) of an established path to pass a test tone in either or both directions, (7) of the system to provide correct digits in an appropriate mode.

Additionally, for each of the redundant systems, other monitors respond to the status and condition of the ringing generator, precise tone generator, and toll multiple frequency generator to indicate a failure of these elements in one of the two redundant systems. A clock monitor for each of the redundant systems raises an error flag in the event of a clock failure.

Maintenance Bus Interface

Figures 6, 7:
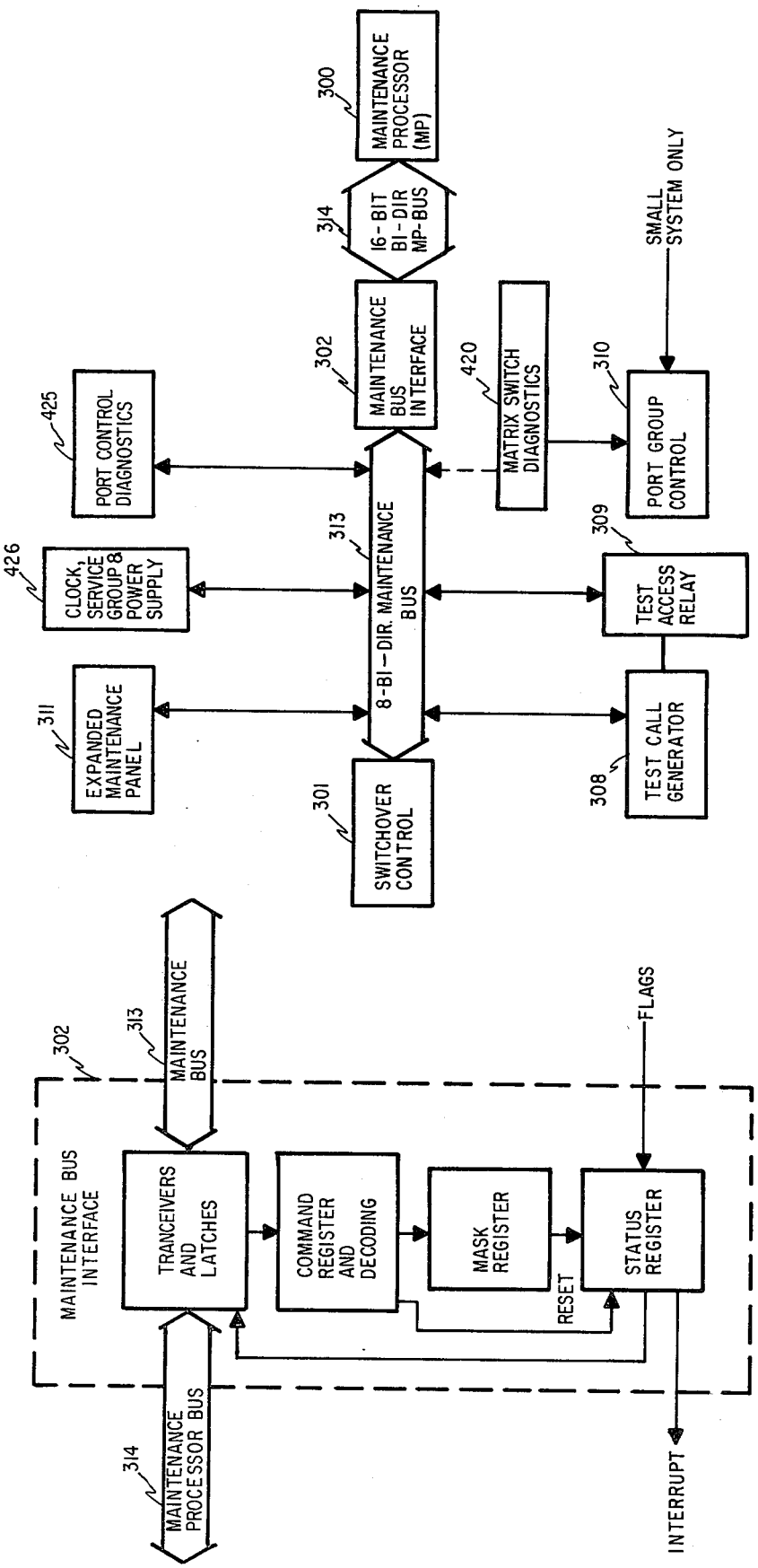
FIG. 6 is a block diagram of the maintenance bus interface shown in FIG. 4.
FIG. 7 is a block diagram of portions of the circuitry shown in FIG. 4.

FIG. 6 is a block diagram of the maintenance bus interface that connects the maintenance processor bus and the maintenance bus to which many of the system diagnostic elements are connected. The maintenance bus interface 302 contains status registers for monitoring fault status of the devices connected to the maintenance bus, time buffering and latching circuits for data signals and circuits for interfacing 16-bit words from the maintenance processor and 8-bit words on the maintenance bus.

FIG. 7 illustrates the relationship between the maintenance bus inerface 302, the 16-bit bidirectional maintenance processor bus 314 and the 8-bit bidirectional maintenance bus 313 which is in communication with port control diagnostic monitors 425, service group monitors 426, switchover controller 301, test call generator 308, test access relay 309 and matrix swtich diagnostics 420.

In the embodiment disclosed herein, the maintenance bus interface 302 contains three 16-bit registers as shown in FIG. 8. These registers may be addressed by the maintenance processor through the maintenance processor bus. A first register is a command/mask register; a second, a first fault register; and the third, a status register. The command and mask field settings are received as one word from the maintenance processor. Four bits constitute a command field; the remaining bits, a mask field for the respective devices on the maintenance bus. More specifically bits 00 through 11 of the command/mask field correspond exactly to bit positions in the status register. Setting a bit in the status register inhibits interrupts from the corresponding device so further communications between the maintenance processor and the device so identified are inhibited.

A flag input, representing a fault condition in a device on the maintenance bus, produces an interrupt request to the maintenance processor when asserted. When the interrupt request is acknowledged, the maintenance bus interface 302 provides a vector word to the maintenance processor to indicate the maintenance bus interface as the source of the interrupt. The contents of the status register indicates the source or type of flag that caused the interrupt. In the specific embodiment in FIG. 8, each of the 00 through 11 bits represent, respectively, the switchover control 301 (SOC), service group diagnostics 406 (SGD), matrix switch diagnostics 400 (MSD), port control diagnostics (PCD), the basic maintenance panel 312 (BMP), the test call generator 308 (TCG), the test access relay 309 (TAR), the synchronizer monitor (SYN), the program logic diagnostics 403 (PLD), an automatic message accounting diagnostic (AMA) and a spare device (SP).

The contents of these registers may be obtained or altered by conventional reading and writing operations performed by the maintenance processor thereby to receive and respond to error conditions within the system. Alternatively, a fault condition may interrupt the maintenance processor thereby to initiate various diagnostic tasks by the maintenance processor.

With respect to data transactions between the maintenance processor and the maintenance bus devices, only a certain number of bits from the maintenance word are passed through the maintenance bus interface to address a particular device. The remaining bits in the word address certain locations within the device. During the initial address instruction, the device responds to its address by assuming an "addressed" mode whereupon the device activates its device enable signal after receipt of a "hold" signal from the maintenance bus interface. This prevents other devices on the maintenance bus from interpreting subsequent internal addresses as device addresses. The device so addressed will continue to transact data transfers with the maintenance bus interface until the status bit relative to the device is altered by the maintenance processor.

Switchover Control Logic Circuitry

Referring again to FIG. 4, the switchover control 301 directs signals to the port group circuits from one system to the other based upon detecting error conditions. When an error or fault is detected in a redundant portion of the call processing system, an automatic switchover may be effected by error monitoring circuits disposed throughout the entire dual call processing system.

Figure 9:
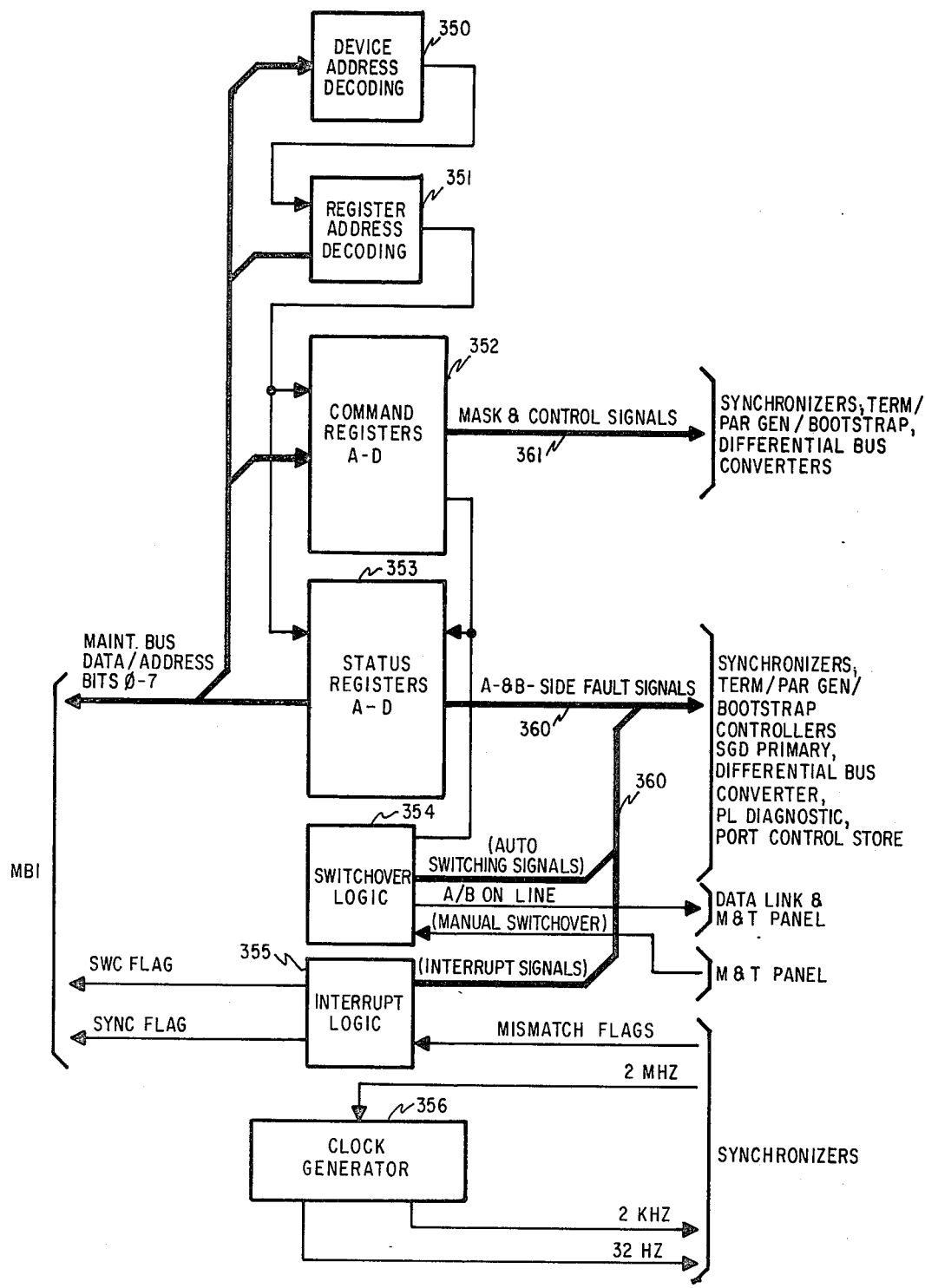
FIG. 9 is a block diagram of the switchover control shown in FIG. 4.

Referring specifically to FIG. 9, fault signals from the fault monitoring circuit are transmitted via the maintenance bus on data lines 360 to status registers 353, switchover logic 354 and interrupt logic 355. Switchover logic 354 logically determines whether or not a switchover is required depending upon which side is on line and the nature of the fault signal. The interrupt logic, depending upon type and nature of fault signals, transmits error flags to maintenance processor via the maintenance bus interface, whereupon the maintenance processor may address the respective devices or the switchover controller for issuing further commands through command register 352. Device address decoding is performed by decoder 350 and register address decoding is effected by decoder 351.

Additionally, the switchover control logic circuitry contains means for monitoring mismatch flags between the synchronizers of the respective redundant sides. The logic 355 transmits an interrupt to the maintenance processor in response to a mismatch.

Switchover also may be accomplished by hardware error flags in monitoring circuits, control mandated by the maintenance processor through command register 352, or manual switchover from the maintenance and test panel.

The switchover control circuitry contains two groups of registers: one for status and the other for commands from the maintenance processor. Status registers, and their respective bit identifiers, are illustrated in FIG. 13; and command registers in their respective commands for the bit positions are shown in FIG. 12.

Figure 10:
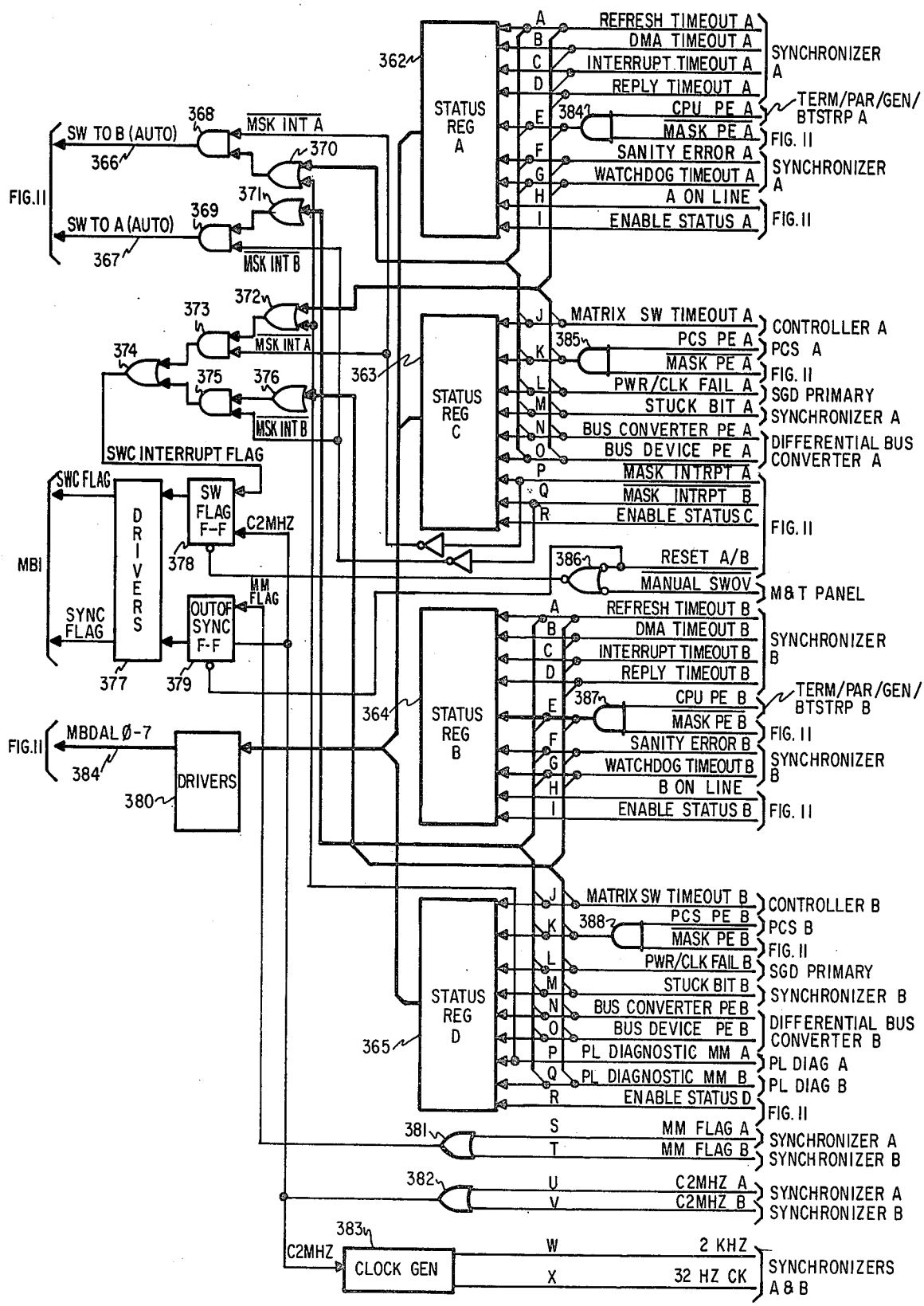
FIG. 10 is a more detailed block diagram of a portion of the switchover control shown in FIG. 9.

FIG. 10 shows a detailed logic diagram of a portion of the switchover controller wherein status registers 362 and 364 monitor several parameters of one of the redundant systems. Status register A 362, as more specifically shown in FIG. 13 receives inputs from refresh time-out error, direct memory access time-out, interrupt time-out, reply time-out, parity error, sanity error, watch dog time-out, system status (on/off line), and enable status monitors on the A side of the system. Status register C 363 monitors for the A side matrix switch time-out error, port control store parity error, power and/or clock failure, stuck bit, bus converter parity error and bus device parity error signals plus the mask status of interrupts on system A and B and an enable status indicator from the maintenance panel. Status registers 364 and 365 monitor corresponding signals from the B side.

A switchover is directed by signals on conductors 366 and 367 from AND gates 368 and 369. Particularly, a switchover from system A to B is indicated on the condition that interrupts from system A are not masked and one of several error flags are asserted based upon the selected signals that are applied to the input of an OR gate 370 from the inputs to the status register 362 or 363. A switchover from system B to system A is indicated when a signal on conductor 367 from an AND gate 369 is asserted in response to analogous conditions occuring at the inputs to the status registers 364 and 365 as sensed by an OR gate 376.

With respect to those errors that are not side-determinant, error flags from differential drivers 377 are transmitted to the maintenance processor via the maintenance bus interface for determination, through first level diagnostics, of the faulty side of the system. The maintenance processor is alerted to an error in one of the systems on all of the conditions that previously have been specified to cause automatic switchover. Additionally, if there is no masking of interrupts, as indicated by signals on lines "p" and "q" of register 363, a direct memory access timeout of one of the systems detected on line "b" of register 362, an interrupt tine out from one of the system synchronizers detected on line "c" of register 362, or a reply time out from one of the system synchronizers detected on line "d" of register 362 will initiate first level diagnostics. An out-of-sync error also will be communicated to the maintenance processor from the mismatch flag generated by OR gate 381 from either of the independently operating synchronizers.

Figure 11:
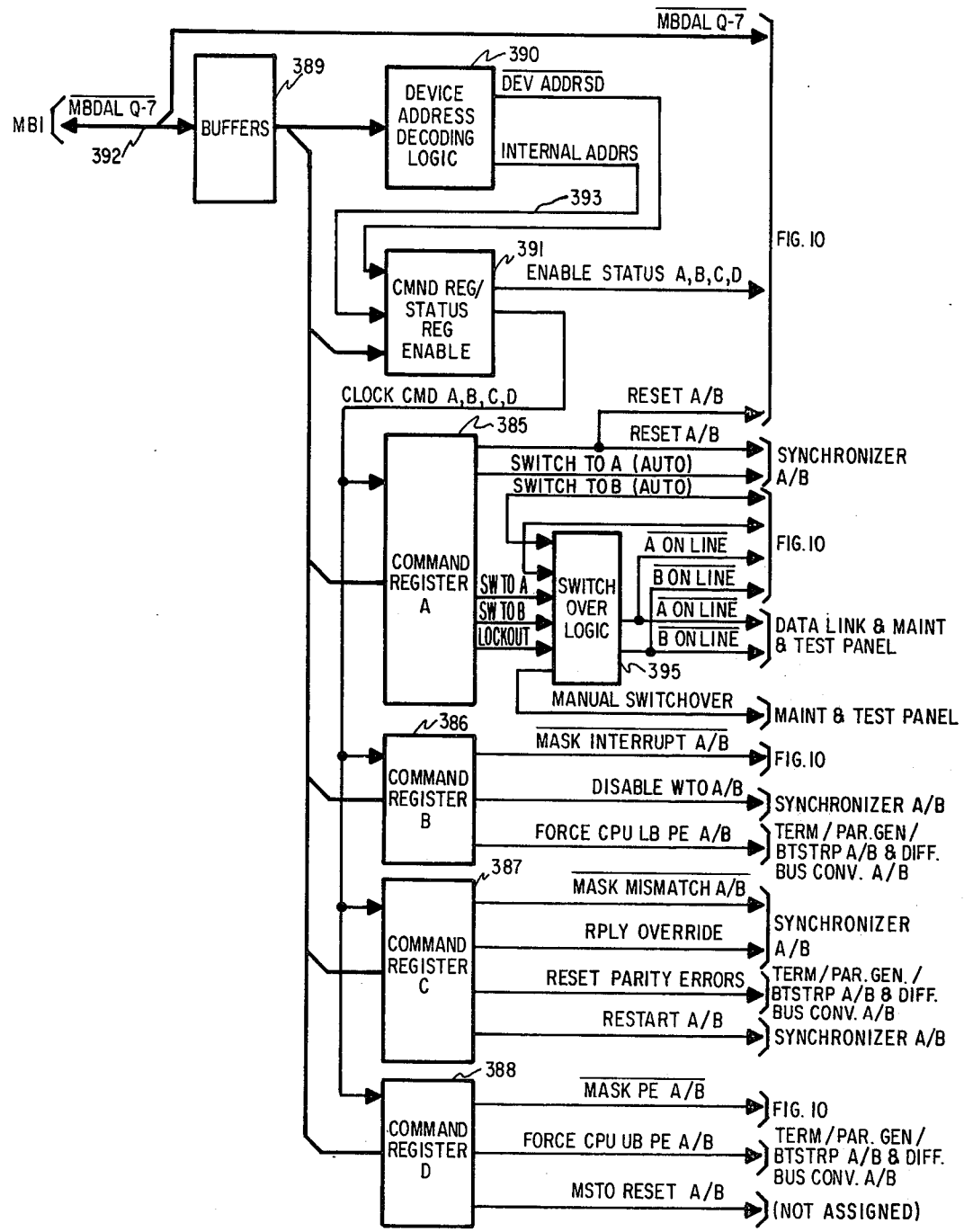
FIG. 11 is a more detailed block diagram of another portion of the switchover control shown in FIG. 9.

All data from the status registers may be read by the maintenance processor on data line 384 from drivers 380. Moreover, the maintenance processor also can transfer commands into the command registers of the switchover control circuitry. These transfers are initiated when the maintenance processor sends the proper device address to the switchover control circuit via the maintenance bus interface together with command data. When addressing decoding circuitry recoginizes its device address, the logic array generates a device addressed signal and steers a hold flip-flop of the device address decoder to receive a device enable signal, and then a maintenance bus hold signal. When both of these signals have been received, the hold flip-flop is cleared and enables an address register decoder for accessing a particular register within the switchover control circuitry. Referring to FIG. 11, device address and register address data is transmitted on line 392 to buffers 389 and to device address decoding logic 390. The remaining data bits, once the device has been addressed, are further decoded to identify a particular register within the circuitry thereby to enable an internal address signal 393 which is applied to the internal address register. Following the transfer of the internal address to switchover control circuitry, a maintenance bus device enable signal is asserted and clocks the internal address signals into internal address registers in the decoding circuit 351 of FIG. 9. The output from the internal address register enables the register address decoder to select one of the eight registers contained in the switchover control circuitry. If the data transfer involves a status register, a data-in signal is sent to the switchover circuitry and a corresponding reply signal is sent back to the maintenance bus interface and simultaneously removes an inhibit from the differential driver that sends fault and status bits to the maintenance bus interface 302.

If the data transfer involves a command register, the command word and a data-out signal are sent to the switchover control circuitry. A reply signal is returned to the maintenance bus interface. The output of the enable gate clocks the command word from the maintenance bus into the selected command register.

Now referring to FIG. 11, four command registers of the switchover control circuitry exercise certain control functions over the internal circuitry and monitors. Command register 385 is used by the maintenance processor to execute software control system A/system B switchover and to inhibit automatic switchovers that otherwise result from the receipt of a side-determinant error signal. The register is also used by the maintenance processor to reset the switchover flag and out-of-sync flags in the interrupt logic as well as fault logic in dual synchronizers. Command register 385 also is used to initiate a call processor sanity test.

Command register 386 is used by the maintenance processor to mask all interrupts resulting from fault signals received from either of the redundant sides of the system. The register is also used to disable the call processor watchdog timer in either of the call processing systems and to force a parity error in the call processors.

Command register 387 is used to issue mask mismatch, reply overrides, restart commands of the respective synchronizers, and to reset A side or B side parity errors reported through a terminator/parity generator/boot strap converter and the differential bus converter.

Command register 388 is used to mask fault bits representing parity errors from either of the call processors or port control systems. This register is also employed to force upper byte parity errors in the call processor in system A or system B.

Referring back to FIG. 9, a clock generator 356 provides a 2 kHz clock signal for a call processor sanity check and a 32 Hz clock signal for call processor watch dog timers. The watch dog timers check their respective processors for endless loop programming errors. The sanity timers test the call processors by timing the execution interval for a predetermined diagnostic program.

Referring to FIG. 11, switchover logic 395 responds to a number of command signals to generate an A ON LINE or a B ON LINE signal. These signals are used by the circuitry in the switchover control as shown in FIG. 10. In addition, these signals control the connection of output signals from the redundant call processor systems to the port control units. Thus if the A ON LINE signal is active, the output signals from the matrix switch 200 are coupled to the port group control circuits 402 as each such circuit contains switching circuits that selectively couple the signals to the control circuits themselves.

Matrix Switch Diagnostic Circuit

Matrix switch diagnostic circuitry in FIG. 4 monitors error signals from the port group control circuits 402 of FIG. 2 and communicates with the switchover control 301 and the maintenance processor 300 through the maintenance bus interface 302. This circuitry also stores error data and time slot data so as to monitor error rate accumulation. The device may trigger a diagnostic error upon accumulation of a predetermined number of errors within a given time period. The matrix switch diagnostic circuit 420 also monitors error signals that indicate a mismatch between corresponding data contained in the redundant port store areas. Once an error is detected, further monitoring of errors by the matrix switch diagnostic circuit 420 is inhibited until the error flag is cleared by the maintenance processor.

Figure 14:
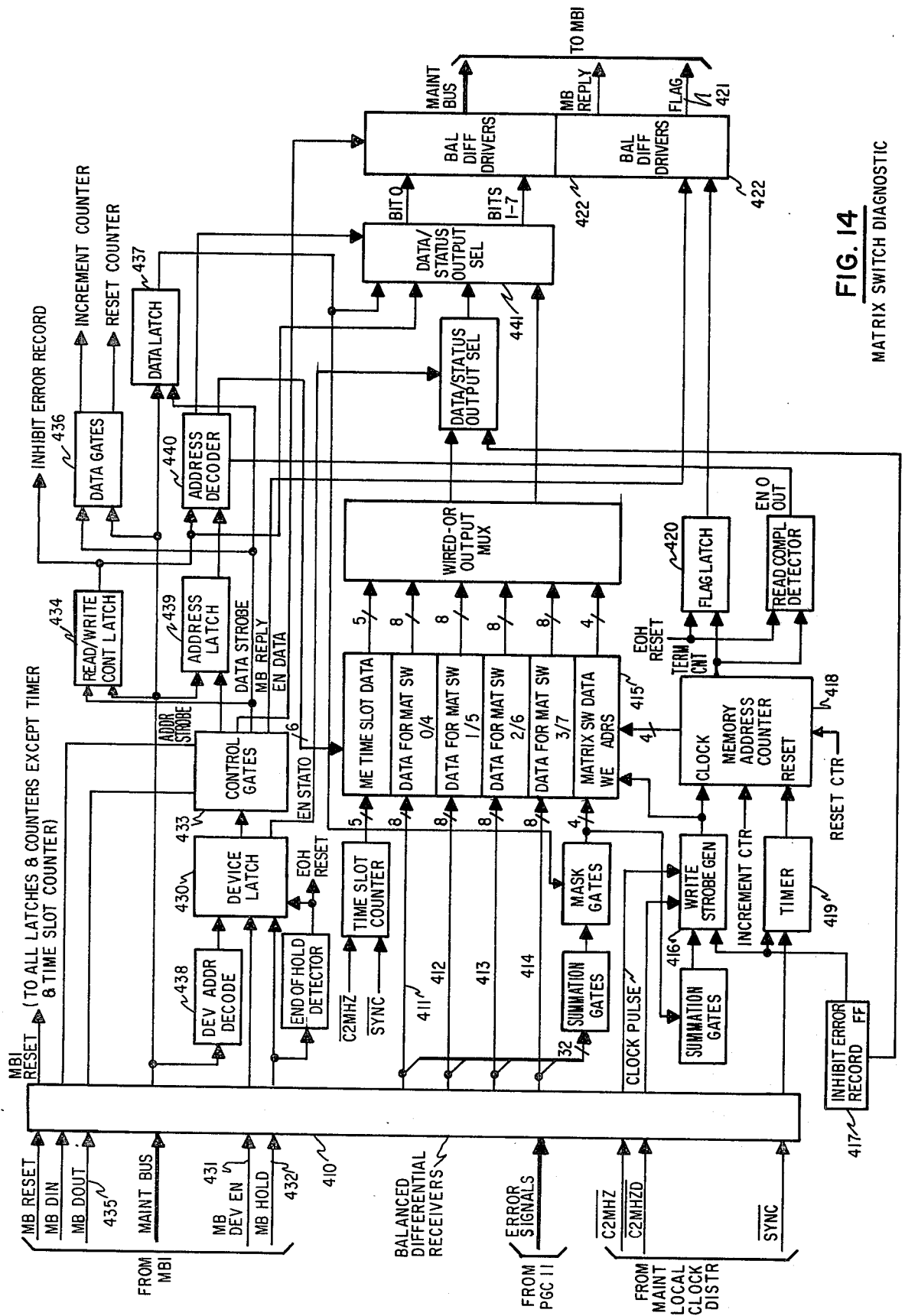
FIG. 14 is a block diagram of the matrix switch diagnostic circuitry shown in FIG. 4.
Figure 15:
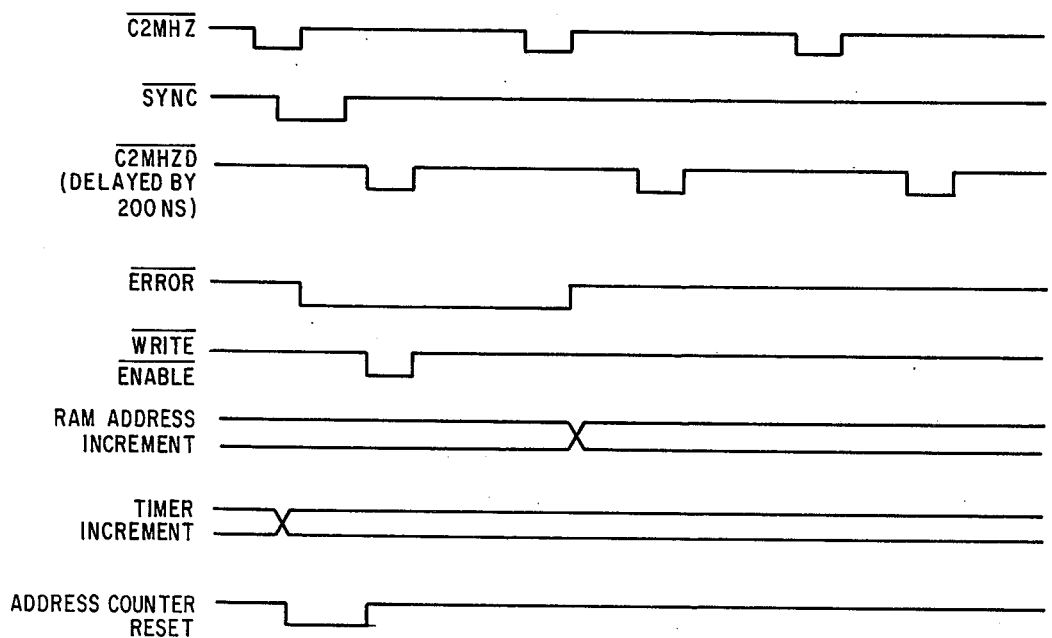
FIG. 15 is a timing diagram for the signals of FIG. 14.

Now referring to FIGS. 14 and 15 and as previously indicated, the matrix switch diagnostic circuitry comprises plural circuits that each correspond to the circuitry in FIG. 14 and generates an interrupt upon the accumulation of a predetermined number of errors within a given time period. In FIG. 14 error signals received from the port group control cards through a balanced differential receiver 410 pass over conductors 411 through 414 to a memory 415. These error signals are grouped in the memory 415 according to the matrix switch generating the error data. Data is clocked into the memory 415 by a write strobe generator 416 which is active when an inhibit error record flip-flop 417 has not been set by the maintenance processor. The system clock controls the write strobe generator.

Upon receipt of a first error signal, the write strobe generator 416 stores the error data into address 0 of memory 415 and then increments an address counter 418. Error accumulation continues until either a predetermined number of errors have been prerecorded in the memory or a clear pulse is generated by timer 419 to reset address counter to 0. The interval established by the timer 419 can be varied by the choice of wiring options. If the predetermined number of errors are accumulated, the address counter recycles to 0 and a flag latch 420 is set. When the flag latch 420 sets, the maintenance processor is notified of the error on line 421 from a balanced differential driver 422. Moreover the inhibit error record flip-flop also is set so further error recording is inhibited until the flag is cleared by the maintenance processor.

When diagnostics are to be performed under the control of the maintenance processor, certain transfers occur. The following example is typical and the transfer requires the processor to address the matrix switch diagnostic circuitry while the hold signal is at a low level. When this occurs, a first stage of a two-stage device latch 430 sets. If the second stage is cleared, a flag status bit is sent to the maintenance processor so that the maintenance processor can initiate a polling operation of the several circuit elements that constitute the matrix switch diagnostic circuitry. If a subsequent device enabled signal is received, the second stage of the latch 430 also sets indicating that an internal register in the circuitry is being addressed. When the second stage is set, it also inhibits error recording and causes the memory controls in the form of a latch to establish a reading mode.

Figure 16:
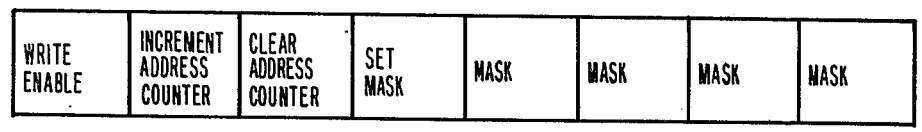
FIG. 16 depicts the organization of a command register in the circuity shown in FIG. 14.

All command data from the maintenance processor to the maintenance switch diagnostic circuit is contained in a single 8-bit control word as shown in FIG. 16. No internal address is required as the device latch logic determines which particular matrix switch diagnostic circuit element is active.

The control word of FIG. 16 enables the maintenance processor to control the address counter 418 to mask errors from one of a number of matrix switches, or to place the complete matrix switch diagnostic circuit into an inactive mode by holding a write enable signal at a non-assertive level through inhibit error record flip-flop 417. Control data is latched into the matrix switch diagnostic circuit by assertion of maintenance bus data out signal 435. Control data is passed to data gate 436 to increment or reset the counter, when applicable, and to data latch 437 for setting masks in the memory 415, when applicable. By setting masks in the memory, certain of the port control group cards or conversely, probable error sources, may be prevented from reporting to the maintenance processor.

Data from the control word is also passed to device address decode circuit 438 for selecting certain of the matrix switch diagnostic elements and read/write control latch 434 and address latch 439. Data is passed on to the maintenance processor from the memory 415 through output selector 441 upon selection of certain memory address by address decoder 440. Output selector 441 is enabled by data latch 437 and read/write control latch 434.

Programmable Logic Diagnostic Circuit

Figures 17, 18:
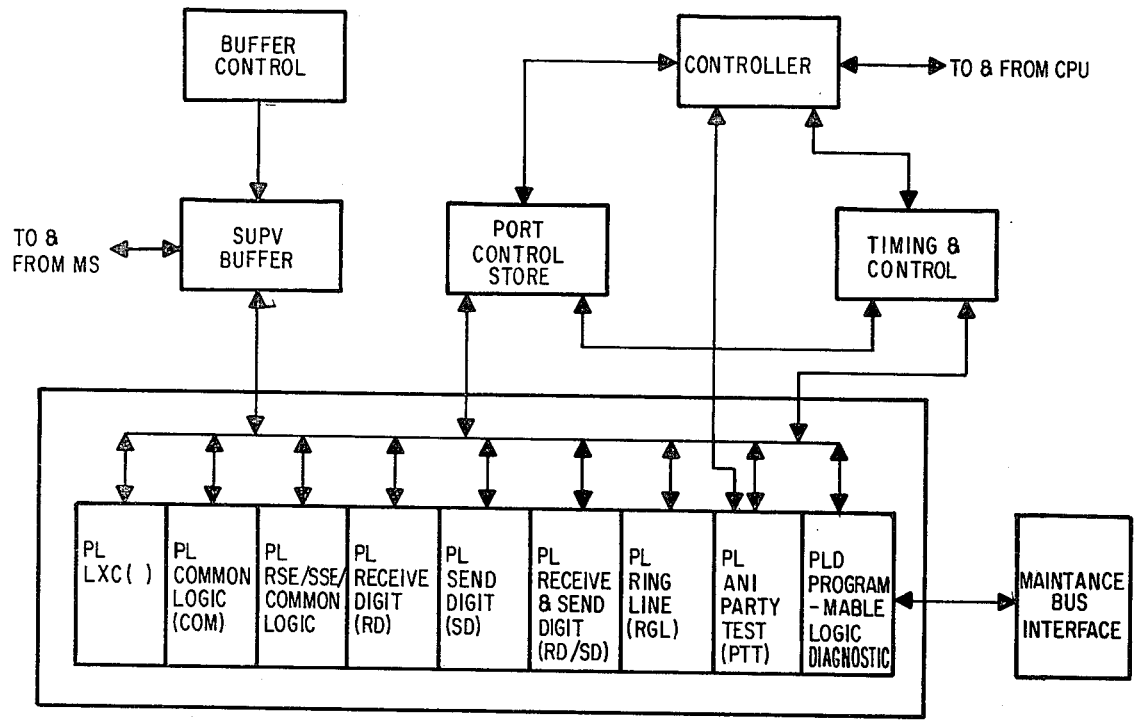
FIG. 17 is a block diagram of one of the port control stores shown in FIG. 4.
FIG. 18 depicts the command registers in a portion of the circuitry of FIG. 17.
Figures 19, 20:
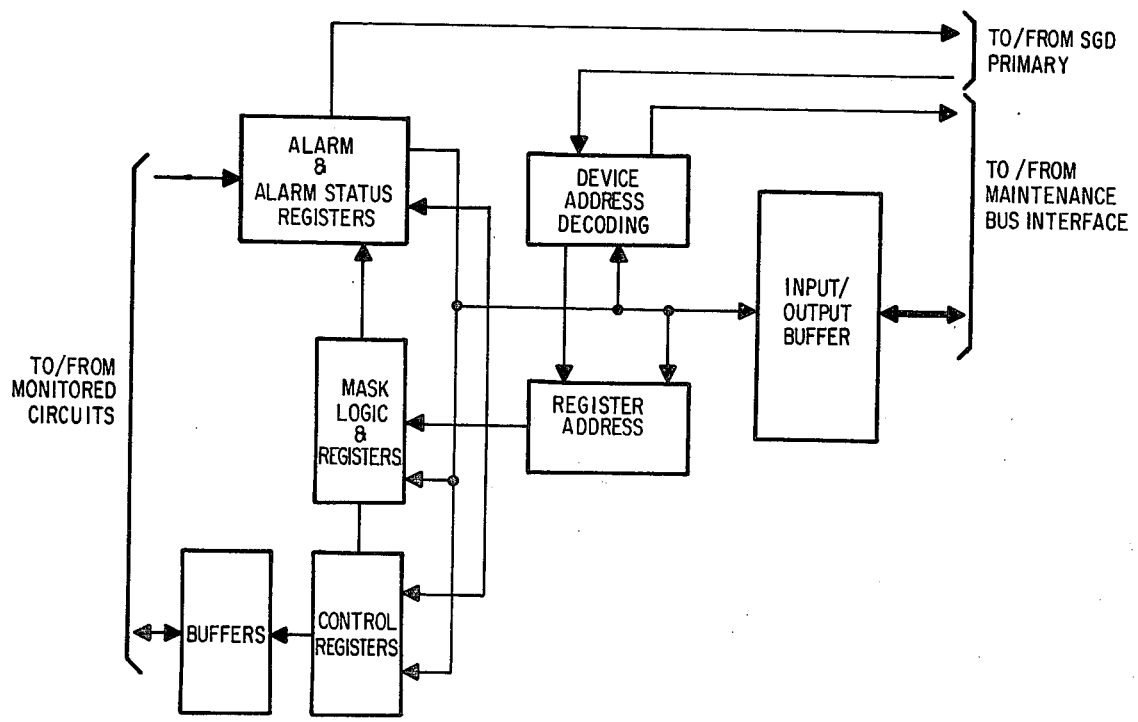
FIG. 19 depicts the status registers in a portion of the circuitry of FIG. 17.
FIG. 20 is a block diagram of secondary circuitry in the service group diagnostic circuitry shown in FIG. 4.

A programmable logic diagnostic (PLD) circuit, illustrated in FIG. 17, is adapted to monitor the functions of the port control systems including the controller therefor, matrix switch, timing and control, and supervisory buffer registers. The PLD circuit is interfaced with the maintenance bus interface for communication with the maintenance processor and contains hardware and software controlled error detectors and diagnostics. Each PLD circuit associated with the respective portions of the port control system is addressable by the maintenance processor. Any number of PLD circuits may be employed, depending upon the number of port groups. FIG. 17 shows a basic block diagram of the program logic diagnostic circuit and the devices monitored by that circuit. Command and status registers for a program logic diagnostic circuit are shown in FIGS. 18 and 19 respectively. Bit positions 00 through 03 of command register CR-0 are utilized to generate an alternate supervisory bit error under the control of the maintainance processor in accordance with the contents of bit positions 00 and 01 when bit 02, an enabling bit position, is set. Bit 03 clears a forced error command. Bits 04 through 07 are mask error commands to mask error reporting from portions of the program logic, such as the alternating supervisory bit errors, equipment number parity errors, an equipment number force error in timing and control, and an equipment number force error in the program logic diagnostics.

Bit positions 00 through 02 in command register CR-1 are utilized to mask parity errors from various portions of the port control store, to force parity errors in the port control store, and to mask all errors in the port control store. Bits 6 and 7 are utilized to set parity errors on bus lines. If additional commands were to be used, additional command registers, such as the CR-2 and CR-3 registers shown in FIG. 18, could be utilized.

Status register SR-0 in FIG. 19 is utilized to monitor the status of parity errors existing in the port control store or call processor unit, alternating supervisory bit errors, equipment number parity errors, and equipment number force errors in timing and control circuitry and in the program logic diagnostics.

Bits 00 through 03 of status register SR-1 are used to monitor parity status of the respective port circuits in the port control system. Bits 04 through 07 record equipment number errors. Additional status registers are used to record additional errors as needed.

Service Group Diagnostic Circuit

Figure 21:
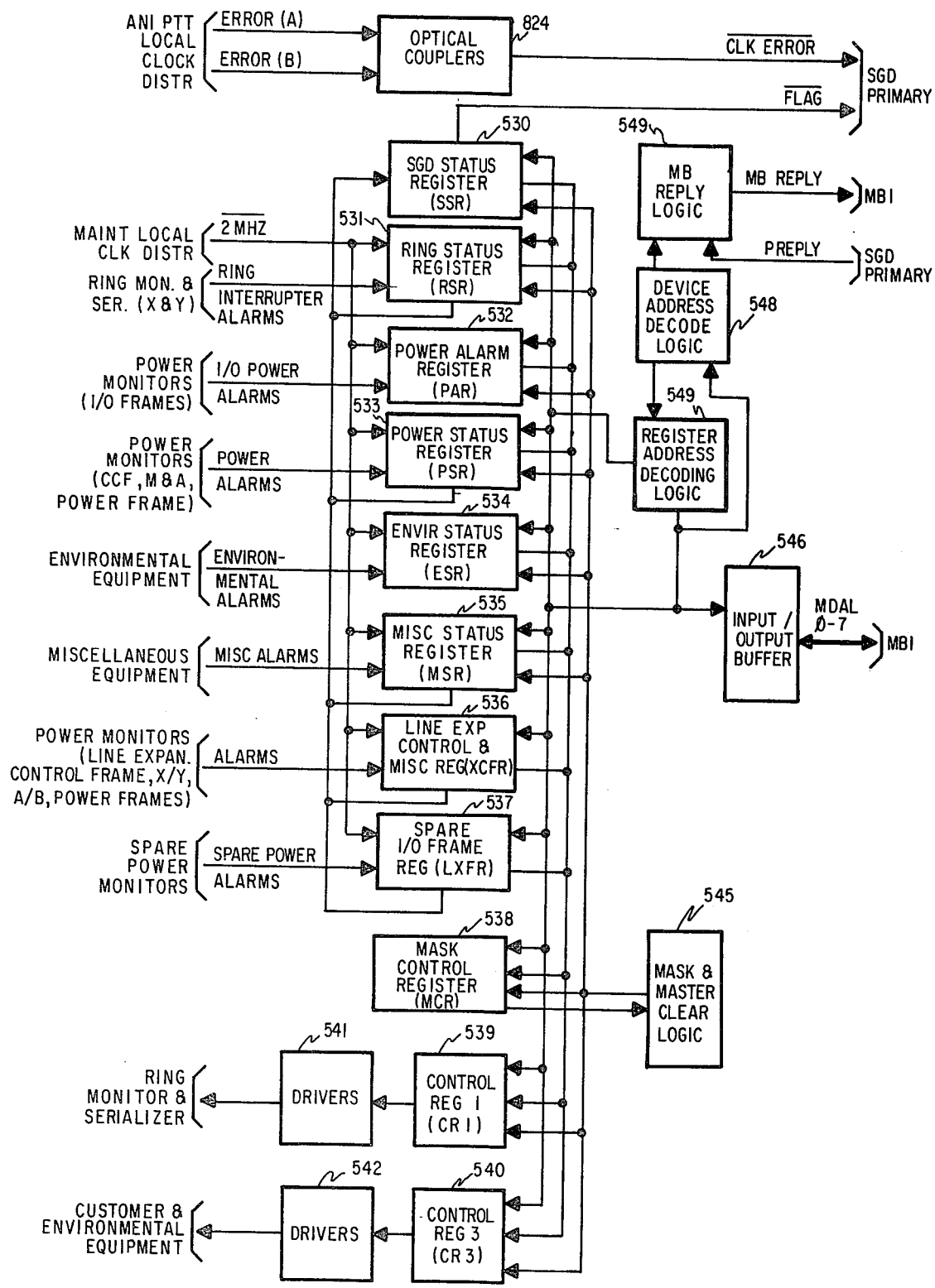
FIG. 21 is a more detailed block diagram of a portion of the circuitry shown in FIG. 20.
Figure 23:
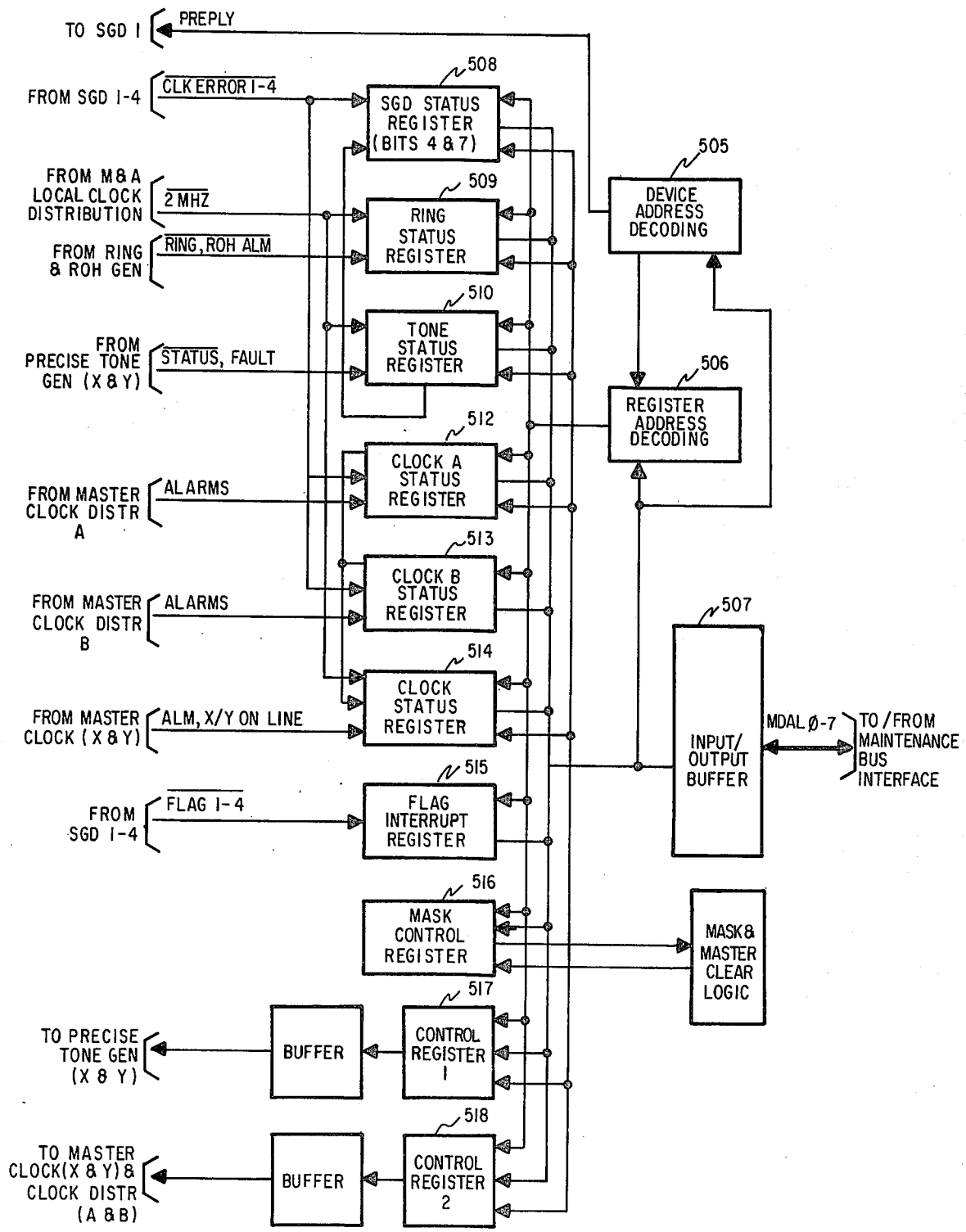
FIG. 23 is a block diagram of primary circuitry in the service group diagnostic circuitry shown in FIG. 4.

The service group diagnostic circuit shown in FIG. 4 comprises an SGD primary circuit and an SGD secondary circuit. The SGD primary circuit shown in general in FIG. 23 reports alarms from various monitored circuits to the maintenance processor via the maintenance bus interface. The inputs from the monitored circuits as shown in FIG. 23 include master clock, master clock distribution (sides A and B), various local clock distribution circuits, precise tone generators, and ringing and receiver off-hook generators. As shown in FIG. 21, secondary circuits monitor ANI party test, local clock distribution circuits, power monitors, environmental sensors, and customer-supplied equipment. In addition, SGD secondary circuits accommodate alarms from ring monitor and serializer circuits.

Alarms received by SGD primary circuit are stored in status registers dedicated to the monitored circuits. The SGD primary circuit generates a flag to the maintenance bus interface 302. On storing the flag in a status register, the maintenance bus interface interrupts the maintenance processor. After determining from the status register in the maintenance bus interface that the flag is from the SGD, the maintenance processor begins a series of read operations addressed to registers in the SGD circuits.

First the maintenance processor reads the flag register 515 of FIGS. 24(f) and 23 in the SGD primary circuit to determine which SGD circuit raised the flag. Then the maintenance processor reads the SGD status register of FIG. 24(g) to determine which type of monitored circuit generated the alarm. Finally, the maintenance processor reads the specific circuit alarm status register shown in FIGS. 24(a) through 24(d) to determine the exact nature of the alarm. With this information, the maintenance processor determines what remedial action is required and transfers an appropriate control word to the SGD primary circuit via the maintenance bus interface. This word is stored in one of three control registers, the outputs of which are sent to the monitored circuits.

The SGD primary circuit provides alarm masking through a mask control register (FIG. 22a) and three mask registers. With these circuits, alarms may be masked, or inhibited, individually or totally. These circuits also provide master clearing of all status and control registers and the mask registers.

Communication between the SGD primary circuit and the maintenance processor is via the maintenance bus and the maintenance bus interface. An eight-bit address and data word and seven control bits are transferred between the maintenance bus interface and the SGD primary circuit via differential drivers and receivers.

Address decoding in decoders 505 and 506 of FIG. 23 is accomplished by a comparator that matches maintenance bus bits against a prewired bit pattern. The comparator is enabled when a device address is received and sets a flip-flop. The output of the flip-flop then enables the decoding of subsequent addresses on the maintenance bus to specify the register on the SGD primary circuit to or from which data is to be transferred.

When an alarm is reported to the SGD secondary circuits, corresponding flags are generated to the SGD primary circuit. The SGD primary circuit then initiates an interrupt sequence to request attention from the maintenance processor. As a result of this action, the maintenance processor ultimately addresses the SGD circuit that received the alarm. During communication between the maintenance processor and the addressed SGD circuit, the SGD circuit must generate an MB REPLY signal on the maintenance bus in response to a data in or data out command.

The flag interrupt register of FIG. 24(f) on the SGD primary circuit allows the maintenance processor to determine which SGD secondary circuit detected the alarm condition responsible for an interrupt that has occurred. To read the flag interrupt "register", the maintenance processor sends the associated register address via maintenance bus lines 1 through 4. The address is interpreted by the register address decoder, which generates read signals.

The SGD status register of FIG. 24(g) stores bits that indicate where in the system an alarm condition has occurred. By reading the status register the maintenance processor knows whether alarms occurred in the tone plants (T), the ring and ROH generators (R), the power supply monitors (P), the clocks (C), the environmental equipment (E), or miscellaneous equipments (M). Bits 7 and 4, designated as T and C, respectively, are provided by the SGD primary circuit and bits 6, 5, 3, 2, 1, and 0, designated as R, P, E, M, XALM, and YALM, respectively, are provided by each SGD secondary circuit. Clearing of any particular status register bit is accomplished when the maintenance processor reads the content of the alarm status register as directed by the status register. Each of the alarm conditions that result in setting bit C, R, or T in the register can be masked by the maintenance processor by mask control register 806.

Alarm status registers store alarm conditions from the various monitored circuits. The alarm bits are clocked into latches by the 2 MHZ clock from the maintenance local clock distribution circuit. Upon being addressed internally by the maintenance bus interface, the bits stored in the register are put on the data lines through a enabled tri-state device to be read by the maintenance processor. Thus the maintenance processor is made aware of the nature of the alarm. One register is assigned to all circuits that perform similar functions.

A ring status register 509 of FIGS. 23(b), shown in more detail in FIG. 24(e), stores emergency and non-emergency alarms from X and Y ringing interrupters, as well as an illegal action alarm indicating improper switching between the interrupters. In addition, the register stores alarms indicating failure of the ringing generator or the receiver off hook generator. Detectors are located on the ring interruptors and generators and provide functional signals by conventional means.

Bits 2 and 3, representing ringing generator failure, are set by signals received from the ringing monitors in sides X and Y, respectively. Because both monitors are on line, both bits should be set if the on-line generator fails. If only one bit is set, one of the monitors likely also has failed.

A tone status register 510 receives on-line or off-line status bits and fault bits from the X- and Y-side precise tone generators. In addition, the register may receive an illegal action alarm indicating the maintenance processor has forced a switchover to the faulty off-line side. The setting of either of the fault bits or the alarm bit also sets a bit in the SGD status register 510, which initiates an interrupt to the maintenance bus interface. The maintenance processor can prevent the setting of a bit in the status register by using the mask and control register 506 to inhibit the status register clock input.

A clock A status register 512 of FIG. 22(b) stores alarms and error indications from the master clock distribution circuit and various local clock distribution circuits in side A of the system. The ANI party test local clock distribution circuit for each common control sector supplies alarm information to the register 514 in the SGD primary circuit to the maintenance processor knows which of the four CCS's in a 8000-line system has reported clock distribution alarms. Any one of the alarms in clock A status register sets a bit in the clock status register, which subsequently interrupts the maintenance processor. In the meantime, a signal representing a clock error in side A is ORed with the side A power supply alarm from secondary circuits. Designated PWR/CLK FAIL A, this signal is sent to the switchover control to initiate a switching action to side B of the system. Similarly, a PWR/CLK FAIL B signal is generated to tell the switchover control to switch the system from side B to side A. A clock B status register 513 stores the same kind of alarms and error indications for the B side of the system that the clock A status register stores for the A side.

A clock status register 514 stores alarm and status information from master clock circuits X and Y and the error indications from the local clock distribution circuit in the maintenance and administration mode. In addition, the register 514 stores one bit from register 512 and one bit from register 513. These bits indicate that some form of clock error has occurred in either the X side or the Y side, respectively. Register 514 also detects an attempted switchover to an already faulty redundant master clock (X or Y). Should this occur, the SGD primary circuit generates an illegal action alarm. This signal causes a flag interrupt to be sent to the maintenance processor via the maintenance bus and the maintenance bus interface. The signal also is stored as bit 5 of the register 514 as indicated in FIG. 24(a), which can be read by the maintenance processor when register address is issued.

The control registers 517 and 518 in the SGD primary circuit of FIG. 23 supervise the alarm status registers 508 through 515 and generate testing signals from certain other circuits. Communication between these registers and the maintenance processor is via the maintenance bus and the maintenance bus interface. During a write operation to a control register, the eight data bits are clocked into the flip-flops that constitute the register by a decoded register address. During the reading of a control register, the 8-bit contents are gated onto the maintenance bus through tri-state drivers that are enabled by the decoded register address. FIG. 25 illustrates the bit formats for the control registers.

Control Register 1, FIG. 25(c), has control over precise tone generators X and Y, the ringing monitor and serializer, and miscellaneous customer equipment. In the first case, it can reset the alarm in either precise tone generator X or Y and effect a switchover to the tone generator not reporting the alarm. In the second case, a command to effect a transfer to the other redundant ring interrupter and a command to release the nonemergency alarm on the ring interrupters are provided in CR1.

Through Control Register 2, FIG. 25(B), the maintenance processor can generate test signals to the master clock (X and Y), the master clock distribution circuit, various local clock distribution circuits (side A and B), and the power supply monitors. The register also can be used to control customer equipment. Bit 7 true selects side X; bit 7 not true selects side Y. Similarly bit 6 true denotes selection of sid A; bit 6 not true denotes selection of side B. In the case of the master clock, combination of bits 3 and 2 generate test signals to accomplish the following functions.

1. Switch from the on-line master clock to the off-line master clock and then terminate the switchover command after a predetermined time period.
2. Check the 8 MHZ period, the 4-millisecond sync error, the 131-second sync error, and the 6.144-second sync error, sequentially.
3. Check switchover circuitry.

When bit 5 is true, various local clock distribution cards are subject to test signals for checking 8 MHZ and 2 MHZ clock (selected by bits 3 and 2). When bit 4 is true, the master clock distribution circuit receives signals for checking its switchover circuitry and for checking missing pulses.

The Mask Control Register 516 of FIG. 23 accomplishes the following functions:
1. masking of individual clock, ring, and tone alarms that set bits in the status registers;
2. clearing of individual masks;
3. global masking and clearing of masks; and 4. master reset for all control and status registers.

Register 516 accomplishes these functions through three mask fields, each associated with a particular status register. Mask register 0 is associated with the clock status register. Mask register 1 is associated with the ring status register, and Mask register 2 is associated with the tone status register. The bits stored in the register 516 are applied as data inputs to four 3-to-8 bit decoders. Bits 5, 6, and 7 are interpreted by the first decoder to specify whether mask register 0, 1, or 2 is to be affected by the operation. If all three bits are true, all mask registers are involved in either a global masking or a global clear, depending on the states of bits 0 and 1. After the specific mask register is selected by bits 5, 6, and 7, the specific bit in that register that is to be set or cleared is determined by bits 2, 3, and 4 as decoded by the other three 3-to-8 bit decoders. The outputs of these decoders are applied as clock inputs to the flip-flops that constitute the mask registers. Set and reset steering inputs to these flip-flops are provided by signals decoded from bits 0 and 1 of the mask control register. When bit 0 is true and bit 1 is not true, set steering is applied to all mask register flip-flops. When bits 5, 6, and 7 are all true in conjunction with this configuration of bits 0 and 1, a reset is applied to all the mask registers and flip-flops. This provides a global masking of all alarms handled by the SGD primary circuit. When bit 0 is not true and bit 1 is true, all flip-flops in the mask registers are reset. With this configuration of bits 0 and 1 and with bits 5, 6, and 7 all true, a clear signal is sent to all the mask register flip-flops. This provides a global clearing of all alarm masks in the SGD primary circuit.

Service Group Diagnostic Secondary Circuits

The Service Group Diagnostic Secondary Circuits shown in block diagram in FIG. 20 are used with the SGD primary circuit to monitor alarms generated throughout the system and report these alarms to the maintenance processor. The circuits are similar functionally to the SGD primary circuit, differing mainly in that each monitors different circuits.

Whereas the SGD primary circuit monitors circuits that serve the entire system, regardless of the number of ports installed, each secondary circuit monitors those circuits that are repeated for every 1920 ports (one Common Control Sector, or CCS). These circuits include monitors in the I/O frames (IOF), Common Control frames (CCF), Maintenance and Administration (M&A) cell, and Call Processor (CPU) cell, as well as environmental and customer equipment. Each secondary circuit also receives clock error signals from the Local Clock Distribution circuit in the ANI Party Test circuit. However, these signals are sent immediately to the SGD primary circuit, where they are stored in the Clock A or Clock B Status Register. In addition, the secondary circuit card receives Ringing Interrupter failure and illegal switching alarms from the X and Y Ring Monitor and Serializers.

Most alarms received by the secondary circuit are stored in an alarm status register. Unless the Mask Control Register is configured by the maintenance processor to prevent it, the storing of an alarm in a status register also sets a bit, representing the type of alarm, in the Status Register and sends a FLAG signal to the primary circuit. The SGD primary circuit then generates the MB FLAG signal to the maintenance bus interface. On storing the flag in a register, the maintenance bus interface interrupts the maintenance processor.

After determining from the register in the maintenance bus interface that the flag is from the SGD, the maintenance processor begins a series of read operations addressed to registers on the SGD cards.

First the maintenance processor reads the flag register on the SGD primary circuit to determine which SGD circuit raised the flag. Then the maintenance processor reads the SGD status register to determine which type of monitored circuit generated the alarm. Finally, the maintenance processor reads the specific circuit alarm or alarm status register to determine the exact nature of the alarm. With this information, the maintenance processor determines what remedial action is required and transfers an appropriate control work to the secondary circuit via the maintenance bus interface. This word is stored in one of two control registers 539 or 540 of FIG. 22(c), the outputs of which are sent to the monitored circuits.

The secondary circuit provides alarm masking through a mask control register 538 and one mask register. With these circuits, alarms may be masked, or inhibited, individually or totally. That is, they can be prevented, individually or totally, from setting a bit in status register 530 and interrupting the maintenance processor. These circuits also provide master clearing of all status and control registers and the mask registers.

Communication between the secondary circuit and the maintenance processor is via the maintenance bus and the maintenance bus interface. Eight-bit address and data words and seven control bits are transferred between the maintenance bus interface and the secondary circuit via differential drivers and receivers. The SGD primary card and the SGD1 card are assigned the same device address and are addressed by the maintenance processor simultaneously. The secondary circuits are assigned individual device addresses and are addressed by the maintenance processor separately.

Address decoding in the secondary circuit is accomplished by a 4-bit comparator that matches maintenance bus bits 1 through 4 against a prewired bit pattern which subsequently enables the decoding of subsequent addresses on the maintenance bus to specify the registers on the secondary circuit to or from which data is to be transferred.

When an alarm is reported to the secondary circuit that card generates FLAG to the SGD primary circuit. The SGD primary circuit then initiates an interrupt sequence to request attention from the maintenance processor. As a result of this action, the maintenance processor ultimately addresses the SGD circuit that received the alarm. During communication between the maintenance processor and the addressed SGD circuit, the SGD circuit must generate an MB REPLY signal on the maintenance bus in response to a data-in or data-out command.

A status register 530 stores bits that indicate where in the system an alarm condition has occurred. By reading register 530 the maintenance processor knows whether alarms occurred in the tone plants (T), the ring and ROH generators (R), the power supply monitors (P), the clocks (C), the environmental equipment (E), or miscellaneous equipments (M). The relative bit position and the monitoring function of register 530 is shown in greater detail in FIG. 22(e).

A Ring Status Register 531 stores emergency and nonemergency alarms from X and Y ringing interrupters and an illegal action alarm indicating improper switching between interrupters. These alarms are reported by the Ring Monitor and Serializer.

Bits 7 and 6 of the register 531 shown in FIG. 22(*i*) indicate which ringing interrupter (X or Y, respectively) is on line. Bits 5 and 4 indicate whether a non-emergency alarm or an emergency alarm, respectively, has occurred in the ringing interrupter. Bit 1 indicates illegal switching from one interrupter to the other. Bits 3, 2, and 0 are provided through the SGD primary circuit to indicate a failure in the ringing generator or the receiver off hook (ROH) generator.

The occurrence of any of these conditions also sets the R bit (bit 6) in the status register unless this is inhibited by the Mask logic. Setting of the R bit by ring status register bit 3, 2, or can be masked via the mask control register 538 and mask logic on the SGD primary circuit. Setting of the R bit by ring status register bit 7, 6, 5, 4, or 1 can be masked by the mask control register and mask logic.

A Power Alarm Register 532 shown in more detail in FIG. 22(*e*) monitors the power supply alarm from the I/O frame associated with each common control. These alarms are stored in registers by the system clock. When one or more of these alarms occur, bit 0 is set in the Power Status Register. At the next clock pulse, unless the mask logic is configured to prevent it, the P bit (bit 5) also is set in the status register. This generates the FLAG signal to the SGD primary circuit, which then sends the MB FLAG interrupt via the maintenance bus interface to the maintenance processor.

A Power Status Register 533 shown in more detail in FIG. 22(*f*) stores bits indicating power failures in one or more I/O frames, common control frames (CCF), Call Processor cells (CP A and B), power frames or system sides (A or B), and in the Maintenance and Administration (M&A) cell. By reading the power status register, the maintenance processor can identify the general area of the system in which a power failure has occurred. Other registers then can be read to determine the exact location of the failure.

Bit O of the power status register stores a bit indicating that power has failed in one of the I/O frames. This bit is set whenever a bit is set in the power status register. Bits 1 and 2 of the power status register represent power failures in CCF A and B, respectively. Bit 3 records a power failure in the M&A cell of the M&A frame. Bits 4 and 5 of the power status register record failure of power in the B and A Call Processors and associated circuits, respectively. Bits 6 and 7 indicate that power has failed either in power frame B or A, respectively, or in side B or A of the system, respectively. Bit 6 is set in the power status register whenever bit 4 of 6 is set in the Line Expansion Control and Miscellaneous Register (XCFR). Bit 7 is set in the power status register whenever bit 5 or 7 is set in the XCFR.

Unless the mask logic is configured to prevent it, the setting of any bit in the power status register sets the P bit (bit 5) in the status register. This in turn generates the FLAG signal to the SGD primary circuit, which then sends an MB FLAG interrupt to the maintenance processor via the maintenance bus interface.

An Environmental Status Register 524 shown in more detail in FIG. 22(*g*) stores bits representing alarm conditions that have occurred in environmental or miscellaneous customer equipment. This includes such equipment as blowers and air conditioners. An alarm condition in any of these circuits should close a relay contact to ground, applying steering to one input of the environmental status register.

The occurrence of any of these alarm conditions causes the E bit (bit 3) to be set in the SSR. This generates the FLAG signal to the SGD primary circuit, which then sends the FLAG interrupt via the maintenance bus interface to the maintenance processor.

A Miscellaneous Status Register 535 stores bits that represent alarm conditions in customer equipment such as forced-entry monitors and cable pressure monitors. An alarm condition in any of these circuits should close a relay contact to ground, applying steering to one input of the miscellaneous status register.

The occurrence of any of these alarm conditions causes the M bit (bit 2) to be set in the SSR. This generates the FLAG signal to the SGD primary circuit which then sends the MB FLAG interrupt via the maintenance bus interface to the maintenance processor.

A Spare I/O Frame Register 537 stores bits that represent blown fuses or tripped breakers on the Main Discharge Panel or the power Distribution Panel. Hardware is provided in this register to store only two bits, which are reported to the maintenance processor as bits 6 and 7 on the maintenance bus. Bit 6 represents a blown fuse or tripped breaker on the power Distribution Panel. When this occurs bit 0 is set in the power status register. At the next 2 MHz clock, unless the mask logic is configured to prevent it, the P bit (bit 5) also is set in the SSR. This generates the FLAG signal to the SGD primary circuit, which then sends the MB FLAG interrupt via the maintenance bus interface to the maintenance processor.

A Line Expander Control and Miscellaneous Register 536 stores bits that represent power failures in the power frames, line expander control frames, miscellaneous A- or B-side circuits, battery charges, or I/O frame ring buses or 48V coin control. Bits 7 and 6 represent, respectively, power failures reported by power frames A and B. Bits 5 and 4, spare alarm bits, represent power failures in miscellaneous circuits in sides A and B, respectively. Bit 3 represents a battery charger failure. Bit 2 represents a blown fuse in a ring bus or in a 48V coin control circuit in an I/O frame. Bits 1 and 0, respectively, represent power failures in line expander control frames X and Y. The occurrence of any of these failures results in the setting of the associated bit in the XCFR by the next 2 MHz clock pulse.

If bit 0 or 2 is set in the XCFR, the YALM bit is set in the status register. If bit 1 or 3 is set in the XCFR, the XALM bit is set in the status register. In either case, the FLAG signal is generated to the SGD primary circuit which then sends the MB FLAG interrupt via the maintenance bus interface to the maintenance processor.

If bit 4 or 6 is set in the SCFR, the PWR FAIL B bit (bit 6) is set in the power status register. If bit 5 or 7 is set in the SCFR, the PWR FAIL A bit (bit 7) is set in the power status register. When either PWR FAIL A or PWR FAIL B is set in the power status register, a corresponding signal is sent to the SGD primary circuit, the SGD primary circuit then sends a PWR/CLK FAILURE A/B signal to the switchover control to effect a switchover to the redundant side. Unless the mask logic is configured to prevent it, either PWR FAIL A or PWR FAIL B also causes the P bit (bit 5) to be set in the status register. This causes the FLAG signal to be generated to the SGD primary circuit which then sends the MB FLAG interrupt via the maintenance bus interface to the maintenance processor.

The control registers 539 and 540, which are addressable by the maintenance processor, allow supervision of the circuits that are monitored by the alarm and alarm status registers. The control registers also allow sending of test signals to certain of these circuits. Communication between the control registers and the maintenance processor is via the maintenance bus and the maintenance bus interface. During a write operation to a control register, the eight data bits are clocked into decoder register maintenance processor. During the reading of a control register, the 8-bit contents are gated onto the maintenance bus through tri-state drivers that are enabled by the decoded register.

An RRA bit in Control Register 1 539, as illustrated in FIG. 22(j), is translated into the ALM RLS signal, which clears the alarm counter in the Ring Monitor and Serializer. Bit 7, designated the XFER bit, produces the XFER signal, which causes the Ring Monitor and Serializer to effect a switchover from Ringing Interrupter X to Ringing Interrupter Y, or vice versa. The CR1 bits can be set or read on the circuit by addressing the SGD primary circuit, the CRI bits can be set or read addressing that circuit independently and issuing its register address.

Control Register 540 as illustrated in FIG. 22(k) allows the maintenance processor control customer and environmental equipment and to test the power monitors in the CCS. Bits 0 through 5 (CR3-0 through CR3-7) provide the TEST PWR1 and TEST PWR2 signals, respectively, that test the power monitors. The CR3 bits on the SGD1 card can be set or read by issuing the common SGD primary/SGD1 device address, and then issuing a register address along with an MBDOUT or MBDIN signal.

The Mask Control Register 538 as illustrated in FIG. 22(l) accomplishes functions of masking of individual power alarms, that is, prevention of individual power failure alarms from setting bits in the SSR, clearing of individual power alarm masks, global setting or clearing of power alarm masks, and master clearing of all control and status registers in the SGD secondary circuits.

The bits stored in the mask control registers are applied as data inputs to a pair of 3-to-8 bit decoders. One of these decoders interprets bits 5, 6, and 7. If bits 5 and 6 are true, the output of the decoder enables the second decoder to determine from bits 2, 3, and 4 which alarm is to be masked.

If bits 5, 6, and 7 are all true, all mask registers on the secondary circuit are involved in either a global masking or a global clear, depending on the states of bits 0 and 1. After the specific mask register is selected by bits 5, 6, and 7, the specific bit in that register that is to be set or cleared is determined by bits 2, 3 and 4 as decoded by the other 3-to-8 bit decoders. The output of this decoder is applied as a clock input to one of the flip-flops that constitute the Mask Register. Set and reset steering inputs to these flip-flops are provided by signal decoded from bits 0 and 1 of the mask control register. When bit 0 is true and bit 1 is not true, set steering is applied to all mask register flip-flops. When bits 5, 6, and 7 are all true in conjunction with this configuration of bits 0 and 1, a preset is applied to all the Mask register flip-flops. This provides a global masking of all alarms handled by the secondary circuit. When bit 0 is not true and bit 1 is true, reset steering is applied to all flip-flops in the Mask register. With this configuration of bits 0 and 1 and with bits 5, 6, and 7 are all true, a clear signal is sent to all the Mask register flip-flops. This provides a global clearing of all alarm masks in the secondary circuit. In addition, if both bit 0 and bit 1 are true, the MCLR signal is generated. While also clearing all mask register flip-flops, this signal clears the control and status registers on the secondary circuit.

All monitors for power, generators, environmental condition, etc. after conventional, the response of which will supply an on/off signal to the respective registers. It should also be noted that any condition may be monitored by the monitoring circuit wherein an on/off signal is generated to produce an operational/failure mode or functional/nonfunctional mode, as appropriate.

Port Control Diagnostic Circuit

Figure 26:
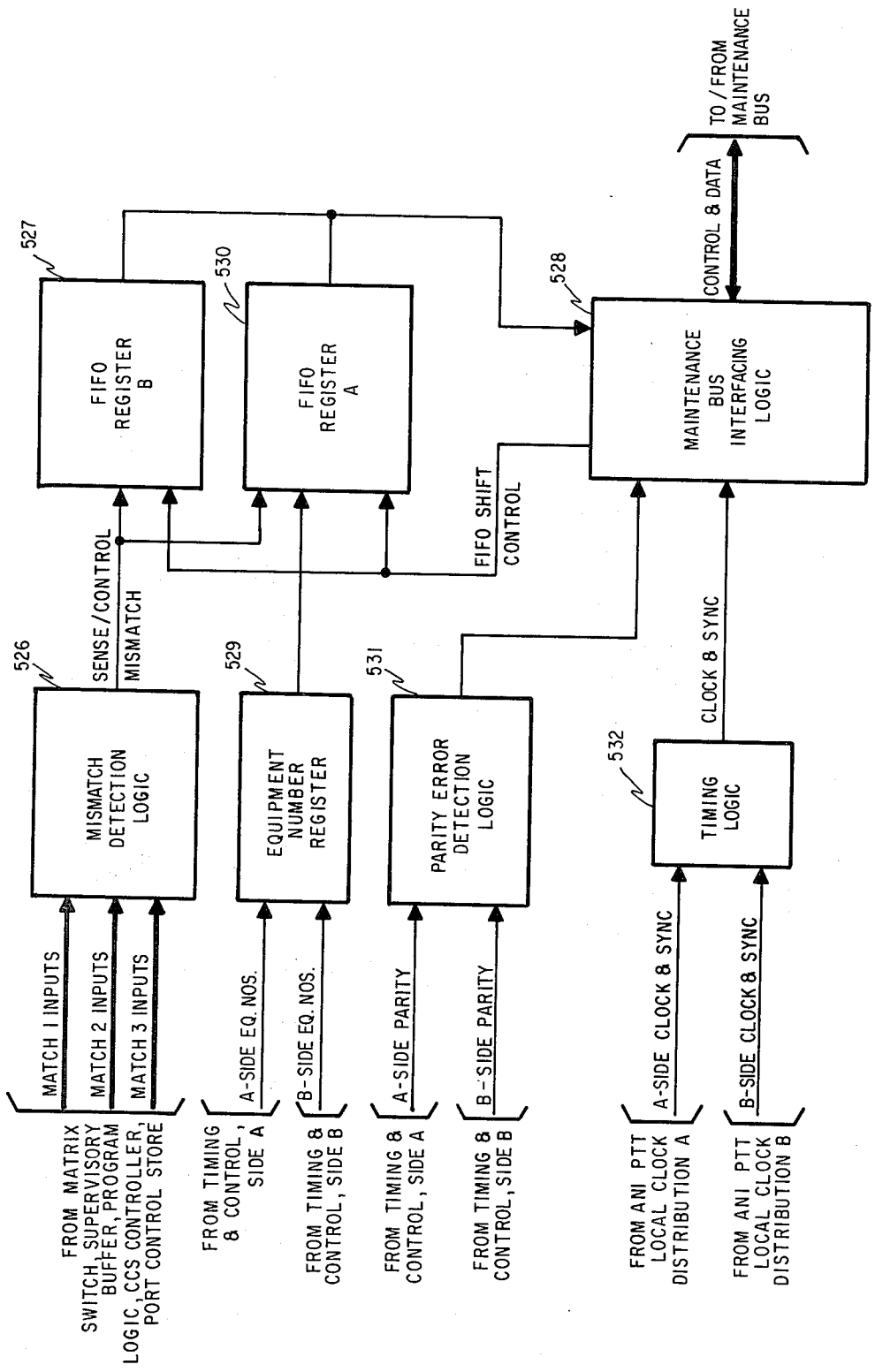
FIG. 26 is a block diagram of the port control diagnostic circuitry of FIG. 4.

Referring to FIG. 26, mismatch detection logic 526 of the port control diagnostics (PCD) circuit detects five kinds of signal mismatches between redundant, synchronous circuits in port control systems A and B. Parity error detection logic 531 monitors parity errors from port control stores in sides A and B. After detecting these mismatches and parity errors and storing a record of them in registers 529 and 530, the PCD circuit reports them by interrupting the maintenance processor via the maintenance bus interface (MBI) logic 528.

Each PCD circuit contains four functional circuit blocks as follows:
 (a) Mismatch and parity error detection logic;
 (b) FIFO memory and latches for storing the record of errors,
 (c) Interface with the maintenance bus for handling control signals and for reporting mismatchs and parity errors, and
 (d) Timing logic for strobing the mismatch and parity error detection logic.

Figure 28:
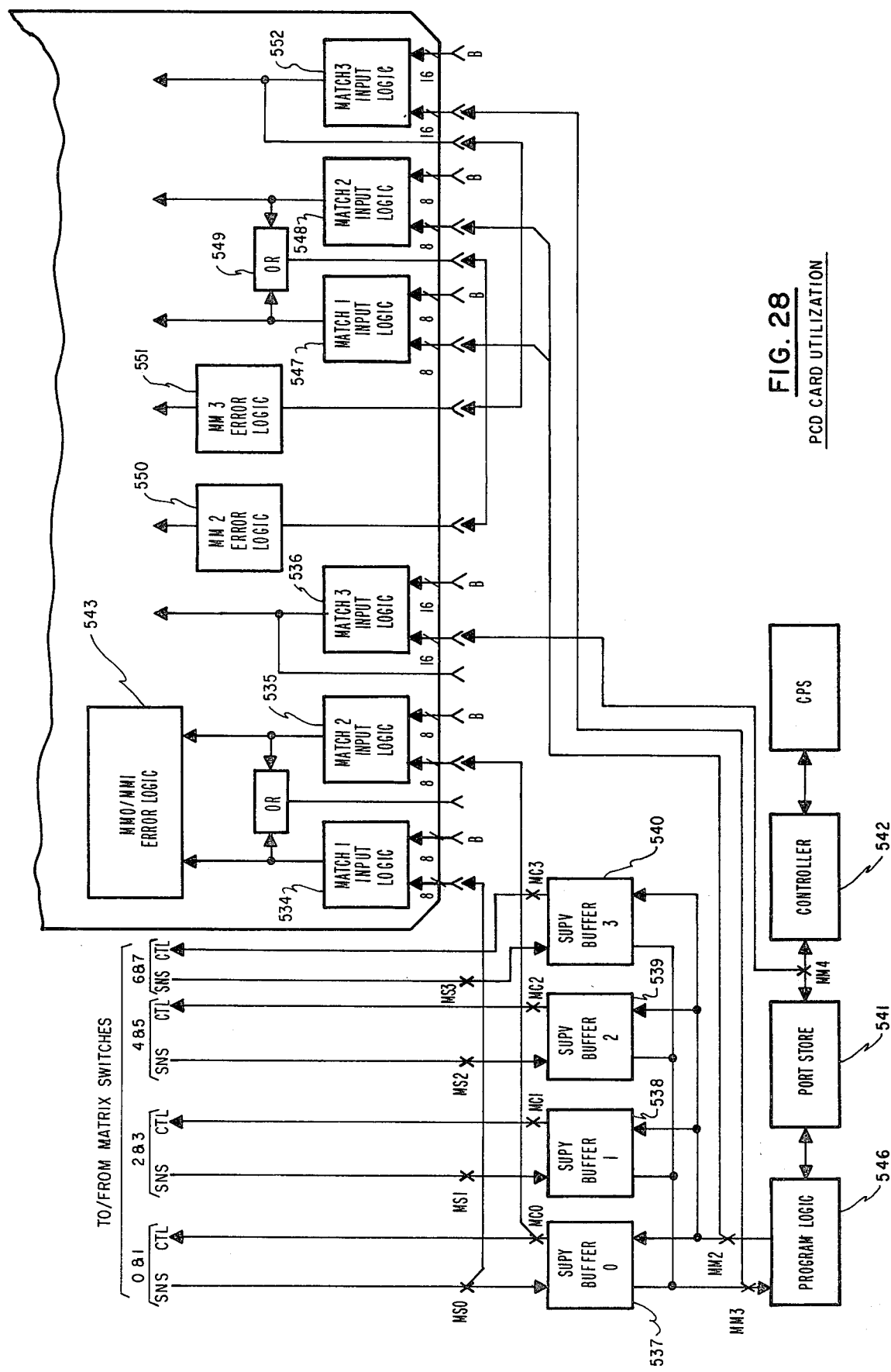
FIG. 28 is a more detailed block diagram of another portion of the circuitry shown in FIG. 26.

Referring to FIG. 28, mismatch detection is accomplished by two 8-bit matching circuits 534 and 535 and one 16-bit matching circuit 536. These circuits detect the five kinds of mismatches: namely,
 (a) An MM0 mismatch—Supervisory control bits transferred from the supervisory buffer 537 to the matrix switch.
 (b) An MM1 mismatch—Supervisory sense bits transferred from the matrix switch to the supervisory buffer 538,
 (c) An MM2 mismatch—Supervisory control bits written by program logic into the supervisory buffer 539,
 (d) An MM3 mismatch—Supervisory sense bits read by program logic from the supervisory buffer 540, and
 (e) An MM4 mismatch—Read or write data bits transferred between the port control store 541 and the common control sector (CCS) controller 542.

FIG. 28 discloses corresponding inputs from the A side of the telephony system only. Corresponding input signals representing the B side are also used.

MM0 and MM1 mismatches signals define one of four different mismatch conditions. MM0 represents the mismatch of supervisory control bits transferred from supervisory buffer 0, 1, 2 or 3 to the respective matrix switches. These mismatches are subdesignated MC0, MC1, MC2 and MC3, respectively. MM1 represents the mismatch of supervisory sense bits transferred to supervisory buffer 0, 1, 2, or 3 from the respective matrix switches. These mismatches are subdesignated MS0, MS1, MS2 and MS3, respectively. Because the serial sense and control bits are transferred between the supervisory buffer and the matrix switch at the same rate, the bits are compared, one bit at a time, at the same rate in the PCD circuit. These comparisons use the Match 1 and Match 2 circuits 534 and 535 in the PCD primary circuit. Any mismatch that is detected produces the appropriate MC0, MC1, MC2, MC3, MS0, MS1, MS2, or MS3 signal, which is clocked into the 8-bit MM0/MM1 register 544 of FIG. 27. The contents of this register are shifted into first-in, first-out (FIFO) register 545. After the FIFO register has been loaded, the MM0/MM1 register 544 is cleared and MM0/MM1 matching then resumes.

The control word transferred from program logic 546 of FIG. 28 to the supervisory buffer 537 is a 16-bit word. The comparison of this word from A and B sides is accomplished by the Match 1 and Match 2 logic 547 and 548. Match 1 logic 547 compares bits 0 through 7 from both sides; the Match 2 logic 548 compares bits 8 through 15. An OR circuit 549 produces a MATCH 1 OR 2 error signal if either a Match 1 or Match 2 error is detected. Error logic 550 responds to the MATCH 1 OR 2 signal by setting an MM2 ERROR flip-flop 565, again with subsequent loading of the FIFO register, clearing of the MM2 error signal and resumption of the MM2 comparisons.

Sense bits are transferred to the program logic 546 from the supervisory buffer 537 as 16-bit words. These words from both A and B sides are compared in Match 3 logic 552. The words first are clocked into cell-side and alternate-side Match 3 input registers 553 of FIG. 27 from each side. The register outputs are applied to the 16-bit comparator 554, and the result is output to MM3 ERROR flip-flop 551 of FIG. 28. A MM3 mismatch causes the MM3 ERROR flip-flop 555 to set so the error is recorded during a subsequent FIFO loading operation at the FIFO A 556, clearing of MM3 error and resumption of MM3 comparisons.

Figure 27:
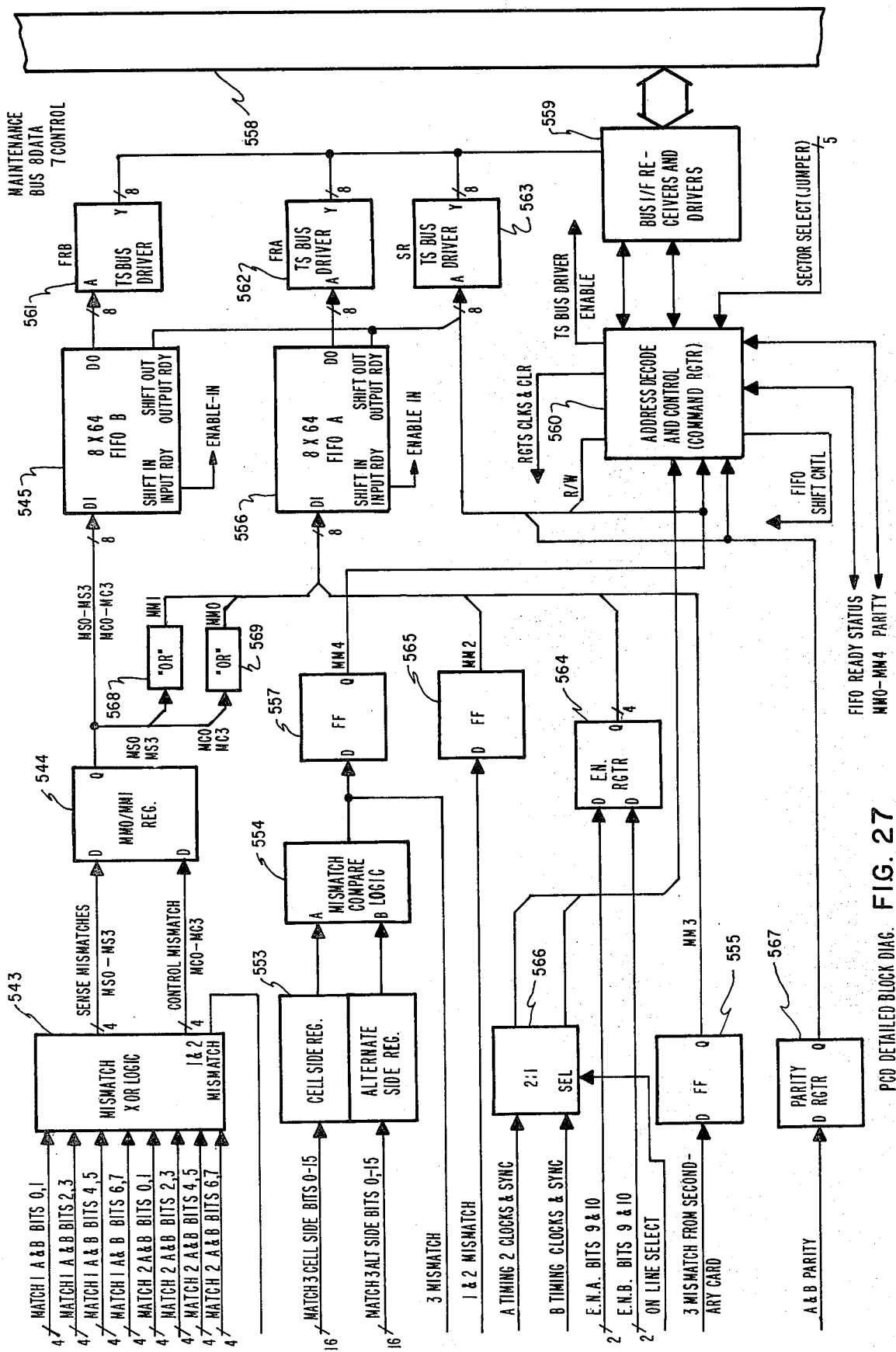
FIG. 27 is a more detailed block diagram of a portion of the circuitry shown in FIG. 26.

As shown in FIG. 27, the PCD circuit contains two 8-bit × 64-word FIFO memories 545 and 556. The two FIFO's operated as one 16×64-word FIFO memory in that their load and output operations are done simultaneously. The FIFO's store mismatch errors (MM0-MM3) and equipment numbers corresponding to the error occurrence. Every four port store memory cycles, an enable-in signal is generated. Shift-in logic responds to this enable-in signal by generating a FIFO-shift-in clock signal when both FIFO register enable-in signals are asserted and one or more mismatch error bits is set.

The PCD circuit communicates with the maintenance processor over the maintenance bus 558. The circuit receives address and command data at register 560 from the maintenance processor through the interface 559 and sends status data to the maintenance processor.

The PCD circuit communicates with the maintenance processor through one command register, one address register and three status registers. The command and address registers receive data from the maintenance processor while the status registers are read by the maintenance processor. PCD communication with the maintenance bus begins with the PCD's recognizing its address in the bus when the hold signal is negated and the device enable signal is asserted. The PCD circuit may then load the command register with eight bits of new data placed in the maintenance bus. Conversely, the PCD circuit may be requested to output data onto the maintenance bus from a status register prespecified by an address register load with the assertion of a data in-out signal to the register.

The command register which is a portion of register 560 is an 8-bit register loaded from the maintenance bus. The register controls error testing, masking of interrupts and resetting of functions in the PCD circuit. The test errors and mask bits of the command register remain in effect as long as they are set in the register.

Whenever errors are detected by the PCD circuit, an interrupt is sent to the maintenance bus interface. These errors include: (1) parity bits set in the parity error status register (PAR=1); (2) an MM4 error flip-flop set is set; or (3) the FIFO output ready signal is set indicating the FIFO register has received at least one input word. Each of the these conditions is independently maskable by setting the appropriate bits in the command register.

The equipment number register 564 contains bits 9 and 10 of the sequential equipment numbers from sides A and B used during the first and last portion of each port control store memory cycle. This register is clocked whenever either or both MM2 and MM3 error flip-flops are set. Thus, when the FIFO is read, the equipment number at the time of the error occurrence also is output as FIFO DATA. This is used as a diagnostic aid in fault isolation.

Test Call Generator

A programmably controlled test call generator is also provided in the error detecting and diagnostic system for the purpose of monitoring and diagnosing faults. As shown in FIG. 4, test call generator 308 communicates with the port circuits 310 through test access relay 309. The test call generator is in communication with the maintenance processor for receiving its commands via the maintenance bus interface.

Figure 29:
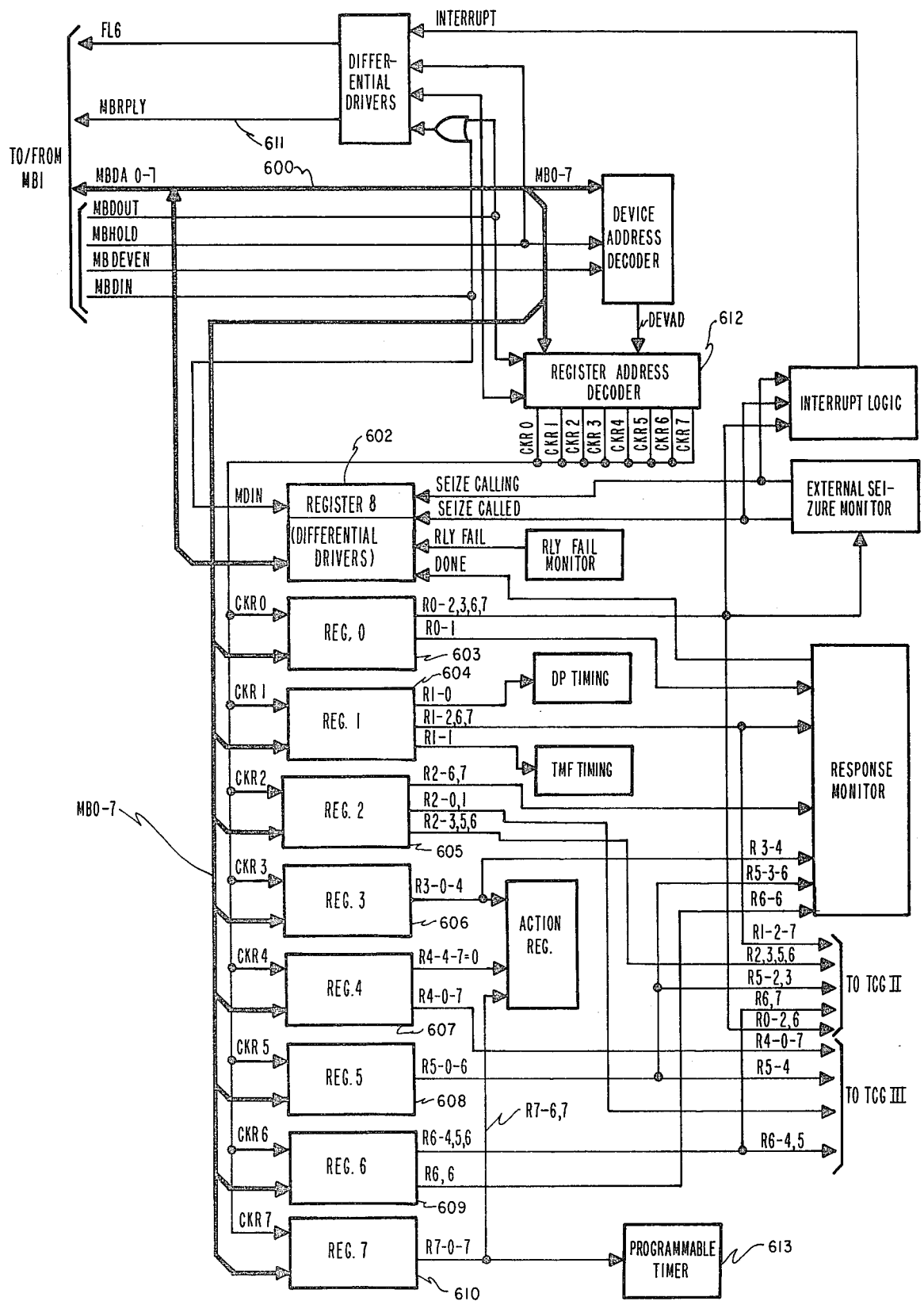
FIGS. 29 through 31 constitute a block diagram of the test call generator shown in FIG. 4.

The test call generator communicates with the maintenance bus interface through data/address lines and control lines of the maintenance bus, as indicated by elements 600 and 601 of FIG. 29. Test call generator, in this embodiment, has 8 registers 602 through 610 for transferring data, status and commands to and from the test call generator. Each of the registers may be individually addressed by the maintenance processor. To activate the test call generator, the maintenance bus transmits a particular bit stream on the maintenance bus 601 which is recognized by logic of the test call generator to enable the device. Similar to the other devices on the maintenance bus, a reply enable flip flop is triggered and a reply signal is generated and transmitted back to the maintenance bus, and ultimately to the maintenance processor on line 611. Again, similar to the other devices on the maintenance bus, the assertion of the device enable signal also clocks the address registers for reading the remaining 8 bits of the 16-bit stream transmitted by the maintenance processor. When the device is addressed, a device flip-flop sets and inhibits the decoding of whatever bits that may be stored in the address register at that time, and is asserted after a predetermined delay period, a hold signal to inhibit further clocking of the reply enable flip-flop until all communications between the test call generator and the maintenance bus interface are completed. When an enable signal is asserted a data out or a data in signal from the maintenance bus interface couples the reply signal back to the maintenance bus interface 302. When the device enable signal reverts to a non-asserted state, it triggers the device addressed flip-flop so the device address signals are distributed throughout the test call generator circuits.

For data to be read from the registers 602 through 610 from the test call generator circuit, the register address is transmitted from the maintenance processor on line 600 to access one of the internal registers in which data is stored. Four register address bits are clocked into the address register by a positive-going transition edge of the device enable MBDVEN signal of line 601 whereupon the register address is decoded by a decoder 612. Clocking signals are then transmitted to the appropriate register for receiving the remaining bits on the bus.

With respect to a data input to the maintenance processor from the test call generator operation, the logic for enabling data from the test call generator to be transmitted to the maintenance bus is performed by the MBDIN signal of line 601. The other logic for enabling data in from a particular device is the same as the other devices. With respect to the test call generator, all data in functions are read from registers 602.

As previously stated, the maintenance processor sets up test calls by sending commands to the registers of the test call generator. The particular functions of each of the bit positions of the 8 registers are shown in FIG. 32. These register outputs are applied to timing circuits, tone generators, dialing pulse generators and other call simulation condition generators for performing test functions on the individual port circuits.

Register 0 monitors seizure of a loop on E & M trunk circuit being tested. The register also stores bits that control the monitoring of S leads and HS leads or EC leads supervision from a step by step trunk being tested. Bits 0–3 in register 0 are associated with the calling port and bits 4–7 are associated with the called port.

More particularly, bit 1 of register 0 monitors the S and SH or EC leads from a calling port step by step, a trunk under test to determine if the port control system provides proper supervision on these leads. Some of the registers are adapted to monitor on/off conditions within the port circuits after connection thereto by the test access relays, and other registers set parameters under which the test call generator is to function once the connection is made. Means are also provided within the test call generator circuit to disconnect the respective test once the line is off hook, or the circuit being tested is engaged by the subscriber.

Register 1 stores bits that specify parameters for the calling port through which the test call is to be placed. Particularly, as shown in FIG. 32, bits 0, 1, and 2 classify whether signalling is to be done by dual tone multiple frequency, (DTMF) toll multiple frequency, (MP), or disk pulse (DP). Bits 4 and 5 activate relays to set up a conventional four wire configurations within the port circuit or to identify which party of a party line is access by the test call generator. Bit 6 of the register establishes parameters involved in the E&M trunk signalling and bit 7, in the embodiment shown, bypasses basic audio interface in the communication loop and switches in a low-value resistor.

With respect to register 2, signalling and ringing detection parameters are established for the called port circuit. Bits 0 and 1 specify whether signalling is through a port is to be DP or toll MF. Bit 3 converts the circuit to a 4-wire E&M trunk, bit 5 determines whether the tip or ring leads of the call port is to be connected to the ringing detector within the test call generator circuitry on the condition that bit 7 of register 6 is set.

Register 3 specifies the action the calling port is to execute, particularly, bit 0 specifies that the calling port is on hold.

Register 4 specifies the actions to be executed by the called port and the value of the digit to be dialed by the called port under control of register 3, bit 4.

Register 5 specifies the particular conditions for which the test call generator is to monitor and enables the detector that monitors for that condition.

Register 6 stores a variety of parameters used by the test call generator in detecting digit out pulsing and ringing and specifying from which side, e.g. calling or called, a monitored response is to come.

Register 7 stores information used in timing the functions of the test call generator. Bits 0–5 store the value that is loaded into programmable timer 613 of FIG. 31. Bits 6 and 7 of the register control the manner in which the programmable timer is used. For example, when neither bit is used, the timer signal is generated to allow the timer to count out the delay before an action is to take place. When the reset timer resets, an action register is clocked and the specified condition begins. When bit 6 is set, the action register is clocked to start the specified action, such as the application of a 2.84 kHz test tone. When bit 7 is set, the action register clocks to set a specified action.

The arrangement of bit patterns in the registers for the respective functions may vary widely, depending upon the application and type of circuitry which is disposed within the port groups and circuits.

Of particular importance is register 8 which is utilized by the test call generator to transfer data to the maintenance processor via the maintenance bus during execution of data input instructions. In the example as shown, the bits set in register 8 indicated, respectively, seize calling, seize called, done, and reply fail. Seize calling indicates that a seizure has been detected on the outside portion of a loop or E lead of the port being tested as the calling port. Generation of this signal is enabled by either bit 2 or bit 3 of register 0 when set. Seize call indicates that seizure has been detected on the outside portion of the loop or E lead of the port being tested as the called port. With either bit 6 or 7 of register 0 set, the gate generating this signal is enabled. The done signal signifies that a previously specified action involving the ports under test have been completed. The signal is generated by a flip-flop that is clocked by the response signal which denotes that the monitored action has occurred, and this signal generates an interrupt signal. The interrupt signal tells the maintenance processor that it can proceed to the next step of the test call. The reply fail signal is generated should either relay fail to operate as commanded during the execution of a test call. The failure of the relay used in setting up the circuit for a test call results in failure to produce a connection signal.

Figure 30:
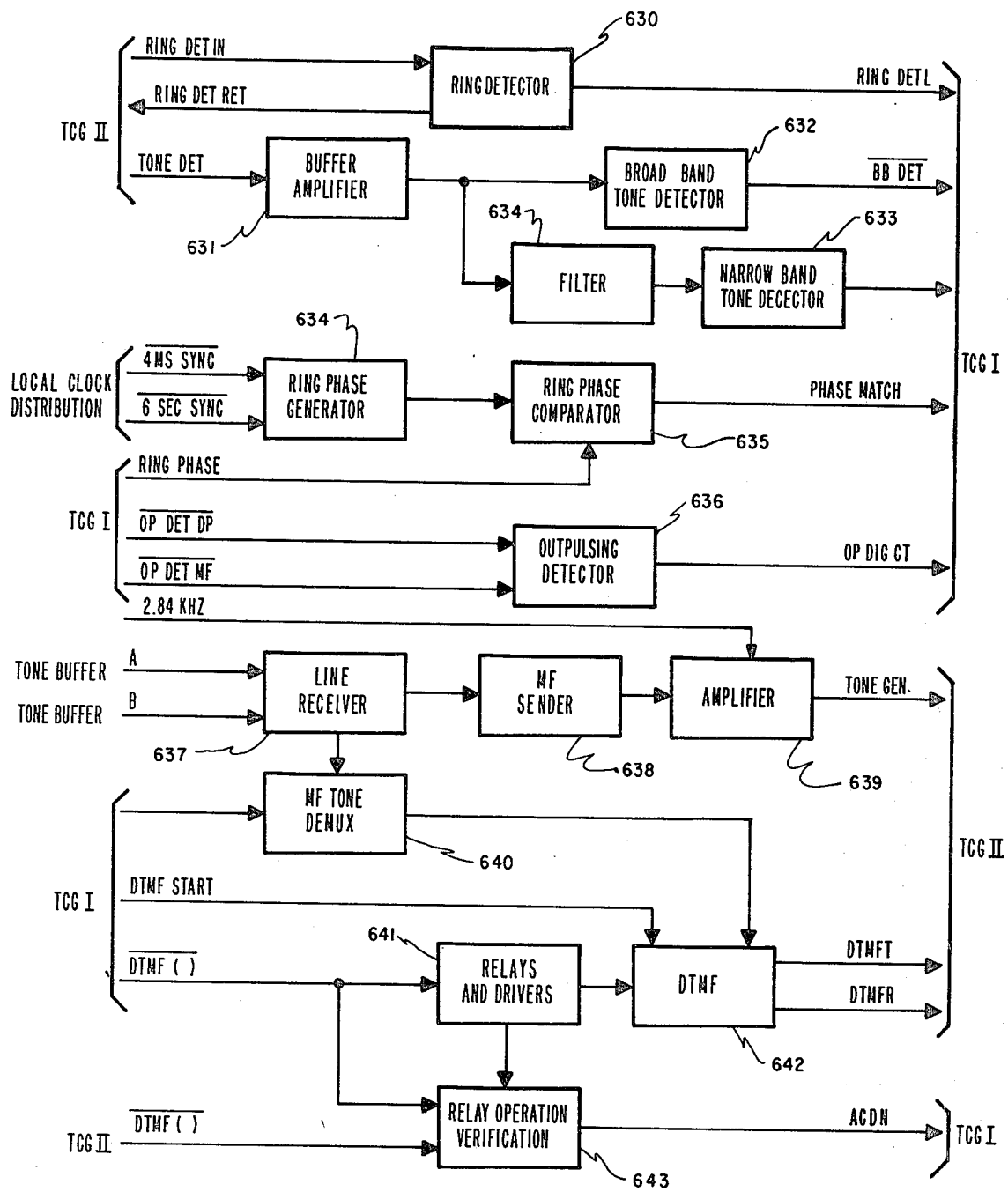

FIG. 30 shows a block diagram of another portion of the test call generator circuit that supplies signal inputs and measures responses to and from the port circuits. As illustrated in the diagram, ring detector 630 of a bridge rectifier and filter type whose dc output is used to operate a relay. The relay contacts are monitored by one of the status registers of the test call generator to indicate whether a ring was received by the port circuit being tested. The buffer amplifier 631 is adapted to monitor a broad band of tones connected to the port circuit. Ring phase generator 634 and comparator circuit 635 generate ringing phases identical to those used for normal call processing for purpose of detecting phase match. One pulsing detector 636 is used to determine if a trunk is outpulsing. Both DP and MF outpulsing are monitored by the detectors and a signal is sent to the test call generator when a valid digit is detected. Line receiver 637 accept the tones for certain MF tones from tone buffers from the respective redundant sides of the system. Either tone buffer may be selected by the basic maintenance panel. The multiple frequency sender contains an arrangement of analog filters for integrating the required multiple frequency tones and output amplifier 639 is used to match the multiple frequency sender to the telephone line circuit. Relays and drivers 641 are used to switch different tones to the DTMF depending upon the logic mandated by the test call generator programmed and hard wired logic. Each relay has its contact monitored by relay operation verification circuit 643 where contact closer generates a logic signal that is compared with the command to indicate a relay contact closure acknowledgement.

Figure 31:
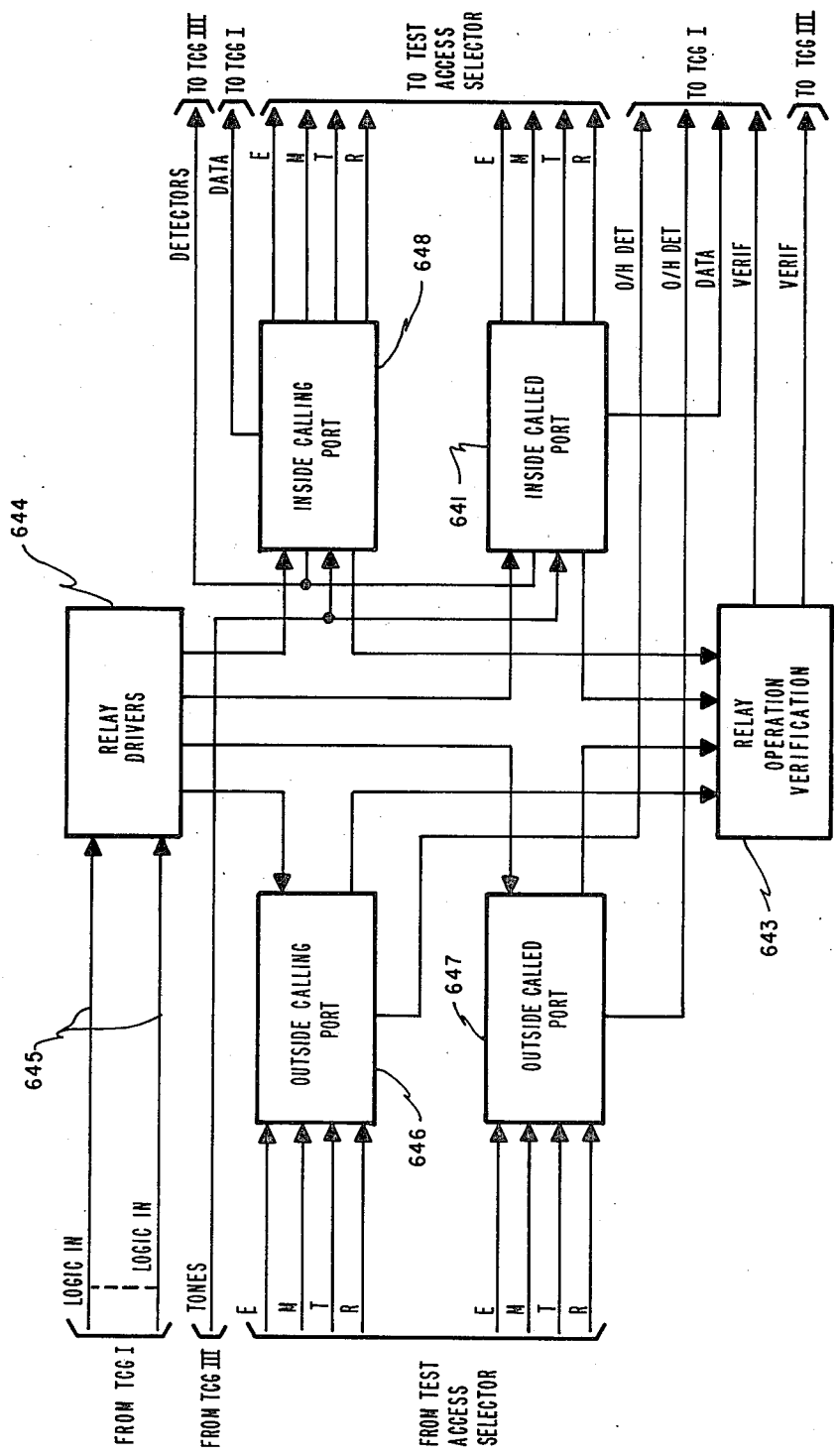

FIG. 31 illustrates a simplified diagram of relay drivers and interconnection with the test call generator and port circuits. The arrangement of contacts to be closed or opened is determined by the data contained in the test call generator registers as previously discussed and is fed into relay driver 644 through lines 645 access is made to the called ports and calling ports through relay arrangements contained in 646 and 647, 648, 649, respectively. Again, relay operation verification circuitry is shown in 643 and sends the appropriate signal back to the test call generator circuitry for the appropriate acknowledgement.

Test Access Relay

Figure 33:
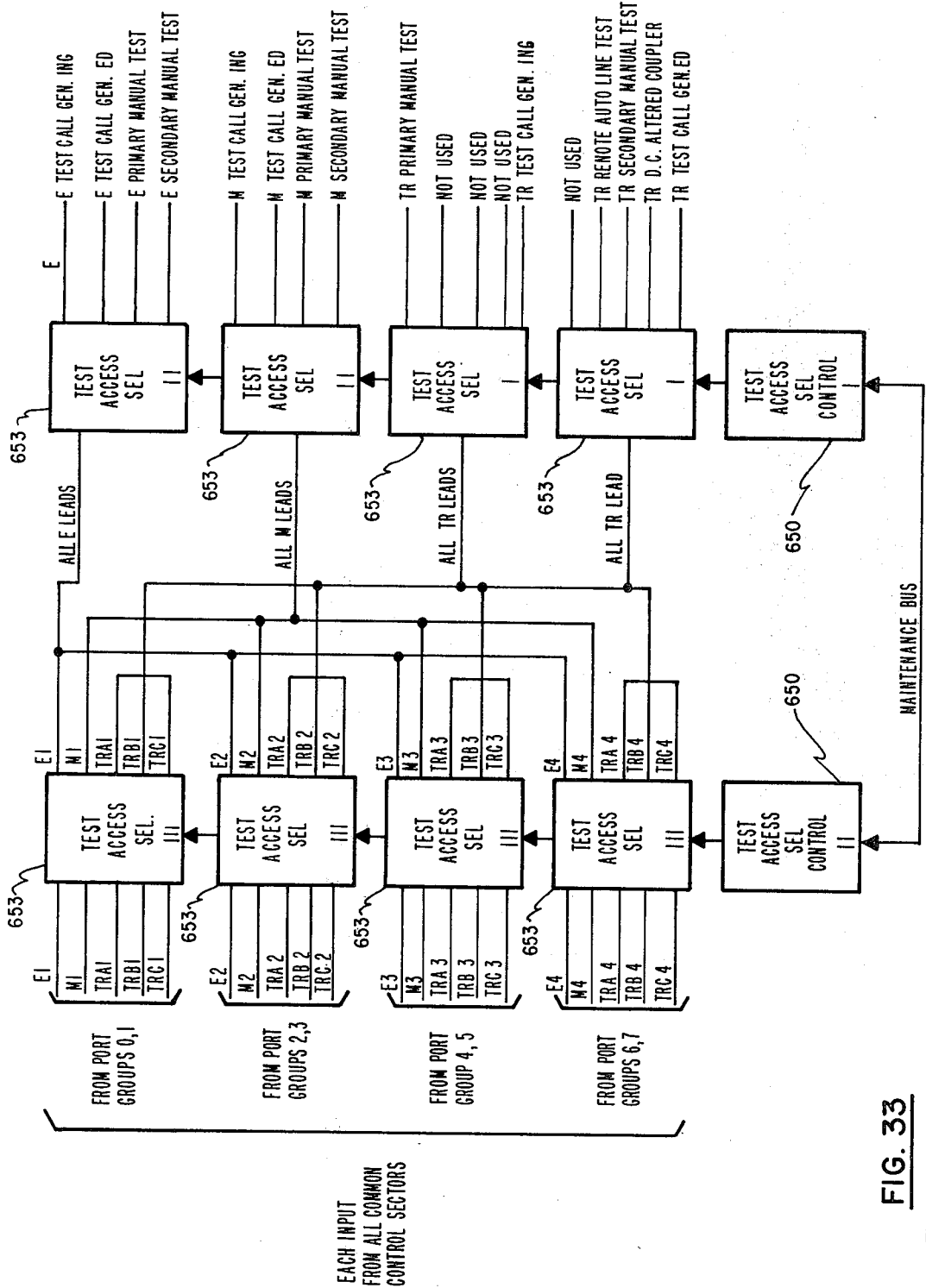
FIG. 33 is a block diagram of the test access relay shown in FIG. 4.
Figure 34:
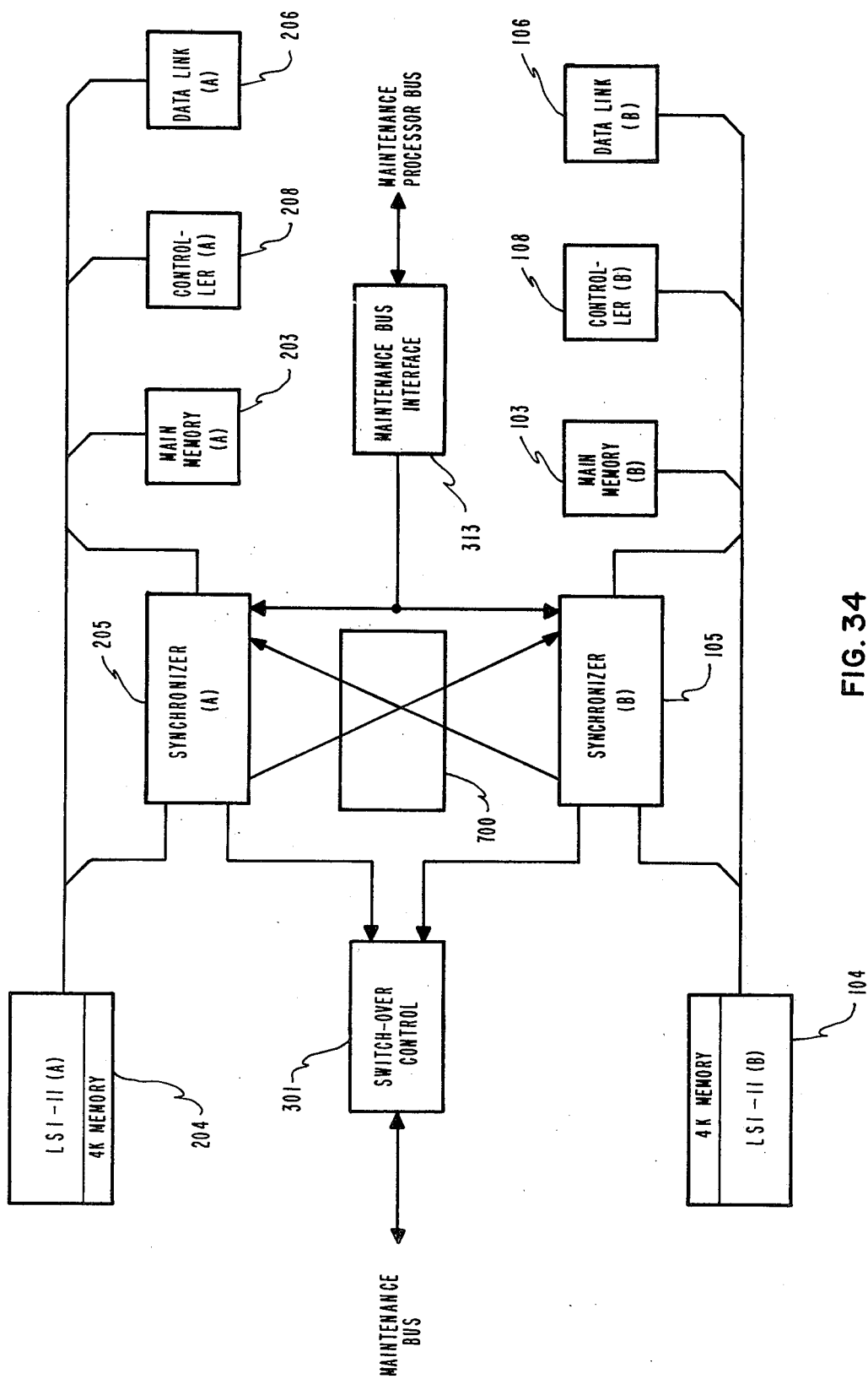
FIG. 34 is a block diagram of the synchronizer circuitry shown in FIG. 4.

The test access relay circuit is an arrangement of relay contacts which are controlled by the maintenance processor for interconnecting test call generator and other testing features of the individual port circuits. A basic block diagram of the test access circuitry is shown in FIG. 33 wherein test access selector controls 650 and 651 are in communication with the maintenance bus and control the interconnections between the line circuits and the test call generator. Each test access selector 653 contains an array of relays for connecting a plurality of telephone lines from the port groups to a common lead.

Synchronization Circuitry

Figure 35:
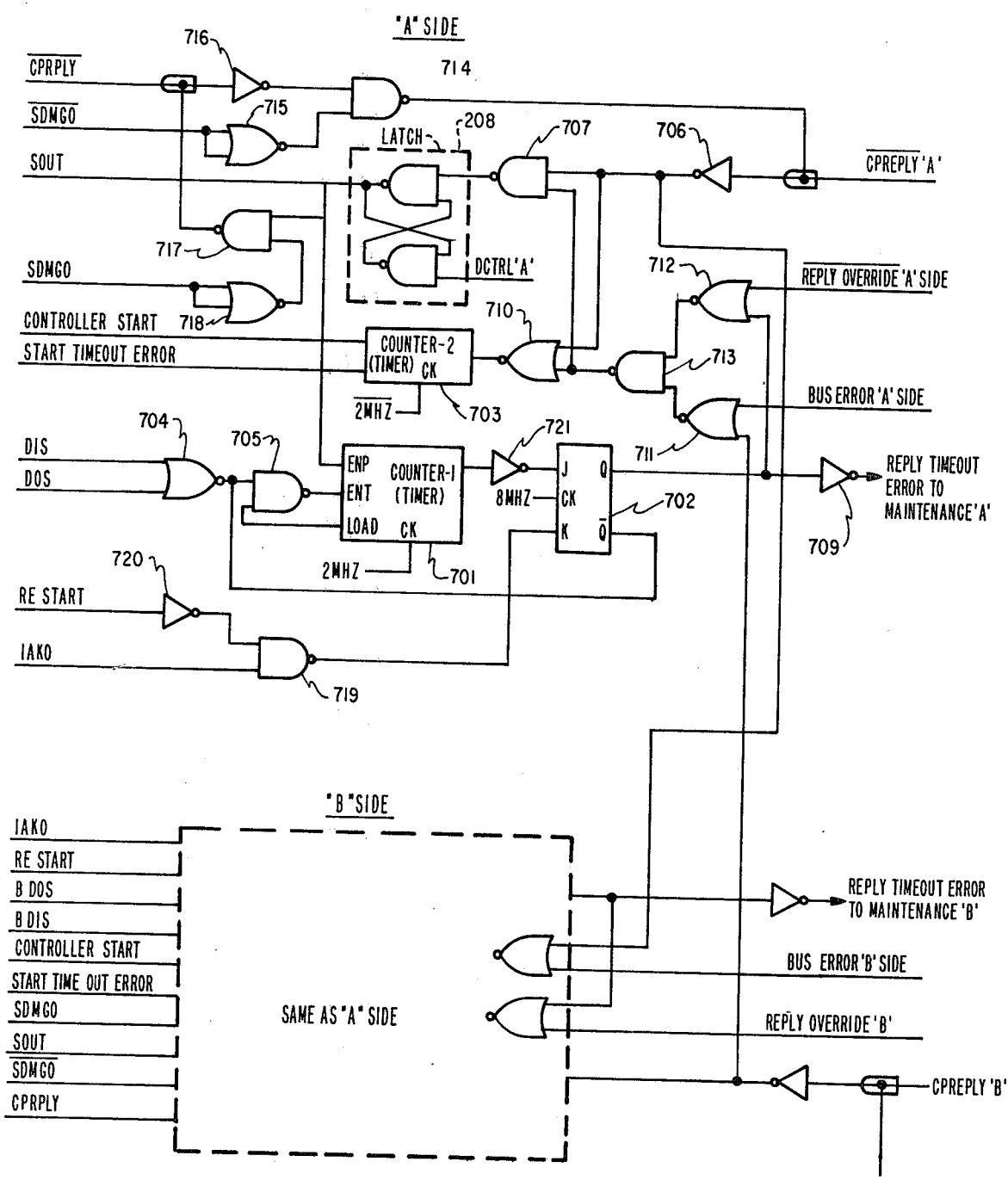
FIG. 35 is a circuit diagram of a portion of the circuitry shown in FIG. 34.
Figure 36:
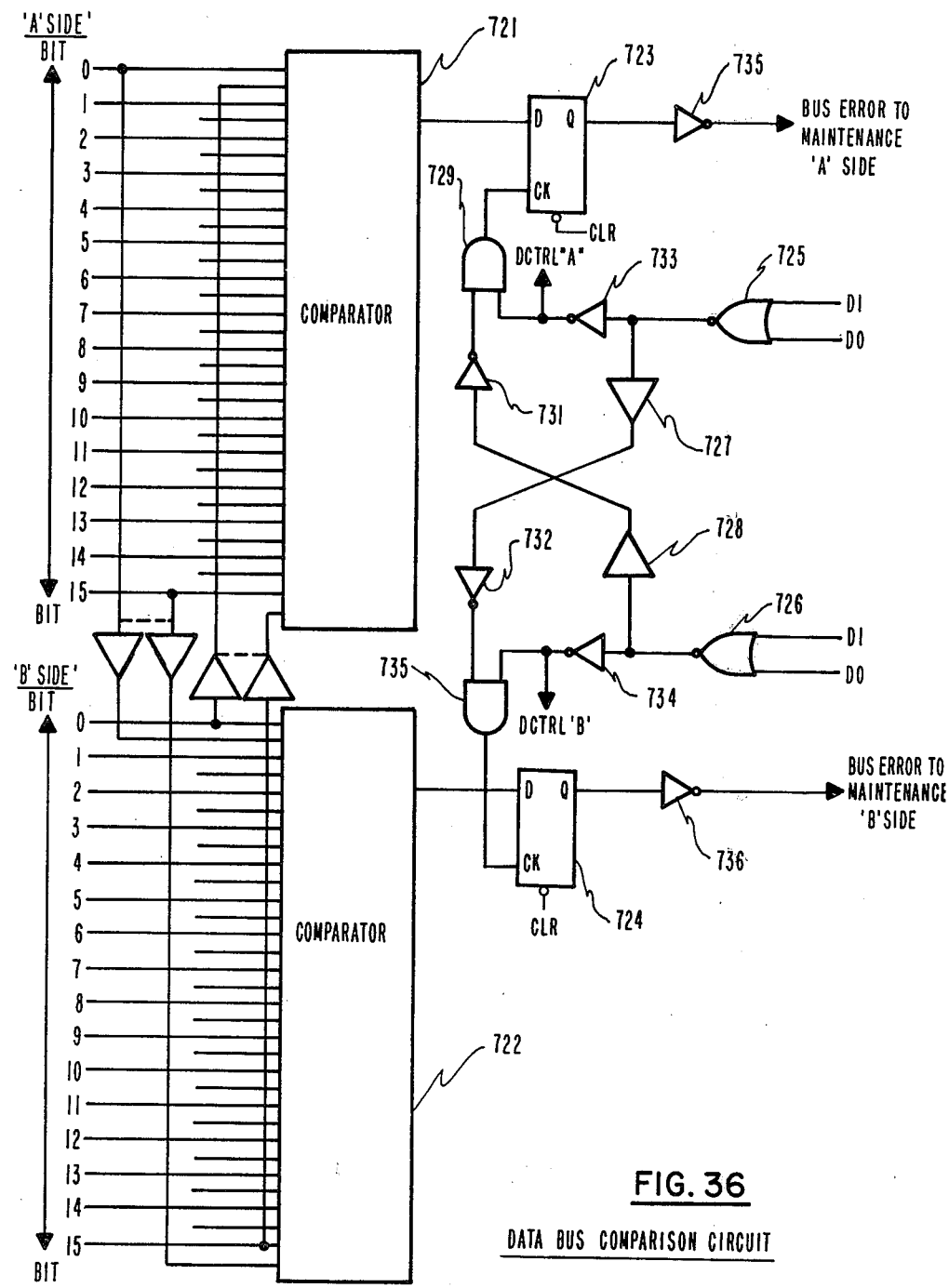
FIG. 36 is a circuit diagram of another portion of the circuitry shown in FIG. 34.

Referring to FIG. 35, a basic block diagram of the synchronizer interconnect structure is shown wherein the two independently operating call processing systems are linked together. Synchronizer 105 provides timing and synchronizing signals for one of the call processing systems, including processor 104, main memory 103, controller 108 and data link 106. Synchronizer 205 provides synchronization and timing signals to similar devices on the other side of the call processing system. The two synchronizers are interfaced by circuitry that communicates directly with call processor units 104 and 204 and the maintenance bus interface 302 through the data links 106 and 206 as shown in FIG. 4.

As previously stated, the synchronizer circuitry performs the function of monitoring reply line synchronization, direct memory access and interrupt request time-out, synchronized memory refresh cycles, data bus sequences for the respective call processing system, and power up conditions.

Respecting reply line synchronization, each device connected to processor 104 gives its reply to synchronizer 105. Similarly, each device connected to processor 204 gives its reply to synchronizer 205. When both sides have replied, the synchronizer circuitry gives a reply to both call processor units to initiate its instruction with respect to the device. When an error condition occurs and no reply is received by either synchronizer within, say 8 microseconds following receipt of reply by the other, the synchronizer circuitry generates a reply on both sides and an error signal is sent to switchover circuitry and the maintenance bus interface. Override signals are also provided for maintenance purposes to allow both sides to function asynchronously.

The synchronizer circuitry also contains bus comparison means to compare data transmitted by the respective call processor units 104 and 204 during each bus cycle. The results of the comparison is used by the synchronizer circuitry for transmitting error signals to switchover controller and maintenance bus interface.

The synchronizer circuitry also contains power signal timing means which times the power up time period.

FIG. 35 depicts a reply line synchronizer logic circuitry. This circuit allows synchronization for every call processor bus cycle at the time a reply is asserted. Every device on the call processor bus sends its reply to the call processor through the synchronizer circuitry. Counter 701 provides the timing means for the reply time-out error signal generated at flip flop 702. When a data-in or data-out signal from the maintenance processor an gate 704 enables a timer 701 provided a previous time-out error has not cleared a flip-flop 702. Should a reply signal not be received by an inverter 706, counter controller 703 generates a controller start signal that enables continued operation of the system without synchronization.

Figure 37:
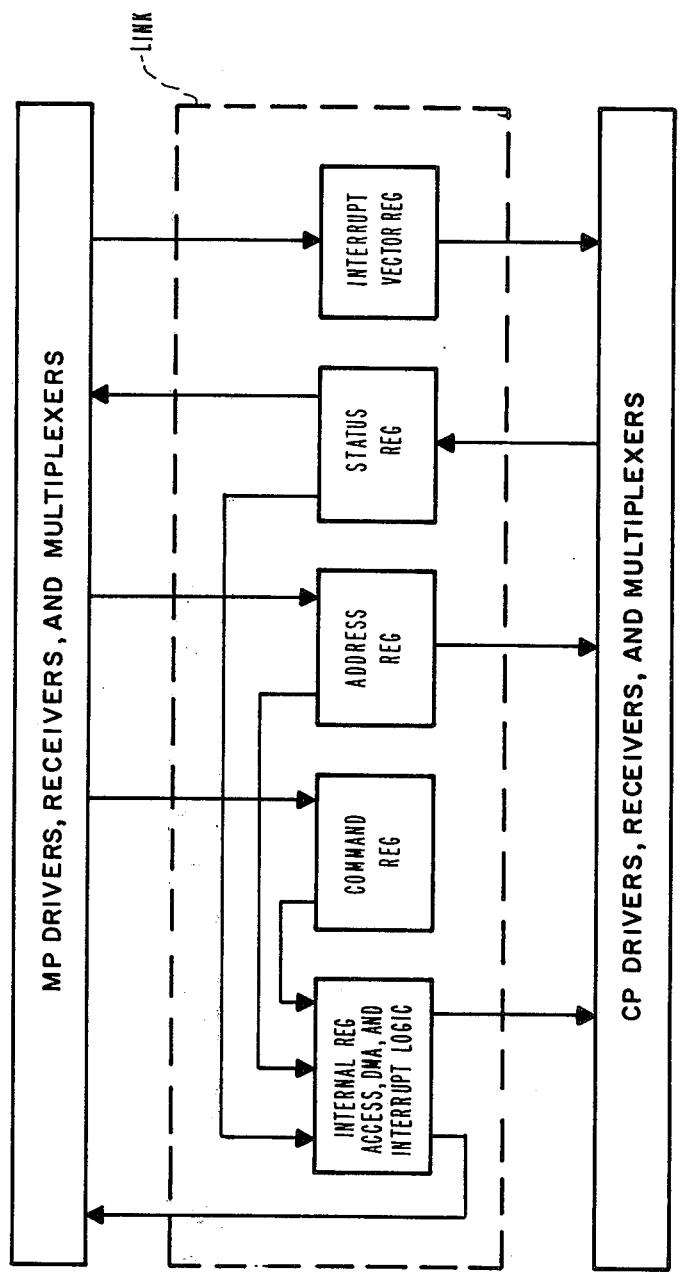
FIG. 37 is a block diagram of the data link shown in FIG. 4.
Figure 38A:
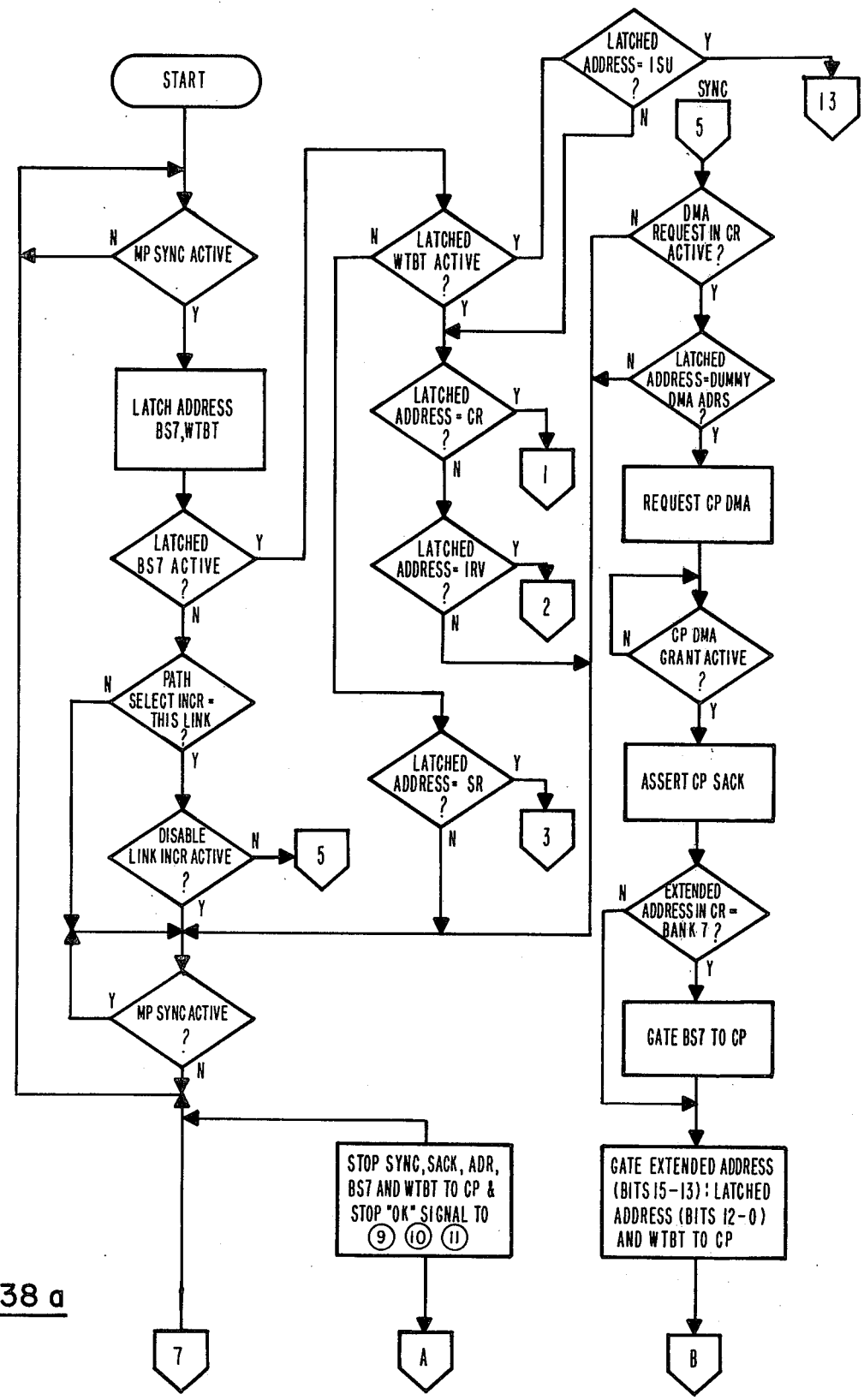
FIGS. 38a through 38h constitute a flow diagram of the operation of the data link shown in FIG. 37.
Figure 38B:
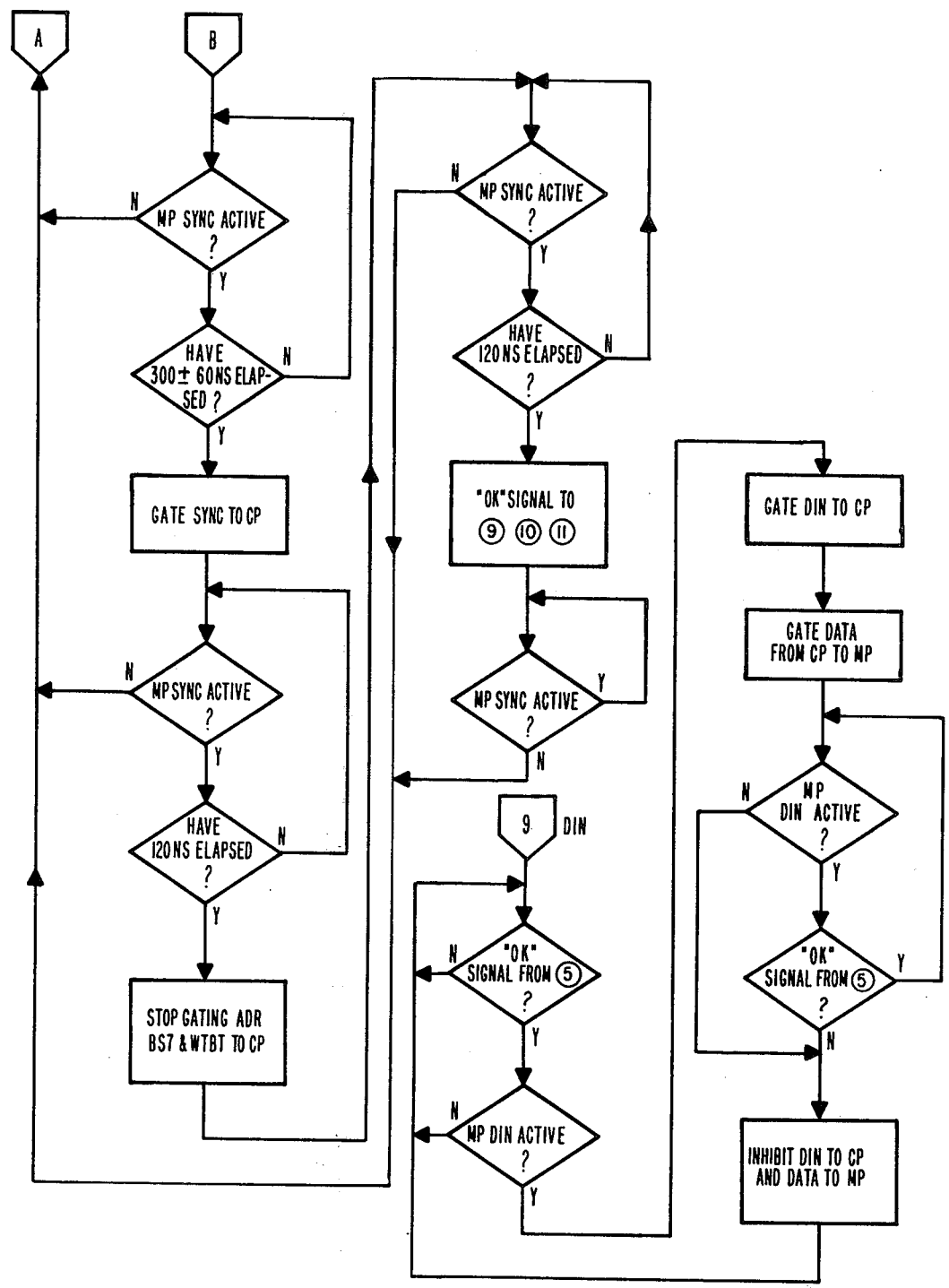
Figure 38C:
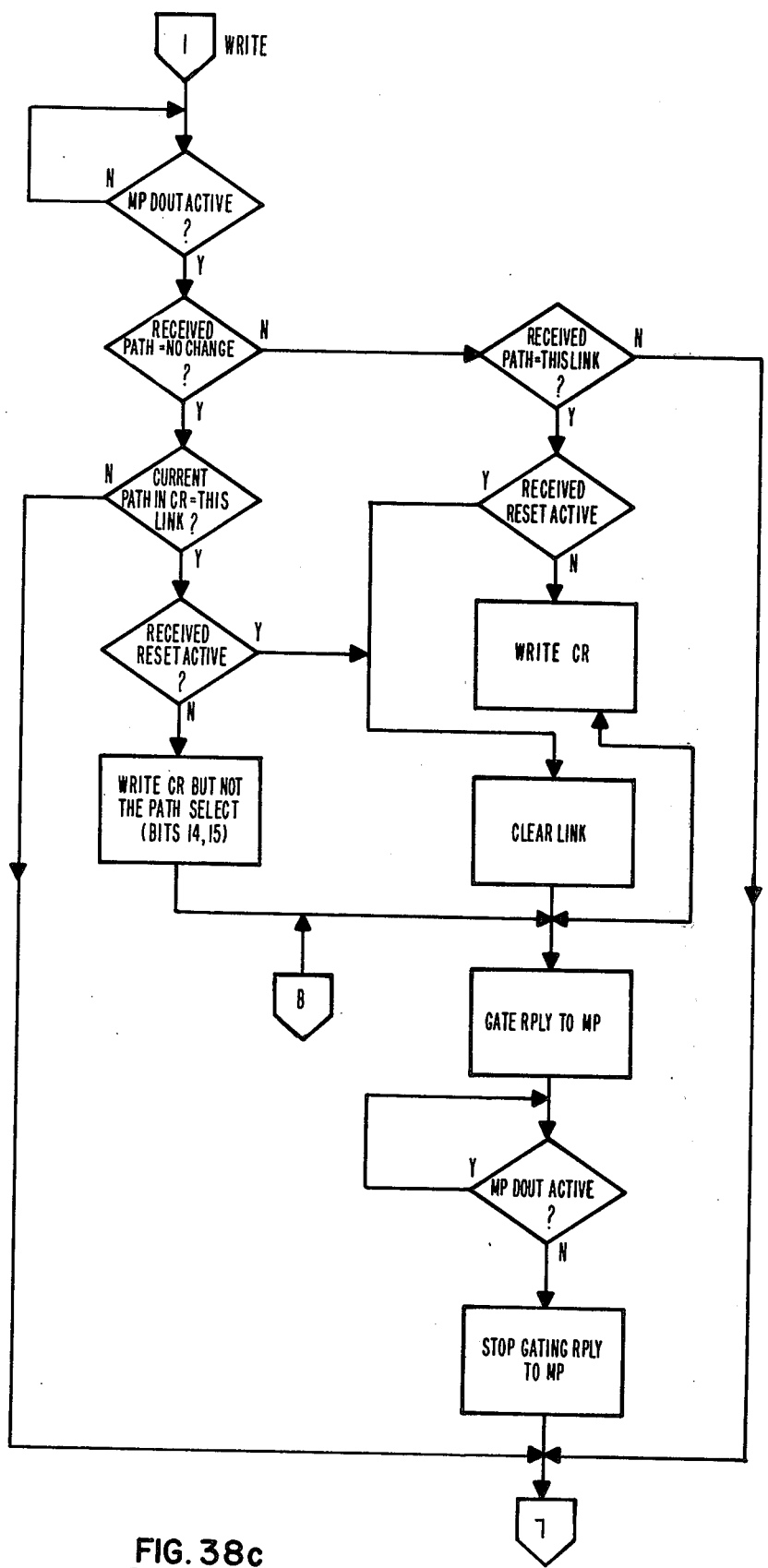
Figure 38:
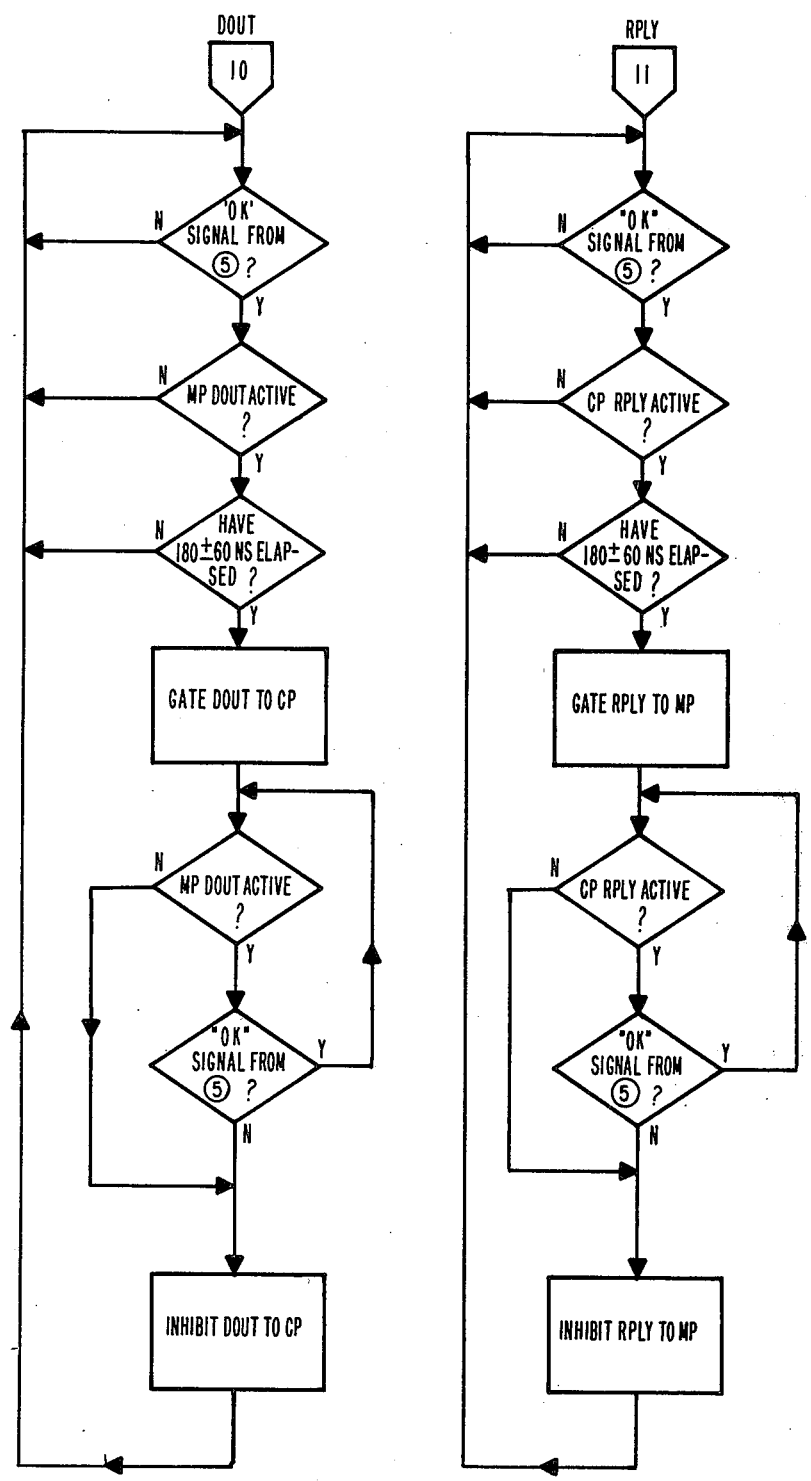
Figure 38:
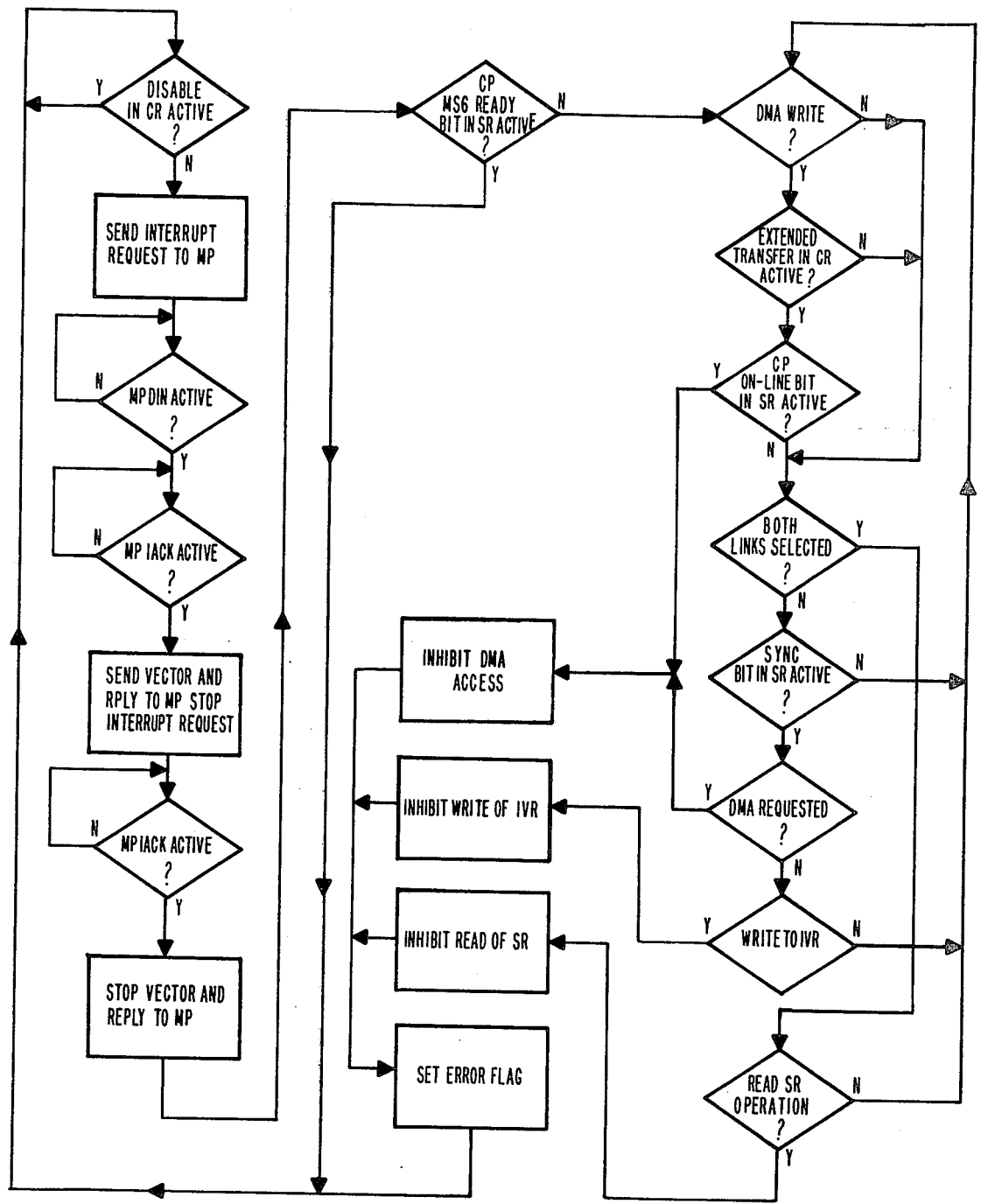
Figure 38H:
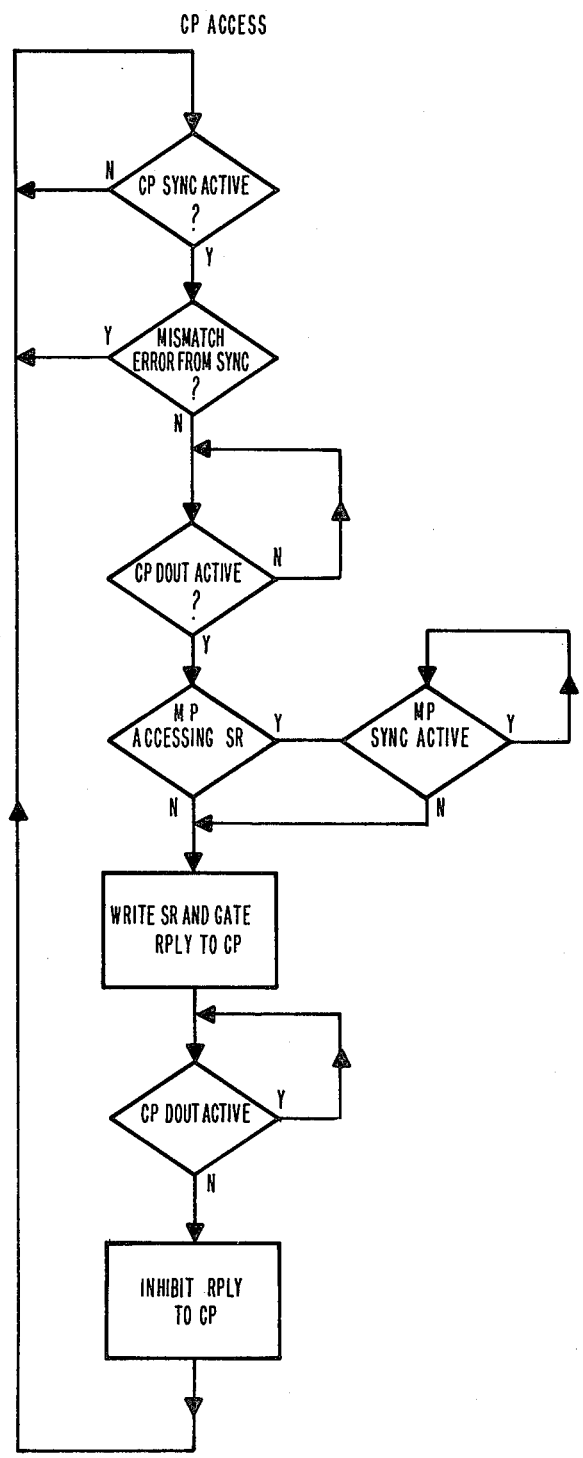

Data bus comparisons are performed during the data portions of bus cycles for each call processor unit. FIG. 37 illustrates a data bus comparison circuit having comparators 721 and 722, each of which compares data from both sides as the data is clocked into flip-flops 723 and 724 at the end of the data-in and data-out signals at gate 725.

Data Link

The data link shown in FIG. 37 provides the maintenance processor access to the main memory and peripheral units of each call processor. The data link electrically connects the I/O bus of the maintenance processor to the I/O bus of each call processor as shown in FIG. 37.

Four modes of communication between the maintenance processor and call processor are provided by the data link. They are:

(1) A direct memory access that allows the maintenance processor to read or write the contents of a word in the call processor's main memory and to access all peripheral units connected to the call processor's I/O bus, (2) An interrupt request that allows that the maintenance processor to generate an interrupt request and corresponding vector for the call processor, (3) A call processor status request that allows the maintenance processor access to various control signals within the call processor system (including synchronizer and switchover control circuits as well as the call processor), and (4) A call processor address request that allows the maintenance processor to read the call processor I/O bus address for a cycle when a data mismatch occurs.

The function of the data links are:

(1) Loading of programs and data base from the maintenance processor to one call processor or both call processors simultaneously, (2) Transferring messages between the maintenance processor and each call processor. The maintenance processor can transmit to one call processor or to both call processors simultaneously and can receive messages from each call processor, (3) Copying programs and tables from one call processor to the other. This function also provides for copying port control and matrix switch data from the on-line to off-line side, (4) Storing a call processor address for the current bus cycle. This permits the error source to be traced if a mismatch occurs, or (5) Storage of error indication flags which can be read by the maintenance processor at any time.

Some of these flags are for data link itself, and the others are for the call processors.

The data link contains four internal registers illustrated in FIGS. 39(a) through 39 (d), as follows:

Command register of FIG. 39(a) may be written by the maintenance processor and contains the necessary information to select either or both call processors, to specify the call processor memory range that the maintenance processor wants to address, and to perform other data link control functions such as DMA request, link test, etc.

The Interrupt Vector Register of FIG. 39(c) has its contents written by the maintenance processor when an interrupt is to be sent to the call processor. The contents are sent to the call processor as the interrupt vector.

The status register of FIG. 39(b) contains information on link status, error flags, call processor requests and responses to specific maintenance processor messages. The status register is directly addressable by the maintenance processor and can be read at any time. The call processor sets certain bits in the status register to cause an interrupt to the maintenance processor, as described later.

The Address Register (AR) of FIG. 39(d) stores the maintenance processor address on all maintenance processor bus cycles. The address is decoded with the command register to determine if the internal data link registers are being addressed or if the address indicates a DMA transfer.

The command register of FIG. 39(a) contains a number of bit positions. Bits 15 and 14 are set by the maintenance processor and decoded by the call processor to allow access to either system A or system B, respectively. The data link may be reset by setting bit 12 (or disabled by setting bit 11.) A direct memory access is made by setting bit 10 and the data link may be placed in a test mode by setting bit 8. Bits 4, 5 and 6 are used by the maintenance processor for extended addressing the call processor memory and bit 3 is used to disable interrupts with respect to the maintenance processor. A similar command register is provided for each call processing system.

The status registers in each call processor contain a number of status bits indicating bit positions for, say, message ready, synchronization error, on-line/off-line, illegal command error and path select. Two bits define the data transfer path between maintenance processor and call processor which paths are no path, path 1, path 2, or both paths. The illegal command bit will be set when the maintenance processor attempts to read or write or request an interrupt to only one call processor while both are in synchronization.

The interrupt vector register and address register are provided for addressing and transferring data between the call processor and maintenance processor.

A detailed flow diagram, having descriptive notations, for the operation of the data link is shown in FIGS. 38(a) through 38(h). All combinatorial logic and gating are accomplished by conventional circuit means.

Figure 40B:
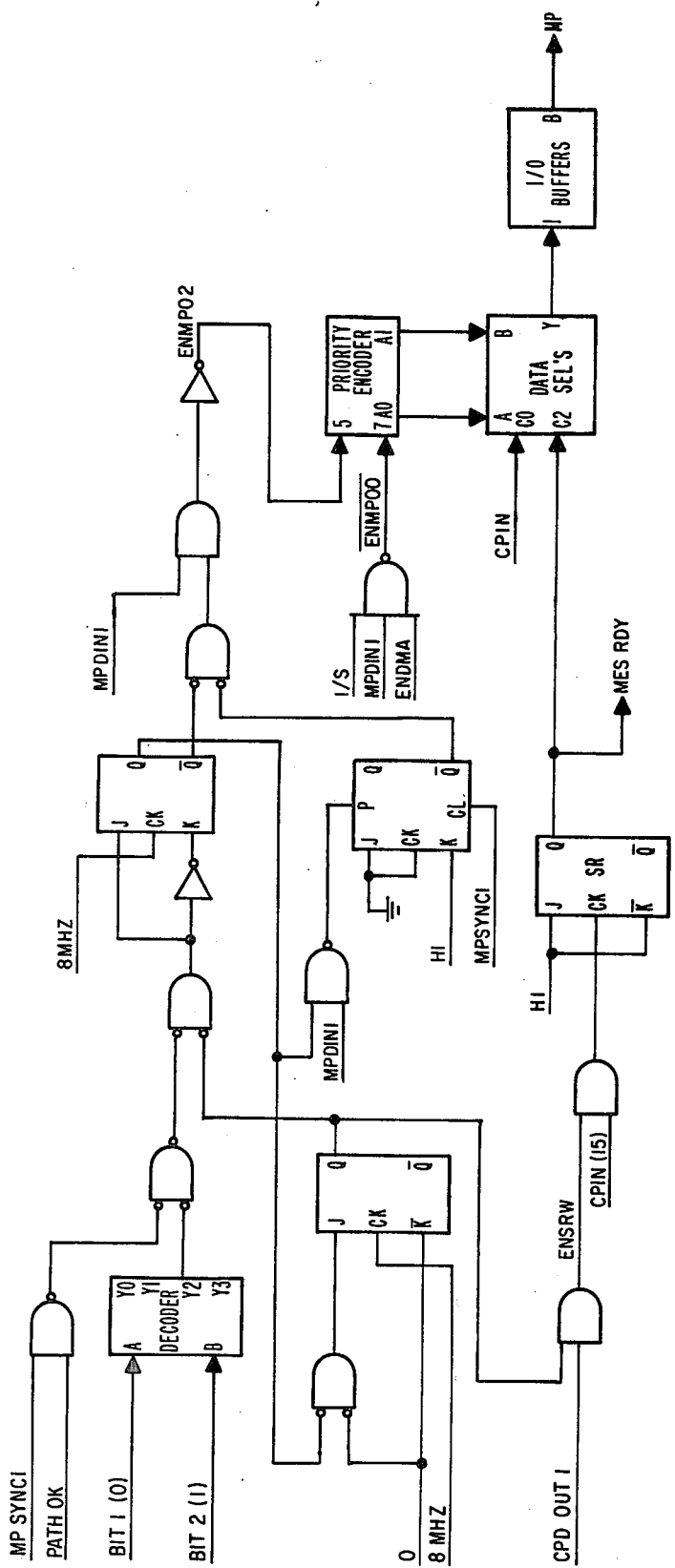
Figure 40A:
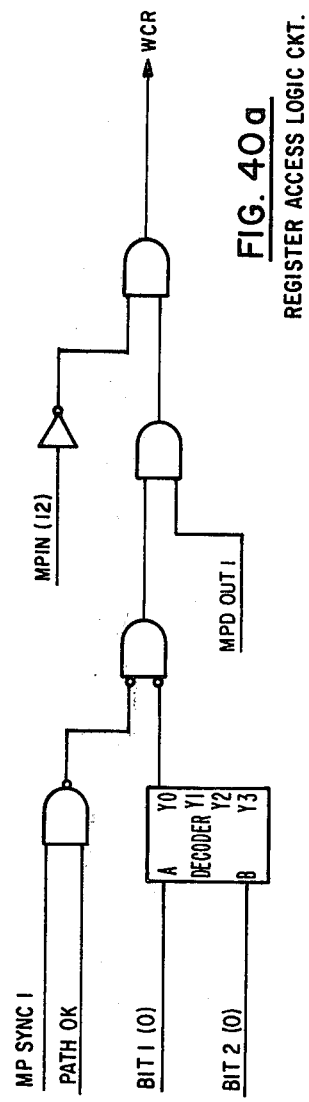
Figure 40C:
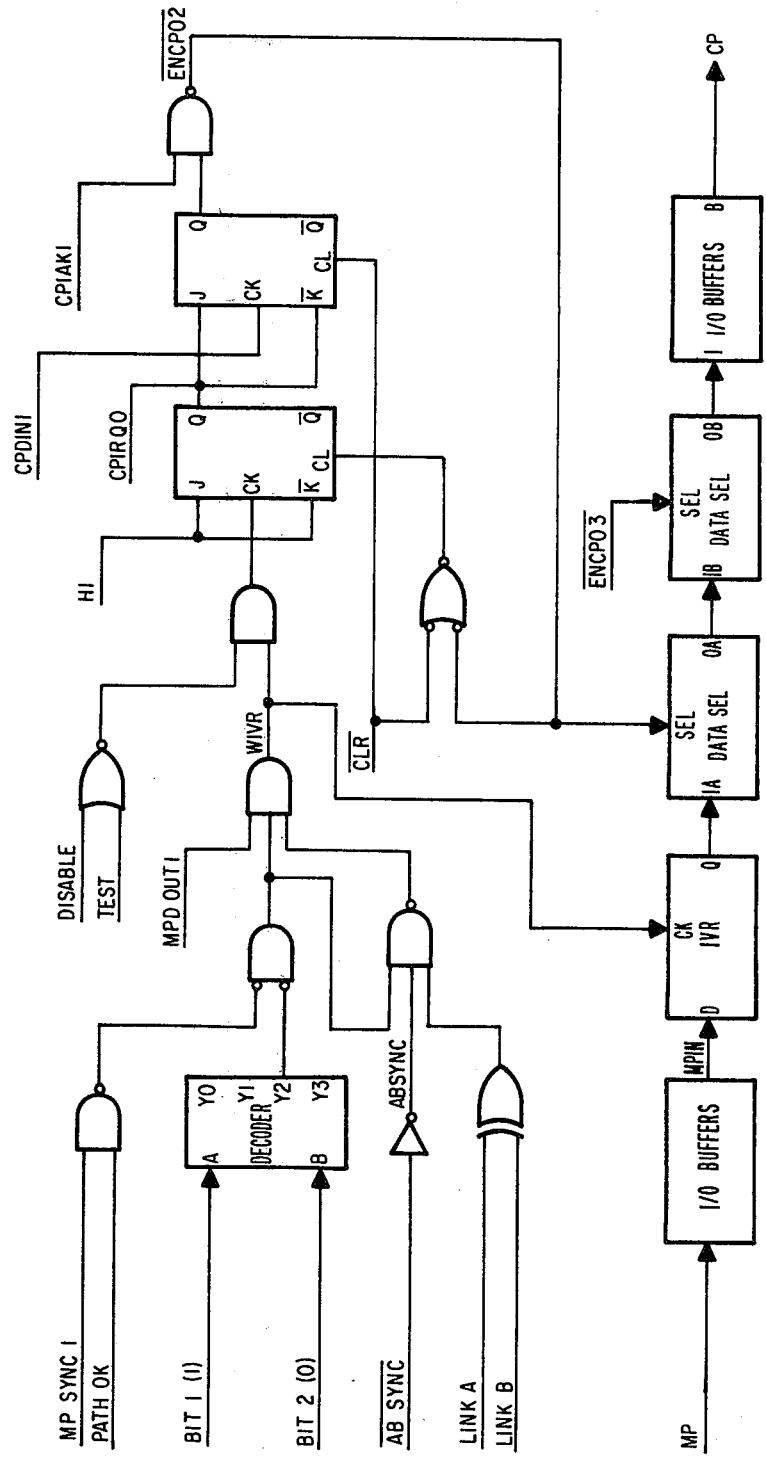
Figure 40D:
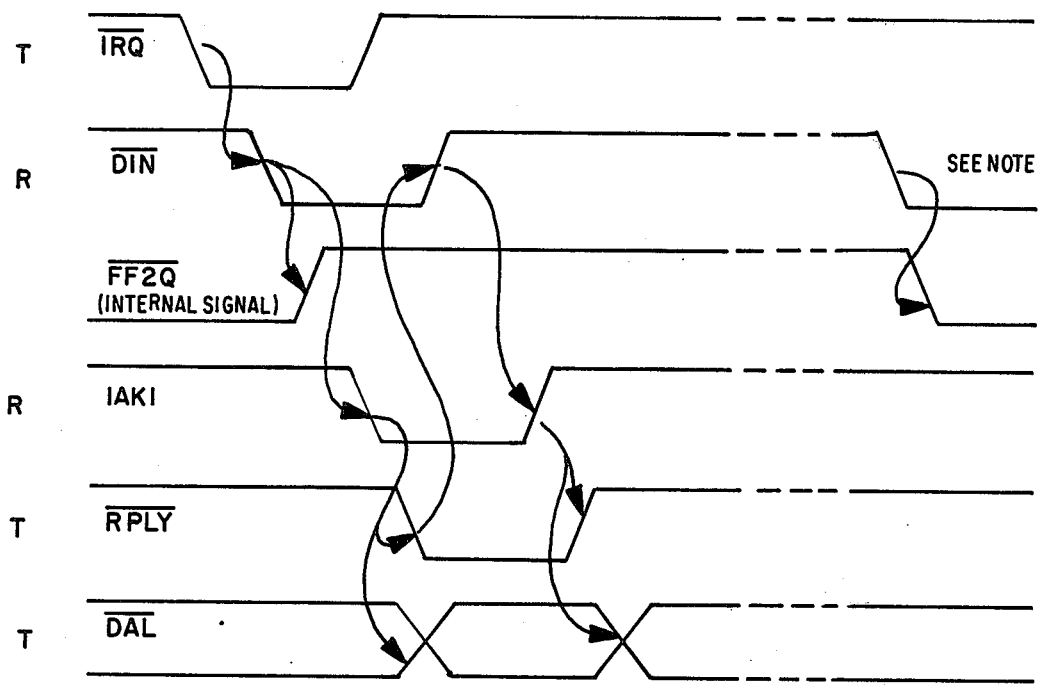
Figure 40E:
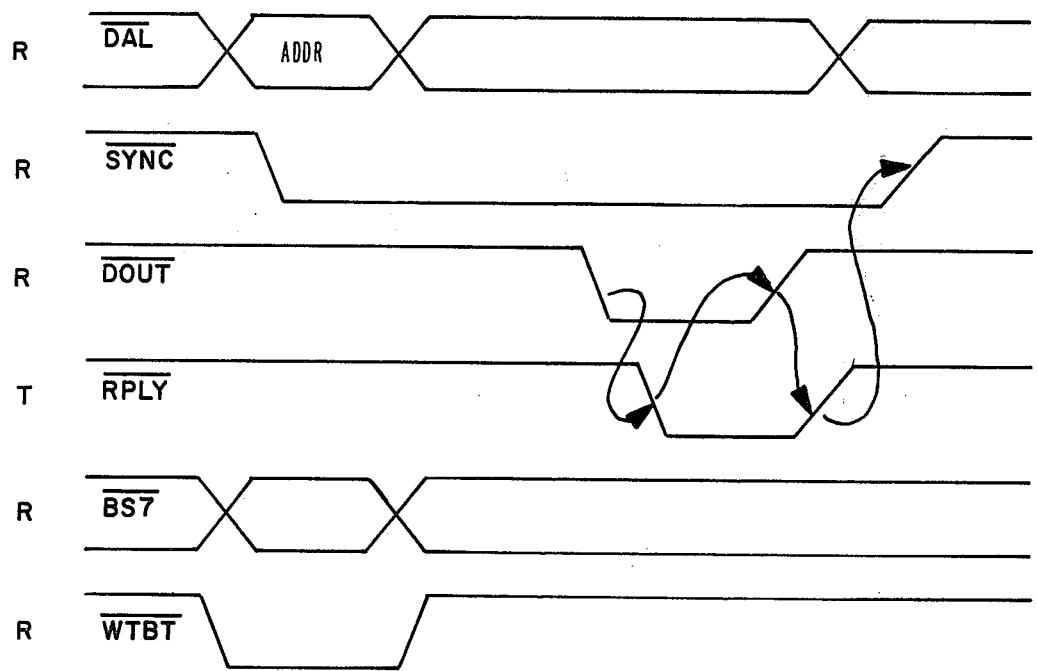

Register access and decoding logic of within the data links is shown in FIGS. 40(a) through 40(c) with corresponding timing diagrams shown in FIGS. 40(d) through 40(f). No bus data translations, as were performed by the maintenance bus interface circuitry, are performed between the data link and maintenance processor. Respective signal definitions for the register access logic are depicted in the timing diagrams.

Maintenance Processor Software Functional Description of Operating System

The operating system of the maintenance processor is a collection of related clusters which control the scheduling and execution of all processing tasks of the maintenance, diagnostic, and administrative program functions. It also supervises and coordinates all input/output operations and responds to error conditions.

The scheduling and dispatching of processing tasks is done by an Executive Cluster under the direction of a Task Schedule Table (TST) to be subsequently more fully explained. This table is a resource of a Task Control Utilities Cluster and is accessed through those utilities. Each entry of the TST represents a unique memory resident task of the program overlay area and reflects all necessary information and parameters for program scheduling and execution control. The Executive Routine scans the TST and gives control to the highest priority task which is active and ready for execution. The Executive Cluster, as well as the other component clusters of the operating system operate with interrupts disabled. The interrupts will become enabled whenever the Executive Routine transfers control to a task.

Input/output requests by processing tasks will be communicated to the operating system via an IOT instruction (input/output trap). The instruction will result in a program generated interrupt, which will be vectored to the appropriate I/O routine of the I/O Request and Driver Cluster. The processing task which requested service will be suspended from execution until the service has been completed. This suspension may lead to the temporary activation of a separate task operating in a background program mode. All I/O operations requested by a task will be performed under interrupt control. The routines of the I/O Cluster always return control to the Executive Cluster.

Modules of the Message Handler Cluster are invoked in response to message interrupts generated by system errors. An Error Module will record the occurrence of its designated error(s) in an Error Table and then perform one or more of the following operations:

(a) Interrogate specific devices on the Maintenance Bus Interface for more specific or additional error conditions or status;
  (b) Cause the scheduling or first or second Level Diagnostic tasks;
  (c) Return control to the Executive Routine.

The Message Handler, as any other component of the operating system runs with Interrupts disabled, and upon completion returns control to the Executive Module. A memory mode of the maintenance process operating routines is shown in the table of FIG. 41.

The Task Control Utilities Cluster contains routines which are used to access the Task Schedule Table (TST) illustrated in FIG. 42 and to update that table. The contents and state of the TST determines what programs are run, and also how they are run, e.g., dual program, single program, timeouts, temporary high priority mode, etc. Routines of the Task Control Utilities can be called by processing tasks and the operating system. This allows tasks to cause the scheduling or activation of other tasks and the loading of tasks into the overlay area.

During operation, an interrupt may be generated by a device indicating an error or the completion of an operation, or it may be generated programatically by a task requesting I/O service. The occurrence and acknowledgement of an Interrupt will enable the execution of the appropriate "handler" routine of the I/O Request and Drive Cluster or the Message Handler Cluster.

A message handler routine, as well as an I/O driver routine, may call upon routines of the Task Control Utilities Cluster to perform any of the following:
 (a) Save the contents of the call processor registers in the stack associated with the interrupted task,
 (b) Suspend (lock out) the operation of the interrupted tasks,
 (c) Set time out flags or the high priority flag for specific processing tasks,
 (d) Cause the scheduling or de-scheduling of a task.

The Task Control Utilities respond to these requests by updating the Task Schedule Table after which they return control to the calling message handler or I/O routines.

The message handlers and I/O routines always return control to the Executive Cluster upon completion of their processing. The Executive routine scans the Task Schedule Table and gives control to the appropriate task with interrupts enabled.

The processing tasks of the maintenance processor fall into two categories; those which can be run in a dual program environment, and those which are always run in the single program mode. The tasks which will operate in the background mode are Administrative Functions and Routine Testing tasks. This means that Routine Testing will take place "concurrently" with the running of administrative changes. All other processing tasks will be performed in a single program mode; this will include Startup, Diagnostics and Recovery.

The scheduling and execution of single mode tasks will have priority over dual mode tasks; this means that a requirement to run a single mode task will preempt any on-going dual mode tasks. Similarly, different priority levels may be assigned to single mode tasks so that some single mode tasks may preempt other single mode tasks. (The assignment of priorities is not dynamic, it is always fixed.)

The interrupt and task priority features permit the immediate termination of a task upon occurrence of a condition requiring the activation of a task with higher priority, depending upon the priority conditions established in the Task Schedule Table. Such an immediate termination may be undesirable at certain times, such as when an administrative task is in the midst of performing a call processing table update. In such a case, the lower priority task will be given sufficient time to complete the critical operation. Any processing task can place itself into a privileged state in which it can not be preemptable by higher priority tasks. Entry into and exit from this state is effected by executing specific IOT instructions which are serviced by modules of the Task Control Utilities cluster. A task is in the privileged state if the high priority flag of its control word in the Task Schedule Table is set to 1.

The maximum time duration of the privileged state is limited by a software "watchdog" timer of the operating system. If the privileged state is not terminated normally with the appropriate IOT, then a watchdog timeout interrupt terminates the state in addition to noting the time-out error.

ERROR HANDLER CLUSTER

The Error Handler Cluster is the diagnostic control system which responds to all error detection signal of the fault detection hardware and software of the dual operating system. It records the sensor input and attempts to activate appropriate fault isolation softward, including the first and second Level Diagnostics Controllers. It also controls the redundant call processing configuration by making switchover and recovery decisions.

The data inputs sources for the Error Handler Cluster are diagnostic circuits and detectors reported via the maintenance bus, and results of software tests in the call processors and the maintenance processor as previously stated. The detection of an error by a sensor is always reported to the maintenance processor and will eventually result in an interrupt in the maintenance processor. The maintenance processor may be notified of the occurrence of an error over three paths, the maintenance bus interface, the data link and via maintenance processor traps. The occurrence of error interrupts generated by any of these sources will result in the activation of the appropriate handler routine of the Error Handler Cluster. The general functions of a handler routine include:
 1. Record the error and associated system status information in the Diagnostic Control Data Base;
 2. Mask further interrupts from the reporting error detector at the MBI level;
 3. Generate a short report on the system console.

On completion of their processing, the error handlers always terminate in the diagnostic control of first and second diagnostic routines to be described in more detail. Its function is to evaluate the reported error event(s) relative to the existing system configuration and state as more specifically shown in annotated flow diagrams of FIG. 47(a) through 47(d). This evaluation may result in the activation of diagnostic programs or in the transition from one system "state" to another.

The transition between states may also be effected by operator commands entered on the system console. Such commands include requests for CP startup, recovery, taking a side out of service, etc.

In FIG. 48(a) through 48(i), status words are shown with their respective legends for indicating the state of the system. The error handler cluster transfers control to the appropriate first or second level diagnostic routines together with the state of the system.

FIRST LEVEL DIAGNOSTICS

First Level Diagnostics (FLD) has as its primary function the isolation to one side or the other of faults occurring in the A/B redundant portions of the system. Its secondary functions are to calculate preliminary disability factors for either side and furnish error data and test results in Second Level Diagnostics for use in isolation to the card level. FLD is usually entered as a result of an A/B mismatch error. The mismatch error may in some cases be accompanied, preceded, or followed by other error signals which are side-specific in varying degrees. Some of these other error signals are completely deterministic as the faulty side; others provide only a certain degree of probability that a given side is faulty and must be verified by diagnostic routines.

Aside from the basic system architecture itself, two principal constraints dictate the approach to First Level Diagnostics. The first of these is the time factor, which is critical due to the need for a prompt switchover to minimize degradation of traffic handling when the on-line side fails. The second constraint is the necessity to do testing on the on-line side as well as the off-line, while causing little or no disruption to the traffic being handled. Both of these factors limit the types of tests which may be run and the exhaustiveness of these tests. In addition, the time factor requires that all or most of FLD be memory-resident, since reading it in from the disks would be much too slow.

When FLD is given control, the Diagnostic Controller/Message Handler (DC/MH) will already have read out some error data and will have done some masking of error signals. In general, it is desired to have DC/MH read out only sufficient error data to allow the proper diagnostics to be scheduled and to insure that data on the first error to occur is captured as promptly as possible. This "first error" data (primarily with regard to mismatches) is of vital importance to FLD, and may be obscured when additional mismatches occur. FLD can then be read out any additional error data it may require.

In contrast, DC/MH will perform maximum masking before control is given to FLD, masking at the MBI level all error signals except those which are side-specific. FLD, which has more detailed knowledge of what masking it requires may then unmask selected error signals. This assures a more orderly entry into FLD than might otherwise occur, since FLD must run with interrupts enabled and could be deluged with interrupts as mismatches propagate through the system.

General Structure of Frist Level Diagnostics

FLD is essentially a table-driven structure. From the minimal error data provided to it by DC/MH it determines an initial error classification. Based on this it will decide what additional error data readout is required and which error detectors, if any, should be unmasked. In general, subsequent mismatches will not be of interest, since most of FLD is keyed to the first mismatch to occur.

A detailed error analysis will be performed, resulting in the generation of two basic vectors. The "error type" vector will give information as to the type of card or subsection of the system in which a fault is indicated, and/or the type of error detector which was triggered. In the case of mismatches it would show the source of the first mismatch to occur. The "error location" vector will localize the fault, where possible, to one out of several similar circuit cards or functional subsections of the system. The first vector, for instance, might indicate a mismatch in the transmission bit stream on a port group highway; the second vector would indicate a particular Matrix Switch in a particular Common Control Sector.

The "error type" vector will be used to find the proper entry in a table where each entry corresponds to an ordered subset of the full set of FLD tests. Where appropriate, the tests are localized to a specific area of the system by reference to the "error location" vector, from which any required addressing information may be derived. From a system standpoint, FLD may be viewed as consisting of a sequence of four functionally distinct types of test activity, which will be referred to as Phases 0, 1, 2 and 3.

Phase 0 is actually performed in hardware, and consists of the side determinent error detectors mentioned previously plus any tests which are invoked by hardware (such as the Call Processor sanity test) which lead to a hardware switchover decision. FLD software thus is concerned mainly with Phases 1, 2 and 3.

Phase 1 will run with call processing suspended. The types of tests run by FLD during Phase 1 will vary depending on the nature of the error indication, but would mainly consist of write/read of test data patterns in registers and memories accessible from the CP bus.

Figure 43:
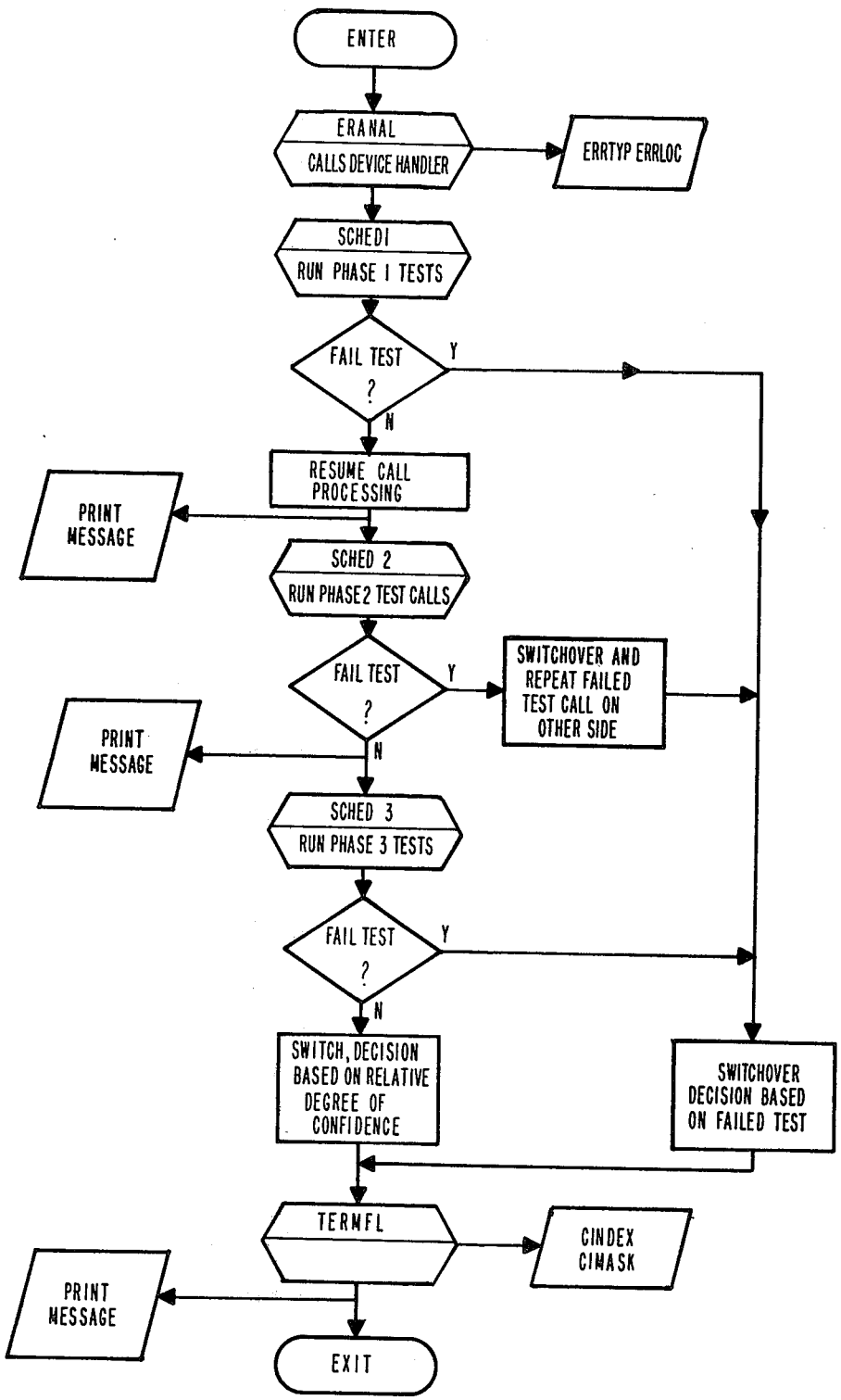
FIG. 43 is a flow diagram of the first level diagnostic routines performed in accordance with this invention.

The flow diagrams of FIG. 43 describe FLD operations. For maximum efficiency, Phase 1 tests will be designed to complement the side-specific checks which are incorporated in hardware, and will avoid unnecessary duplication. For example, since parity checks provide a rather thorough monitor of data integrity in call processor memory and the part control store, FLD Phase 1 tests of these areas would concentrate on finding addressing faults.

If Phase 1 tests are unable to resolve the fault, call processing will be reactivated and Phase 2 testing will begin. Phase 2 will consist primarily of patterns of test calls directed to the suspected areas of the system.

In Phase 3, the off-line side is taken out of service and can be subjected to much more exhaustive tests than were possible in Phase 1, since time is no longer a major factor. At this point, an immediate switchover is no longer possible, since it must be preceded by a recovery; in addition, if it turns out that the on-line side is the faulty one, recovery implies the likelihood of crosswriting erroneous data from the bad side to the good— thus the need for a high level of confidence in the on-line side before entering phase 3.

The tests performed in Phase 3 will be similar, or perhaps in some cases identical, to tests performed in Second Level Diagnostics, particularly those used in "Restore Verification".

If the error has not been resolved at the conclusion of Phase 3, a recovery will be performed and a switchover decision will be made. In most cases, the on-line side will be favored and no switchover will occur; however, in a few cases, when the original error indication was from an area of the system which can be more thoroughly checked by tests done on the off-line side, a higher degree of confidence may exist in the off-line side and a switchover will take place so that each side will be subjected to the tests which were previously done on the opposite side.

Referring specifically to FIG. 43, the actions of FLD are keyed mainly to the first error vector, FRSTER, which is a snapshot of the addressable First Fault Register of the maintenance bus interface. This allows tests to be directed to the area of the system where the fault actually occurred and avoids the confusion which might otherwise arise, since an initial error may propagate rapidly through the system and cause many mismatches to appear. The Error Analysis module uses FRSTER to determine which of several device handlers to call. There exists a handler for each type of diagnostic device which reports faults affecting the redundant portion of the system. When the appropriate handler is called, it reads out the available error data and constructs two basic error vectors, ERRTYP and ERRLOC. ERRTYP defines the type of error and will be used by the various schedulers to select the sets of tests to be run. ERRLOC defines the location, or area of the system, in which the tests are to be run. When control is given to SCHED1, it uses ERRTYP and ERRLOC to select and control the execution of an ordered subset of the full set of Phase 1 test routines.

If Phase 1 tests fail to resolve the fault, call processing is allowed to resume and SCHED2 is called. SCHED2, again based on ERRTYP and ERRLOC, selects and causes the execution of a series of test calls which constitute Phase 2 testing.

If the problem is still unresolved at the conclusion of Phase 2, SCHED3 is called to run exhaustive tests on the off-line side, which is taken out of service. If there is still no definite resolution of the fault at the end of Phase 3, a switchover decision will be based on the relative degree of confidence in each of the two sides. This will be a function of the type of error indicated and the relative effectiveness of Phase 2 and Phase 3 tests in finding that type of error, since Phase 2 tests mainly the on-line and Phase 3 only the off-line side.

A First Level Diagnostics Termination module (TERMFL) summarizes and formats test results for use by DIAGC and Second Level Diagnostics and performs any necessary clean-up.

SECOND LEVEL DIAGNOSTIC PROGRAMS

The function of second level diagnostic cluster is to:
1. Perform integrity checking on craftsperson manual diagnostic requests,
2. Perform fault data analysis upon the occurrence of a system detected failure for the purpose of performing automatic fault isolation, and
3. Set up all tables necessary for the execution of the appropriate second level diagnostic programs.

This cluster, the operation of which is illustrated by flow diagrams of FIGS. 44(b) through 44(h), is a collection of modules whose purpose is to perform all table initialiation, parameter checking and fault data analysis in order to provide the following diagnostic features:
1. Fault Isolation
2. Repair Verification
3. Restore Verification
4. Selective Diagnostics The cluster is resident on the disk and is brought into Maintenance Processor memory and executed as an overlay task by the Diagnostic Controller of the Executive Routine described herein. Second level diagnostic development is segregated into two system areas; the redundant area or common control and the nonredundant area of I/O. For faults occurring in the redundant area, the faulty common control side must be first determined. This function is performed by First Level Diagnostics as previously described. Once the fault has been isolated to a common control side, and that side has been switched off-line, the Diagnostic Controller will schedule second level diagnostics to isolate the faulty circuits.

In addition to furnishing the appropriate fault data, the Diagnostic Controller of the Error Handler Cluster will also provide to the second level diagnostic controller the following:
1. Manual/Automatic (fault isolation) diagnostic indicator.
2. System status including system configuration, MBI mask and "ON" condition information.
3. Diagnostic area indicator (at present this will indicate Common Control and I/O).

Figure 44A:
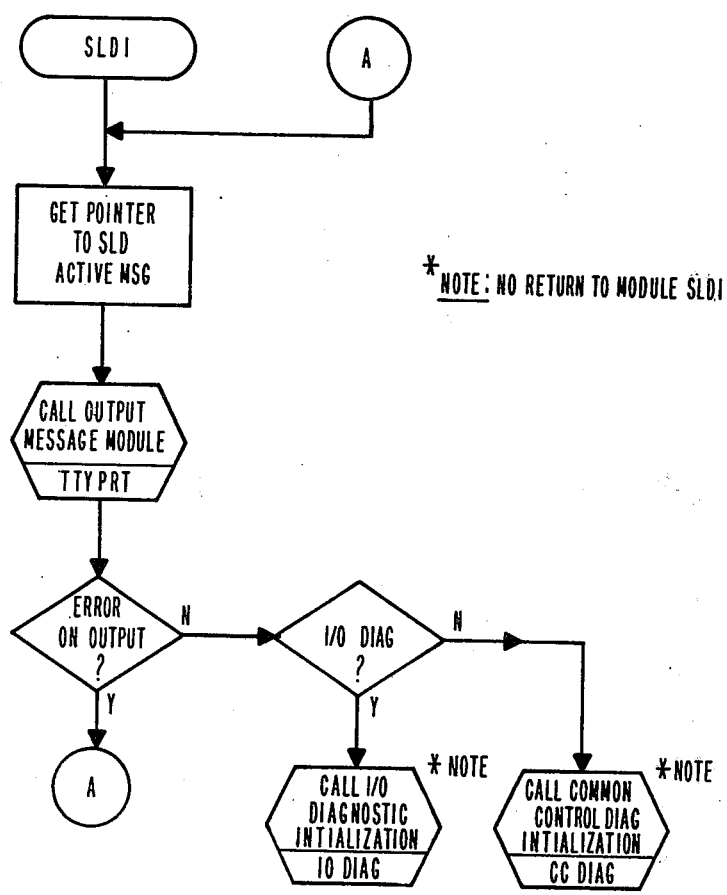
Figure 44C:
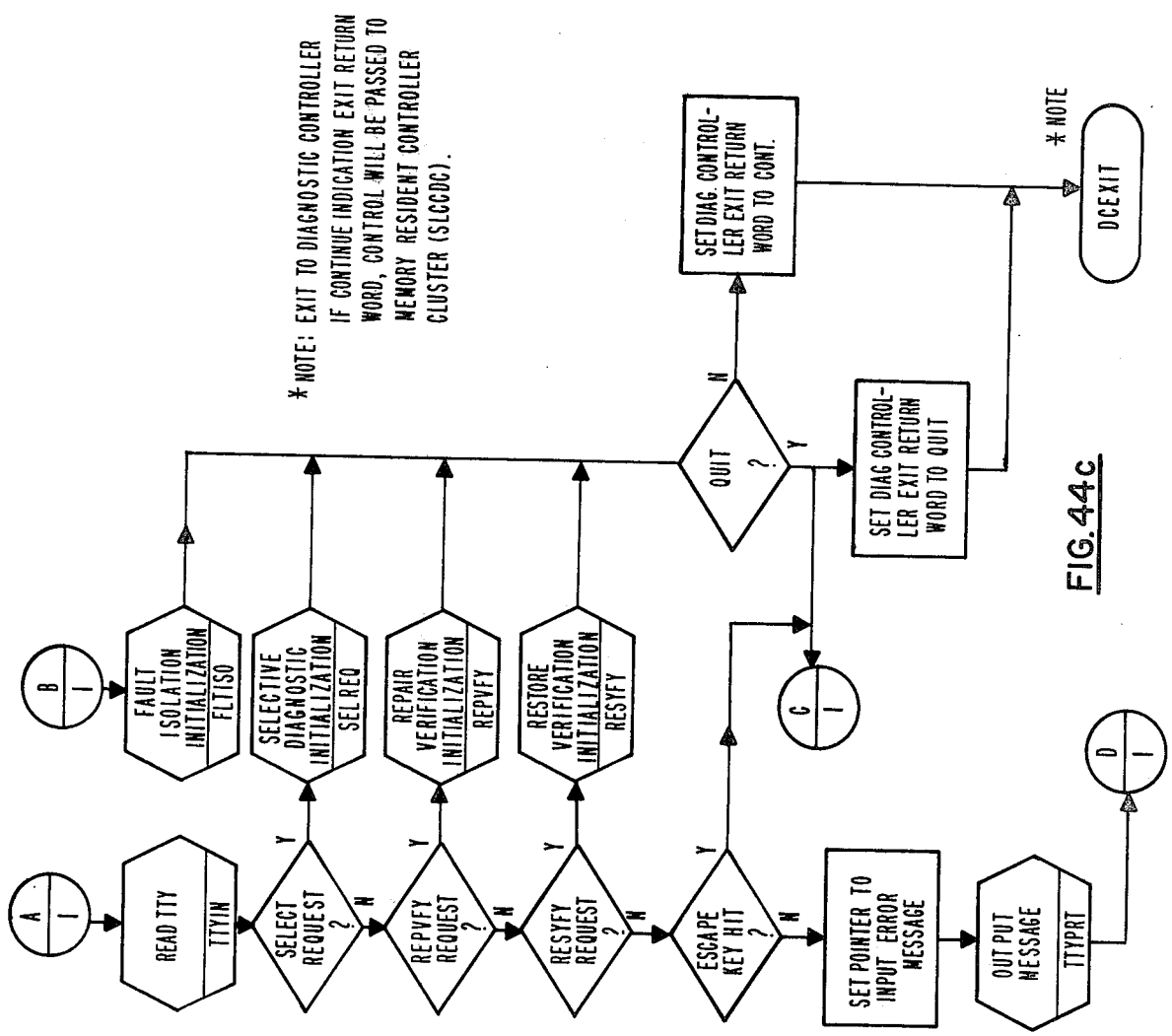
Figure 44B:
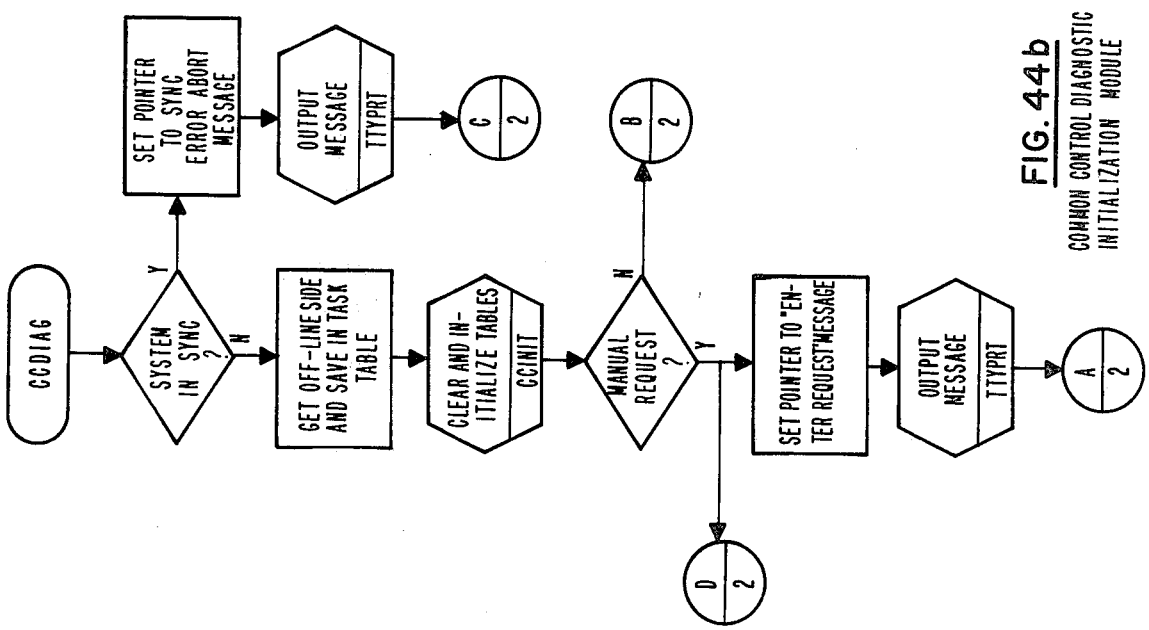

FIG. 44(a), 44(b), and 44(c) illustrates the logic flow of the second level initialization cluster. The steps may be executed by a conventional microprocessor having addressable memory for accessing registers of the monitoring circuits. Once all of the tables necessary for diagnostic execution have been set up, control is passed to the appropriate Second Level Diagnostic Controller Cluster, described in FIG. 44, for execution of the necessary diagnostic activities. The resulting fault data will then be used by the corresponding Second Level Diagnostic Termination Cluster for analysis and generation of a circuit replacement list for fault repair.

Figure 45A:
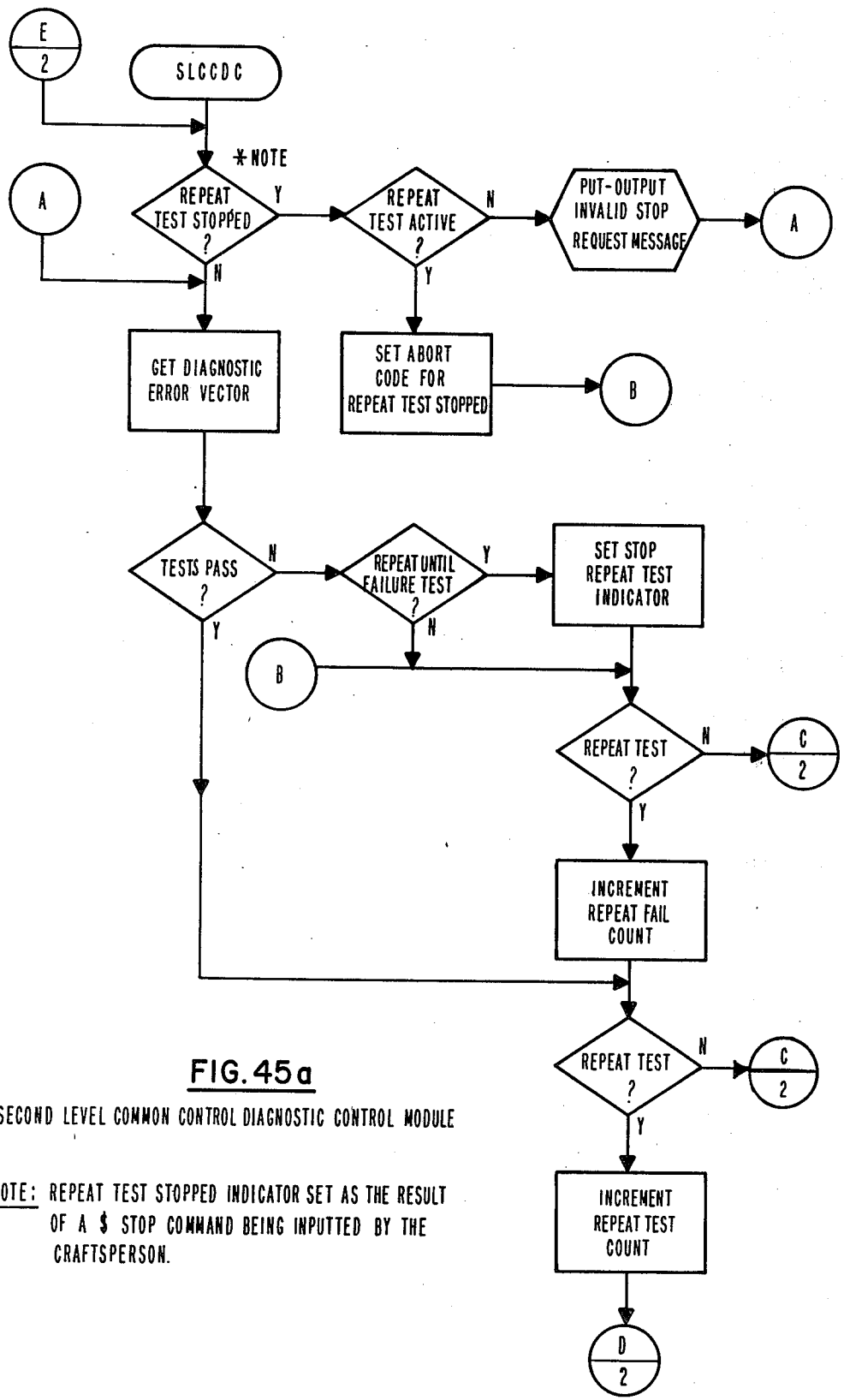

A Second Level Common Control Diagonstic Controller Cluster illustrated in FIGS. 45(a) through 45(c) (SLCCDC) is the diagnostic control system which performs fault isolation on off-line system. In conjunction with the Second Level Diagnostic Initialization Cluster (SLDI) shown in FIGS. 44(b) through 44(h), and the Second Level Common Control Diagnostic Termination Cluster (SLCCDT) it forms that portion of the Second Level Diagnostic Program associated with all redundant hardware in the common control system.

Functional Description

Referring to FIGS. 45(a), 45(b), and 45(c) a diagrammatic flow chart is shown wherein the SLCCDC cluster controls the execution of all second level diagnostic test clusters for the redundant hardware. Control is passed from the SLDI cluster which performs all table initalization necessary for execution. It may be called upon to perform any of the following tasks:
1. Isolation [FIG. 44(e)] Automatic fault isolation of a system detected error to a minimum set of replaceable circuit boards.
2. Repair Verification [FIG. 44(d)] Craftsperson request to verify the repair of faults found during isolation.
3. Restore Verification [FIG. 44(f)] Craftsperson request to insure the integrity of the MOS common control side prior to initiating recovery.
4. Selective Diagnostic [FIG. 44(g)] Craftsperson request to execute selective diagnostic tests on the MOS side. Tests may be run as single pass, repeat stop (repeat until failure) or repeat forever.

The SLCCDC cluster of FIGS. 45(a) through 45(c), however, is not cognizant of the task being performed except for the case of selective repeat testing, as it merely allows for the sequential exeuction of diagnostic test clusters as indicated in its tables. The execution of the various diagnostic test clusters is an information gathering process. Upon completion of all activities indicated in its tables, control is passed to the SLCCDT cluster which performs fault analysis, outputs appropriate messages, and returns control to the Diagnostic Controller of the Error Handler Cluster of the Executive Routing.

A Second Level Diagnostic Overlay Table, Table SDT is used to store general information about the task being performed as well as providing long term storage for information associated with system errors. This data is initially used to accomplish fault isolation and later to perform repair verification of an isolated fault. The SDT table is also used to maintain test control and record keeping.

A Second Level Common Control Diagnostic Termination Cluster (SLCCDT) shown structually in FIG. 46(a), performs SLD test cluster diagnostic analysis and provides resulting information as output messages to the craftsperson. In conjuction with the Second Level Diagnostic Initialization Cluster (SLDI) and Second Level Common Control Diagnostic Controller Cluster (SLCCDC) it forms that portion of the Second Level Diagnostic Program associated with the generation of test results and fault printout messages.

Figure 46:
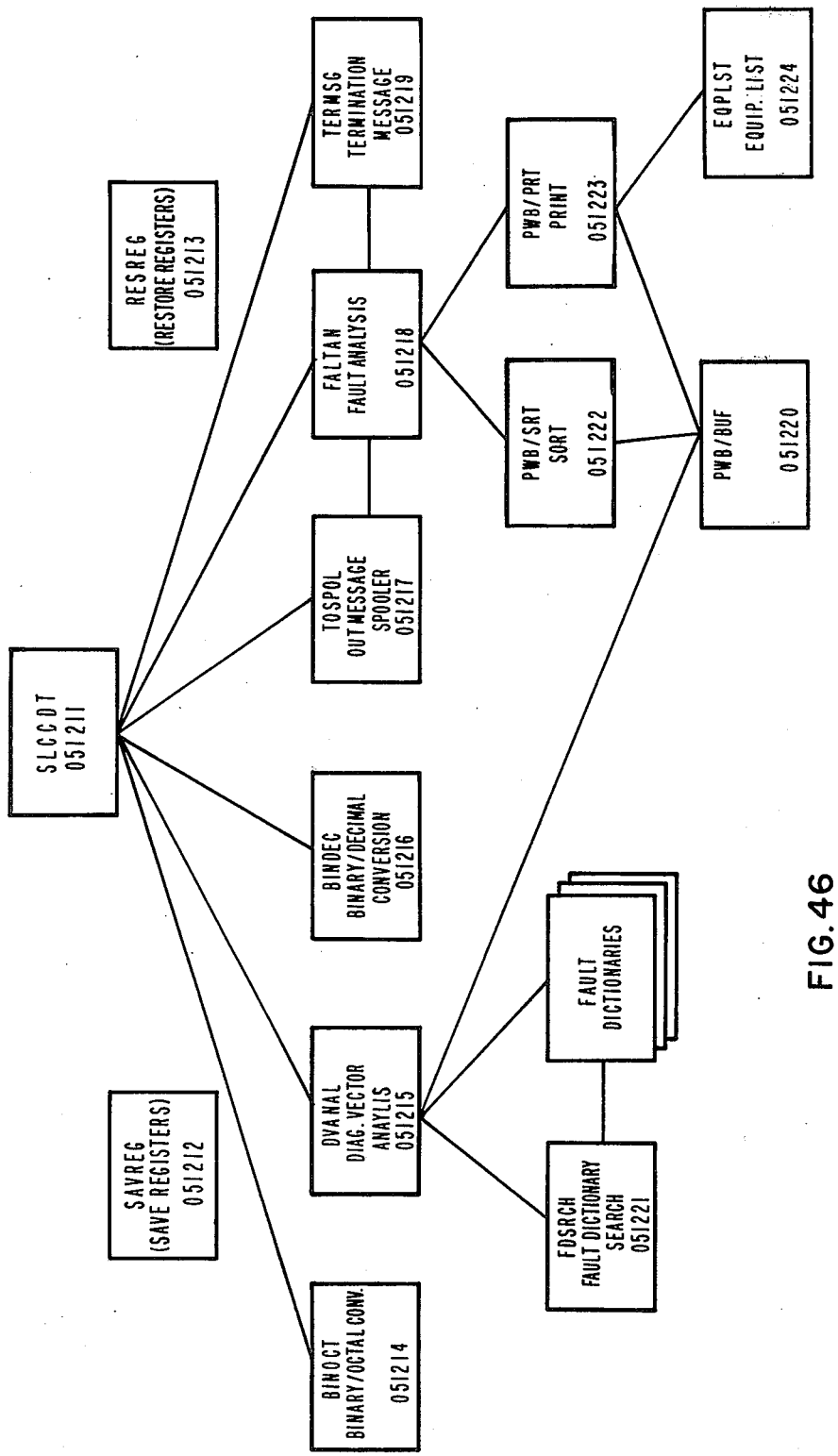
FIG. 46 is a structural diagram of the second level diagnostic routines shown in FIGS. 44 and 45.
Figure 47A:
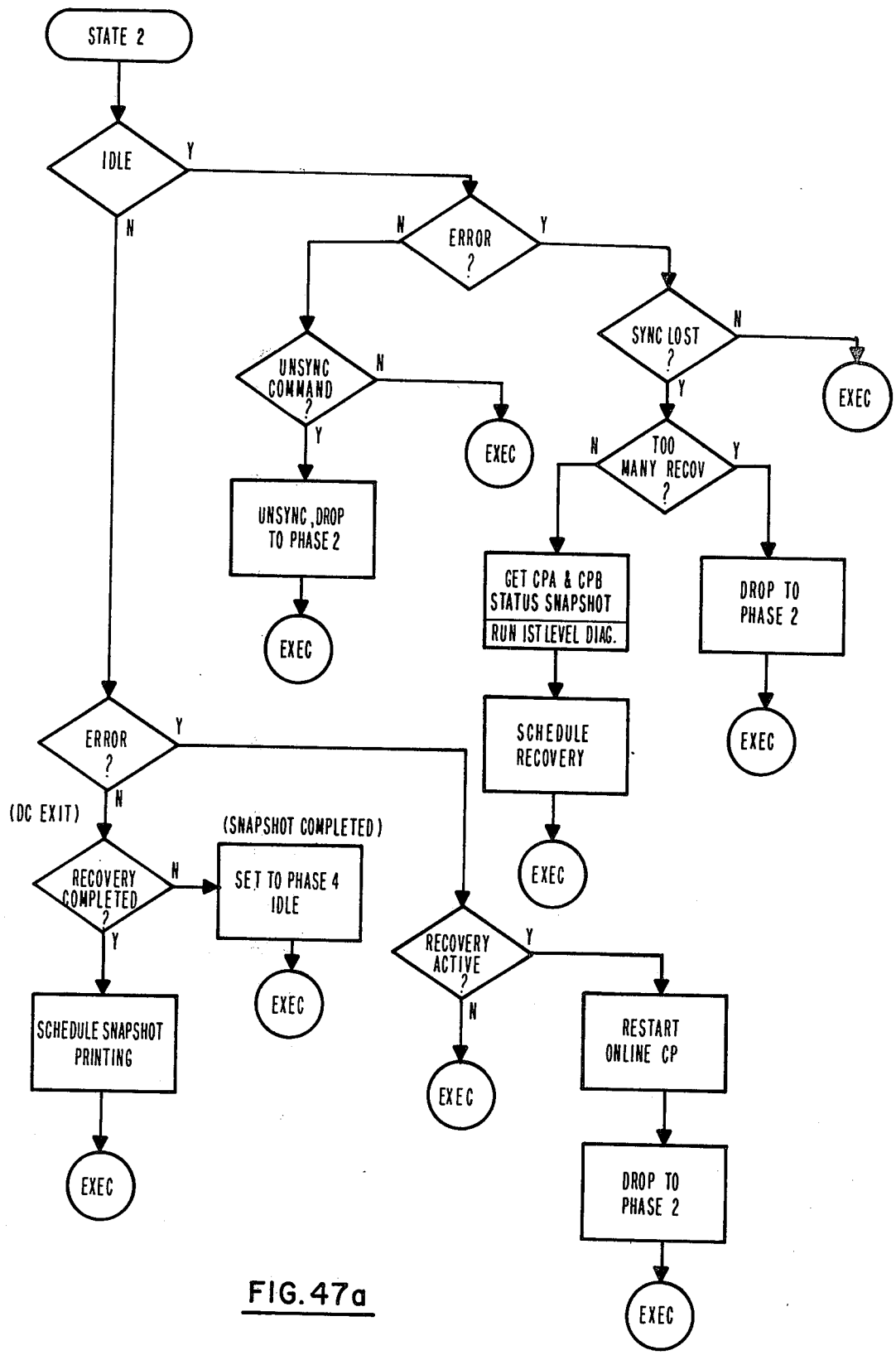
Figure 47B:
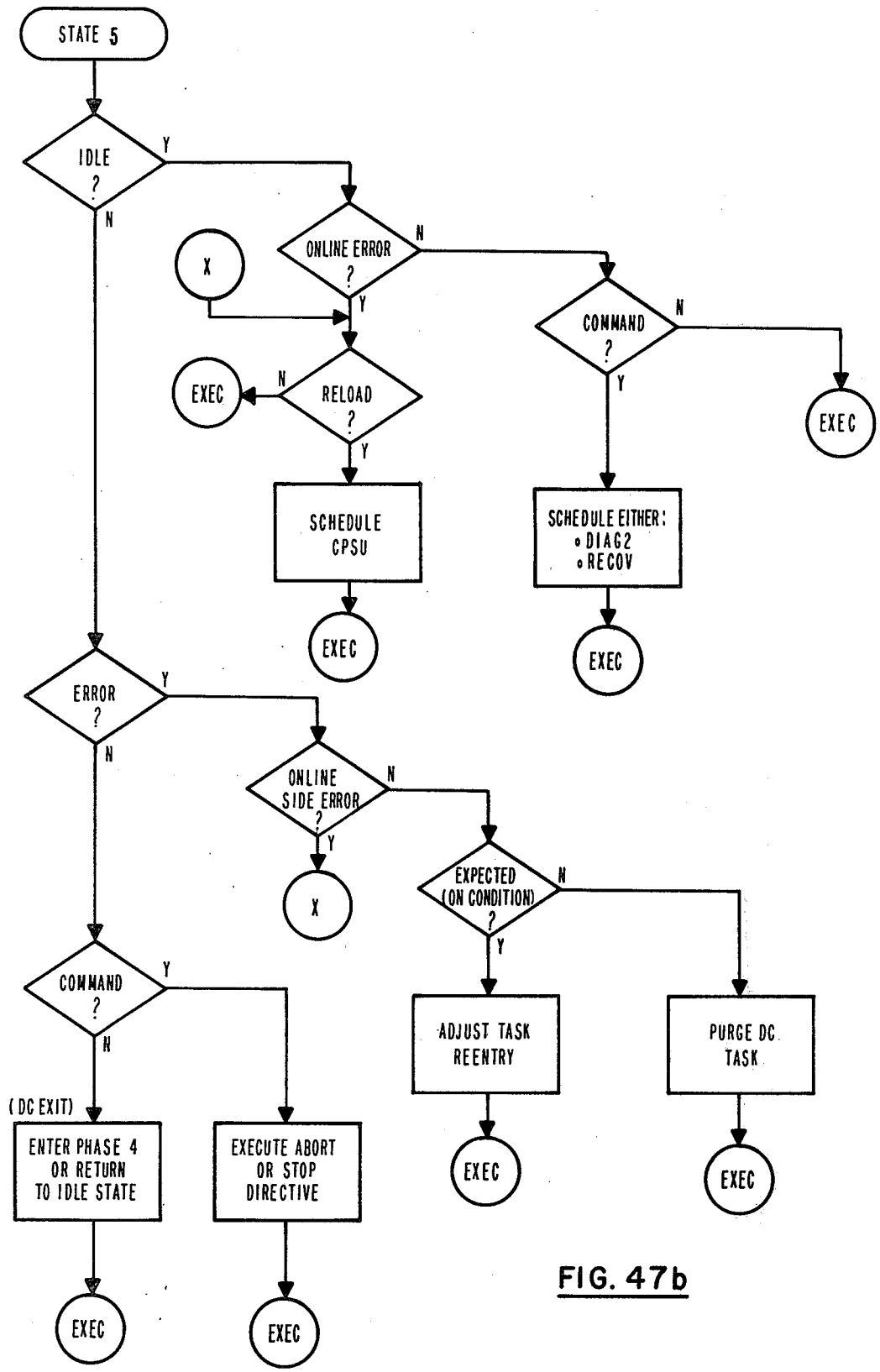
Figure 47C:
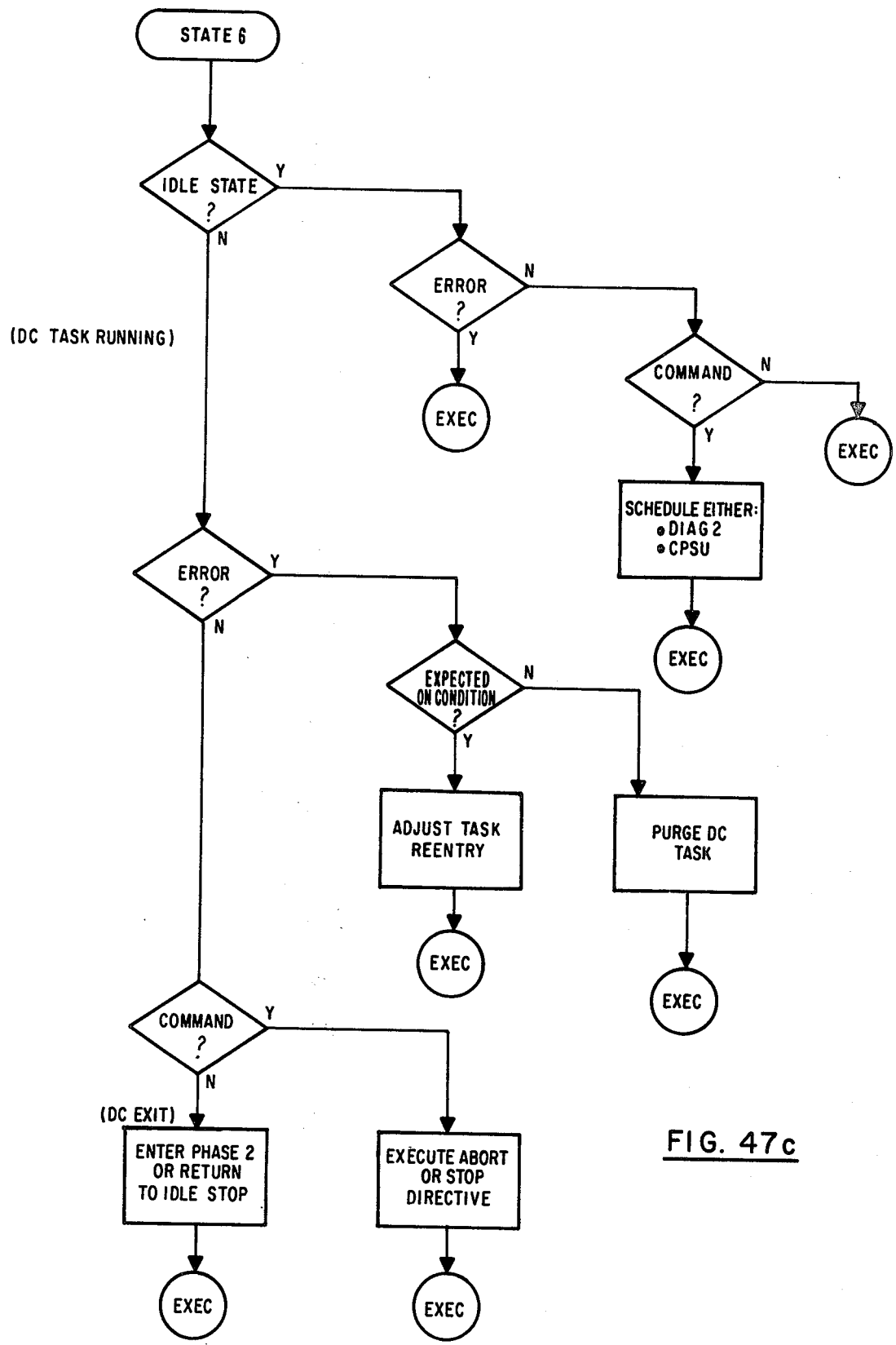
Figure 48A:
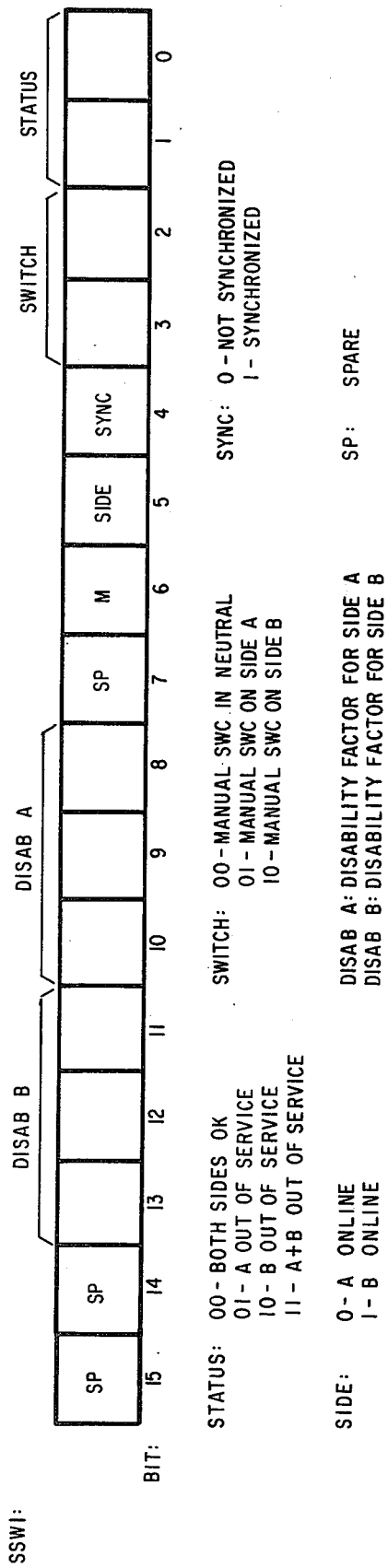
Figure 48B:
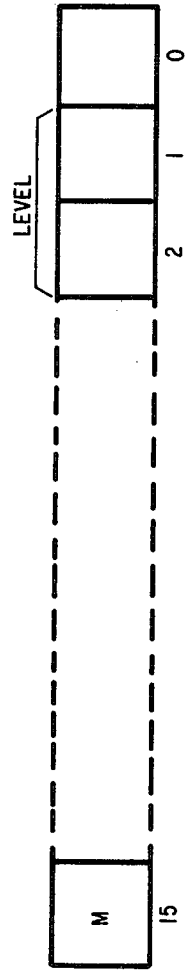

The SLCCDT cluster shown basically in FIG. 46 is a collection of disk resident modules which interprets SLD test data and communicates the result to the craftsperson. In conjunction with the Second Level Diagnostic Initialization Cluster (SLDI) and Second further action. Control is passed from the SLCCDC on completion of its test activities. The SLCCDT cluster processes the resulting test data, entry by entry, translates test findings into a failed list and outputs this lsit to the craftsperson in circuit logical order of replacement. In addition, pass/fail, disability factor and test mode information is passed to the Diagnostic Controller Cluster in the Operating System Program to take further action if necessary.

The diagnostic vector pattern is of the same format as used in the Message Handler Cluster.

In summary, there has been disclosed a specific embodiment of a telephony system that includes redundant call processing systems and an independent maintenance system. It will be apparent, however, that various modifications can be made to this specific embodiment while attaining some or all of the advantages and objects of this invention. Therefore, it is the object of the appended claims to cover all such modifications and alternate embodiments as come within the true scope of this invention.

What is claimed as new and desired to be secured by Letters Patent of the United States is:

1. A telephony system for routing communications over a plurality of telephone lines, said system comprising:
    A. port connection means connected to the telephone lines for receiving signals therefrom and for transmitting signals thereto,
    B. first and second, parallel, independently operable call processing means for interconnecting, on a selective basis, certain of the telephone lines, each said call processing means operating concurrently in response to the same signals from said port connection means by generating output signals,
    C. synchronizing means connected to both said call processing means for synchronizing the operation of said first and second call processing means,
    D. controllable switching means interposed between said port connection means and both said call processing means for coupling the output signals from a selected one of said call processing means to said port communications means to complete communications between said port connection means and the selected one of said call processing means,
    E. fault monitoring means connected to each of said call processing means for generating fault signals in response to fault conditions in said call processing means, and
    F. switchover means connected to said fault monitoring means and said controllable switching means and operable independently of both said call processing means for testing each said call processing means in response to certain of said fault signals thereby to identify one of said call processing means as the source of the fault condition and to cause said controllable switching means to couple output signals from the other of said call processing means to said port connection means.

2. A telephony system as recited in claim 1 wherein each of said first and second call processing means includes:
    i. port storage means for storing port status information representing different conditions for each said port means,
    ii. port event processing means connected to said port storage means for processing said port status information in accordance with other port status information,
    iii. matrix switch means connected to each said port means and said port storage means for establishing signal paths that transfer supervisory signals between said port storage means and each said port means and that transfer information signals between selected ones of said port means, and
    iv. supervisory signal processing means having a processor bus over which control and data signals are transferred to said matrix switch means and said port storage means thereby to control the operation of said matrix switch means and port storage means.

3. A telephony system as recited in claim 2 wherein said supervisory signal processing means in each of said call processing means includes a separate programmably controlled data processing system, respectively, and said switchover control means includes a third programmably controlled data processing system that operates independently of either of said first and second data processing systems.

4. A telephony system as recited in claim 2 wherein said fault monitoring means includes:
    i. sensing means for sensing the supervisory and data signals received by each of said first and second call processing means,
    ii. comparison means connected to said sensing means for comparing respective supervisory and data signals received by each said call processing means, and
    iii. mismatch detection means connected to said comparison means and said switchover means for generating a mismatch fault signal when said comparison means indicates that the supervisory and data signals in said call processing means do not correspond.

5. A telephony system as recited in claim 2 where said fault monitoring means includes:
    i. sensing means for sensing the respective control and data signals transferred over each of said processing buses of the supervisory signal processing means,
    ii. comparison means connected to said sensing means for comparing said respective control and data signals, and
    iii. mismatch detection means connected to said comparison means and said switchover means for generating a mismatch fault signal when said comparison means indicates that the control and data signals on said processing buses do not correspond.

6. A telephony system as recited in claim 2 wherein said fault monitoring means includes:
   i. sensing means for sensing data stored in each of the respective port storage means of the call processing systems,
   ii. comparison means connected to said sensing means for comparing data that is stored in the respective port storage means, and
   iii. mismatch detection means connected to said comparison means and said switchover means for generating a mismatch fault signal when said comparison means indicates that the data in said port storage means do not correspond.

7. A telephony system as recited in claim 2 wherein each said matrix switch means includes supervisory buffer means for storing supervisory switching data and said fault monitoring means includes:
   i. sensing means connected to said supervisory buffer means for sensing supervisory data for each of the respective call processing systems,
   ii. comparison means connected to said sensing means for comparing supervisory data, and
   iii. mismatch detection means connected to said comparison means and to said switchover means for generating a mismatch fault signal when said comparison means indicates that the data in both said supervisory buffer means do not correspond.

8. A telephony system as recited in claim 2 wherein each of said supervisory signal processing means includes an associated controller means connected thereto by a controller bus for controlling the operation of an associated one of said matrix switch means and said fault monitoring means includes:
   i. sensing means for sensing respective control and data signals transferred over each of said controller buses,
   ii. comparison means connected to said sensing means for comparing data and control signals on the respective controller buses, and
   iii. mismatch detection means connected to said comparison means and said switchover means for generating a mismatch fault signal when the respective data and control signals on said controller buses do not correspond.

9. A telephony system as recited in claim 2 wherein each port storage means of the respective call processing means includes addressable storage locations and said switchover means includes:
   i. addressing means for accessing selected storage locations of said respective port storage means;
   ii. means for loading predetermined control data at said selected storage locations of the respective port storage means thereby to cause a predetermined mode of operation of said telephony system, and
   iii. means connected to said monitoring means for locating faults in each of said call processing means by detecting a mode of operation different from said predetermined mode of operation, thereby to remove from operation a faulty one of said call processing means.

10. A telephony system as recited in claim 2 wherein the port event processing means of the respective call processing means includes supervisory buffers for storing control data constituting supervisory information that is used for controlling the operation of said associated matrix switch means and said switchover means includes:
   i. addressing means for selectively accessing storage locations within said supervisory buffers, and
   ii. means for loading predetermined control data at said selected locations of the respective supervisory buffers thereby to cause a predetermined mode of operations of said telephony system.

11. A telephony system as recited in claim 2 wherein said switchover means includes:
   i. means for altering the parity status of data transferred over the respective processing buses of the associated supervisory signal processing systems thereby to cause a predetermined mode of operation, and
   ii. means connected to said monitoring means for locating faults in each of said call processing systems by detecting a mode of operation different from said predetermined mode of operation thereby to remove from operation a faulty one of said call processing means.

12. A telephony system as recited in claim 2 wherein the port event processing means of the respective call processing means includes control registers for storing control data that controls the operation of said port event processing means and said switchover means includes:
   i. addressing means for selectively accessing data locations within the respective control registers,
   ii. means for loading predetermined control data into a selected one of said control registers thereby to cause a predetermined mode of operation of said telephony system, and
   iii. means connected to said monitoring means for locating faults in each of said call processing means by detecting a mode of operation different from said predetermined mode of operation thereby to remove from operation a faulty one of said call processing means.

13. A telephony system as recited in claim 2 wherein said supervisory signal processor means of each said call processing means includes control register means for controlling the operation of the respective call processing systems and said switchover means includes:
   i. addressing means for selectively accessing data locations within the respective control register means,
   ii. means for loading predetermined control data at said selected locations within the associated control register means thereby to cause a predetermined mode of operation of said telephony system, and
   iii. means connected to said monitoring means for locating faults in each of said call processing means by detecting a mode of operation different from said predetermined mode of operation thereby to remove from operation a faulty one of said call processing means.

14. A telephony system as recited in claim 13 additionally including second fault monitoring means connected to each said call processing means for generating second fault signals in response to certain internal fault conditions that directly indicate which of said call processing means is the source of the internal fault condition, said switchover means including means connected to said second fault monitoring means for causing said controllable switching means to couple output signals from the other of said call processing means to said port connection means in response to the second fault signals.

15. A telephone system as recited in claim 14 wherein said second fault monitoring means includes:
   i. data transfer detection means for detecting the transfer of control and data signals on said processor bus of said supervisory signal processing means, and
   ii. time-out means connected to said detection means for monitoring the time period between successive transfers of data, said time-out means generating a time-out signal as a second fault signal upon the passage of a predetermined length of time between successive transfers of data.

16. A telephony system as recited in claim 14 wherein each of said independently operable call processing means includes a source of power, and said second fault monitoring means includes means connected to said power sources for generating a power failure signal as a second fault signal upon failure of the said power sources.

17. A telephony system as recited in claim 14 wherein each of said first and second call processing means includes clock means for clocking the operations of the respective call processing means, and said second fault monitoring means includes means connected to said clock means for monitoring the operation of each said clock means and generating a clock failure signal as a second fault signal upon failure of a said clock means.

18. A telephony system as recited in claim 14 wherein each said supervisory signal processing means includes parity means for generating and receiving a parity signal in response to data signals transferred over said processor bus, and said second fault monitoring means includes means connected to said parity means for generating a parity fault signal as a second fault signal upon detection of a parity error on either of said respective processor buses.

19. A telephony system as recited in claim 14 wherein said second fault monitoring means includes time-out means connected to each said call processing means for generating a respective time-out fault signal as a second fault signal upon the passage of a predetermined length of time during the execution of call processing tasks by either of said call processing means.

20. A telephony system as recited in claim 14 wherein said second fault monitoring means includes matrix switch time-out means connected to each said matrix switch means for generating a matrix switch time-out fault signal as a second fault signal upon the passage of a predetermined length of time during the execution of the respective switching operations of the matrix switch means.

21. A telephony system as recited in claim 2 wherein said processing buses of each said supervisory signal processing means includes memory means connected thereto that include means for transmitting respective reply signals upon being accessed by said processing means thereby to acknowledge receipt of control signals transmitted thereto, said synchronizing means including:
   i. means to intercept each said reply signal from said respective memory means, and
   ii. reply signal retransmitting means that simultaneously retransmit both said reply signals to respective supervisory signal processing means thereby to synchronize the operation of both said call processing means.

22. A telephony system as recited in claim 21 wherein said synchronizing means further includes time-out means connected to said fault monitoring means for generating a respective fault signal upon lapse of a predetermined time period between receipt of said respective reply signals.

23. A telephony system as recited in claim 22 wherein said synchronizing means further includes reply time-out means that retransmits at least one of said intercepted reply signals to the associated supervisory signal processing means when each said reply signal has not been received within a predetermined time period thereby to permit asynchronous operation of said telephone switching systems when one of said systems has timed out.

24. A telephony system as recited in claim 2 wherein each of said independently operable supervisory signal processing means includes data link means connected to the respective processing buses for transferring supervisory and control data between the respective call processing means.

* * * * *